(12) United States Patent
Li et al.

(10) Patent No.: US 8,520,567 B2
(45) Date of Patent: Aug. 27, 2013

(54) ENCODING INFORMATION IN BEACON SIGNALS

(75) Inventors: Junyi Li, Bedminster, NJ (US); Thomas Richardson, South Orange, NJ (US); Rajiv Laroia, Far Hills, NJ (US)

(73) Assignee: QUALCOMM Incorporated, San Diego, CA (US)

(*) Notice: Subject to any disclaimer, the term of this patent is extended or adjusted under 35 U.S.C. 154(b) by 1240 days.

(21) Appl. No.: 11/764,162

(22) Filed: Jun. 15, 2007

(65) Prior Publication Data

US 2008/0101264 A1 May 1, 2008

Related U.S. Application Data

(60) Provisional application No. 60/814,317, filed on Jun. 16, 2006, provisional application No. 60/814,652, filed on Jun. 16, 2006.

(51) Int. Cl.
| H04J 1/00 | (2006.01) |
| H04J 11/00 | (2006.01) |
| H04J 3/08 | (2006.01) |
| H04B 7/00 | (2006.01) |
| H04K 1/10 | (2006.01) |

(52) U.S. Cl.
USPC ........... 370/310; 370/208; 370/326; 370/343; 375/260

(58) Field of Classification Search
USPC .................. 370/208, 326, 343, 310; 375/260
See application file for complete search history.

(56) References Cited

U.S. PATENT DOCUMENTS

| 5,289,503 A | 2/1994 | Alberty et al. |
| 5,333,135 A | 7/1994 | Wendorf |
| 5,467,132 A | 11/1995 | Fazel et al. |
| 5,649,302 A | 7/1997 | Ayerst et al. |
| 5,892,879 A | 4/1999 | Oshima |
| 5,946,343 A | 8/1999 | Schotz et al. |
| 5,953,323 A | 9/1999 | Haartsen |
| 5,959,546 A | 9/1999 | Dorenbosch |
| 6,058,101 A | 5/2000 | Huang et al. |
| 6,311,306 B1 | 10/2001 | White et al. |
| 6,549,589 B1 | 4/2003 | Tsuruoka |
| 6,618,450 B1 | 9/2003 | Hatta |
| 6,768,517 B2 | 7/2004 | Limberg et al. |
| 6,768,714 B1 | 7/2004 | Heinonen et al. |

(Continued)

FOREIGN PATENT DOCUMENTS

| CN | 1533196 A | 9/2004 |
| EP | 0562875 A1 | 9/1993 |

(Continued)

OTHER PUBLICATIONS

International Search Report and Written Opinion—PCT/US07/071353, International Search Authority—European Patent Office—Dec. 11, 2007.

(Continued)

*Primary Examiner* — Marisol Figueroa
(74) *Attorney, Agent, or Firm* — James K. O'Hare

(57) ABSTRACT

Systems and methodologies are described that facilitate transmitting at least two different types of information in a single signal, whereby the different types of information can be encoded and decoded independently. Thus, changes to one type of information does not affect a second type of information.

25 Claims, 35 Drawing Sheets

(56) References Cited

U.S. PATENT DOCUMENTS

| | | |
|---|---|---|
| 6,795,426 B1 | 9/2004 | Raleigh et al. |
| 6,807,147 B1 | 10/2004 | Heinonen et al. |
| 6,891,841 B2 | 5/2005 | Leatherbury et al. |
| 6,928,263 B2 | 8/2005 | Blake et al. |
| 7,039,370 B2 | 5/2006 | Laroia et al. |
| 7,233,800 B2 | 6/2007 | Laroia et al. |
| 7,236,549 B2 | 6/2007 | Chua |
| 7,305,012 B1 | 12/2007 | De Angeli et al. |
| 7,333,531 B2 | 2/2008 | Alamouti et al. |
| 7,366,200 B2 | 4/2008 | Laroia et al. |
| 7,366,790 B1 | 4/2008 | Rustad et al. |
| 7,394,793 B2 | 7/2008 | Roh et al. |
| 7,412,551 B2 | 8/2008 | Bose et al. |
| 7,532,563 B1 | 5/2009 | Shirali et al. |
| 7,535,972 B2 | 5/2009 | Hammerschmidt et al. |
| 7,551,546 B2 | 6/2009 | Ma et al. |
| 7,561,600 B2 | 7/2009 | Tanneau |
| 7,567,502 B2 | 7/2009 | Laroia et al. |
| 7,602,852 B2 | 10/2009 | Berkeman et al. |
| RE41,003 E | 11/2009 | Oshima |
| 7,623,443 B2 | 11/2009 | Johnston |
| 7,680,278 B2 | 3/2010 | Hassan et al. |
| 7,693,228 B2 | 4/2010 | Aldana et al. |
| 7,715,496 B2 | 5/2010 | Zhidkov et al. |
| 7,751,515 B2 | 7/2010 | Schwoerer et al. |
| 7,778,151 B2 | 8/2010 | Bertrand et al. |
| 7,782,810 B2 | 8/2010 | Han et al. |
| 7,796,699 B2 | 9/2010 | Jain et al. |
| 7,813,383 B2 | 10/2010 | Wang et al. |
| 7,826,343 B2 | 11/2010 | Krasner |
| 7,826,807 B2 | 11/2010 | Laroia et al. |
| 7,843,890 B2 | 11/2010 | Tirkkonen et al. |
| 7,859,986 B2 | 12/2010 | Laroia et al. |
| 7,889,800 B2 | 2/2011 | Jonsson |
| 7,894,324 B2 | 2/2011 | Laroia et al. |
| 7,894,417 B2 | 2/2011 | Parts et al. |
| 7,894,818 B2 | 2/2011 | Khan |
| 7,913,383 B1 | 3/2011 | Keeven et al. |
| 7,929,619 B2 | 4/2011 | Li et al. |
| 7,983,142 B2 | 7/2011 | Li et al. |
| 7,995,527 B2 | 8/2011 | Li et al. |
| 8,005,158 B2 | 8/2011 | Leonidov et al. |
| 8,036,205 B2 | 10/2011 | Lane et al. |
| 8,073,063 B2 | 12/2011 | Ma et al. |
| 8,134,996 B2 | 3/2012 | Onggosanusi et al. |
| 8,306,541 B2 | 11/2012 | Laroia et al. |
| 8,422,938 B2 | 4/2013 | Li et al. |
| 2001/0055320 A1 | 12/2001 | Pierzga et al. |
| 2002/0097336 A1 | 7/2002 | Oshima |
| 2004/0066736 A1 | 4/2004 | Kroeger |
| 2004/0081131 A1 | 4/2004 | Walton et al. |
| 2004/0095880 A1* | 5/2004 | Laroia et al. ............ 370/208 |
| 2004/0095902 A1 | 5/2004 | Laroia et al. |
| 2004/0131034 A1 | 7/2004 | Sugaya |
| 2004/0190638 A1 | 9/2004 | Blasco Claret et al. |
| 2005/0058089 A1* | 3/2005 | Vijayan et al. ............ 370/312 |
| 2005/0058151 A1 | 3/2005 | Yeh |
| 2005/0066352 A1 | 3/2005 | Herley |
| 2005/0085214 A1 | 4/2005 | Laroia et al. |
| 2005/0123001 A1 | 6/2005 | Craven et al. |
| 2005/0136849 A1 | 6/2005 | Kang |
| 2005/0195909 A1 | 9/2005 | Hwang et al. |
| 2005/0210157 A1 | 9/2005 | Sakoda |
| 2005/0226277 A1 | 10/2005 | Li et al. |
| 2005/0237923 A1 | 10/2005 | Balakrishnan et al. |
| 2005/0250469 A1 | 11/2005 | Laroia et al. |
| 2005/0250502 A1 | 11/2005 | Laroia et al. |
| 2005/0281346 A1 | 12/2005 | Redfern |
| 2006/0008014 A1 | 1/2006 | Tamaki et al. |
| 2006/0013121 A1 | 1/2006 | Jiang |
| 2006/0014494 A1 | 1/2006 | Vanderperren et al. |
| 2006/0029157 A1 | 2/2006 | Dabak et al. |
| 2006/0031558 A1 | 2/2006 | Ortega et al. |
| 2006/0045038 A1 | 3/2006 | Kay et al. |
| 2006/0050625 A1 | 3/2006 | Krasner |
| 2006/0063490 A1 | 3/2006 | Bader et al. |
| 2006/0083189 A1 | 4/2006 | Laroia et al. |
| 2006/0083244 A1 | 4/2006 | Jagadesan et al. |
| 2006/0093067 A1 | 5/2006 | Jalali et al. |
| 2006/0203709 A1 | 9/2006 | Laroia et al. |
| 2006/0205355 A1 | 9/2006 | Laroia et al. |
| 2006/0205356 A1 | 9/2006 | Laroia et al. |
| 2007/0036066 A1 | 2/2007 | Thomas et al. |
| 2007/0037512 A1 | 2/2007 | Godwin |
| 2007/0064730 A1 | 3/2007 | Jin et al. |
| 2007/0066362 A1 | 3/2007 | Ma et al. |
| 2007/0070944 A1 | 3/2007 | Rinne et al. |
| 2007/0076807 A1 | 4/2007 | Jin et al. |
| 2007/0093253 A1 | 4/2007 | Lindoff et al. |
| 2007/0149228 A1 | 6/2007 | Das |
| 2007/0149238 A1 | 6/2007 | Das et al. |
| 2007/0168842 A1 | 7/2007 | Jeong et al. |
| 2007/0211765 A1 | 9/2007 | Vrcelj et al. |
| 2007/0213087 A1 | 9/2007 | Laroia et al. |
| 2007/0242765 A1 | 10/2007 | Parizhisky et al. |
| 2007/0253367 A1 | 11/2007 | Dang et al. |
| 2007/0291691 A1 | 12/2007 | Gorokhov |
| 2008/0009305 A1 | 1/2008 | Li et al. |
| 2008/0013479 A1 | 1/2008 | Li et al. |
| 2008/0014861 A1 | 1/2008 | Li et al. |
| 2008/0039066 A1 | 2/2008 | Laroia et al. |
| 2008/0062953 A1 | 3/2008 | Li et al. |
| 2008/0069255 A1 | 3/2008 | Balakrishnan et al. |
| 2008/0101447 A1 | 5/2008 | Li et al. |
| 2008/0112334 A1 | 5/2008 | Laroia et al. |
| 2008/0144493 A1 | 6/2008 | Yeh |
| 2008/0215951 A1 | 9/2008 | Oshima |
| 2009/0059841 A1 | 3/2009 | Laroia et al. |
| 2009/0303918 A1 | 12/2009 | Ma et al. |
| 2012/0087336 A1 | 4/2012 | Sutivong et al. |

FOREIGN PATENT DOCUMENTS

| | | |
|---|---|---|
| JP | 11275655 A | 10/1999 |
| JP | 2000069033 A | 3/2000 |
| JP | 200315992 A | 11/2000 |
| JP | 2000315992 A | 11/2000 |
| JP | 2001333066 A | 11/2001 |
| JP | 2002009687 A | 1/2002 |
| JP | 2007522692 A | 8/2007 |
| JP | 2008517524 | 5/2008 |
| JP | 2008517537 | 5/2008 |
| JP | 2010502159 | 1/2010 |
| JP | 2010504721 | 2/2010 |
| KR | 20050060765 | 6/2005 |
| KR | 20050123017 | 12/2005 |
| WO | WO03075515 A1 | 9/2002 |
| WO | WO2004019529 | 3/2004 |
| WO | WO2004075442 | 9/2004 |
| WO | WO2005039105 | 4/2005 |
| WO | WO2005109832 A1 | 11/2005 |
| WO | WO2006020520 A2 | 2/2006 |
| WO | WO2006043939 A2 | 4/2006 |
| WO | WO2006044661 A2 | 4/2006 |
| WO | WO2006096678 A1 | 9/2006 |
| WO | WO2009009572 A2 | 1/2009 |

OTHER PUBLICATIONS

Duan J., et al., "A Proposal of Simultaneous Spread of PPM in Frequency and Time Axes for Adaptive CDMA", IEICE Transactions of Communications, vol. E82-B, no. 12, Dec. 1999, pp. 2126-2134.

Iversen K., et al., "DA2-ary Signaling for Incoherent All-Optical CDMA Systems", Information Theory, 1997. Proceedings., Jul. 4, 1997, pp. 484.

Shingut H., et al., "Optical Code Division Multiplex System with Multipulse Mapping", Technical Report of The Institute of Electronics Information and Communication Engineers, The Institute of Electronics, Information and Communication Engineers, Jun. 19, 1998, vol. 98, No. 113, pp. 1-6, SAT98-16.

Taiwan Search Report—TW096122169—TIPO—Feb. 22, 2012.

* cited by examiner

ENCODING INFORMATION IN BEACON SIGNALS

CROSS-REFERENCE

This application claims the benefit of U.S. Provisional Application Ser. No. 60/814,317, filed Jun. 16, 2006, entitled "METHODS AND APPARATUS FOR ENCODING INFORMATION IN BEACON SIGNALS", and U.S. Provisional Application Ser. No. 60/814,652, filed Jun. 16, 2006, entitled "METHODS AND APPARATUS FOR PROGRESSIVELY BROADCASTING INFORMATION IN BEACON SIGNALS", and the entirety of these applications are incorporated herein by reference. This application is related to co-pending patent application U.S. application Ser. No. 11/764,156 entitled, "ENCODING INFORMATION IN BEACON SIGNALS", and co-pending patent application U.S. Application Ser. No. 11/764,165 entitled, "ENCODING INFORMATION IN BEACON SIGNALS", and co-pending patent application U.S. application Ser. No. 11/764,166 entitled, "PROGRESSIVELY BROADCASTING INFORMATION IN BEACON SIGNALS", all of which were filed Jun. 15, 2007.

BACKGROUND

I. Field

The following description relates generally to signaling in wireless communications, and more particularly to using beacon signals for coding information to be used for a variety of purposes.

II. Background

In a wireless communication system, a serving station (e.g., a base station) is providing service to other stations, referred to as terminals, in a geographical area. The serving station usually sends broadcast information to aid the terminals to learn necessary system information about the service so that the terminals can determine whether to use the service provided by the serving station or how to utilize the spectrum in general. The broadcast channel capacity is limited and, therefore, it may not be possible to send all the broadcast information at the same time. In general, different pieces of broadcast information may have different priorities and require different broadcasting cycles. It is desired that the transmission of the broadcast information be robust (e.g., against uncertainties including the lack of timing and frequency synchronization between the serving station and the terminals) and enable power-efficient signal processing algorithms at the terminal receiver.

SUMMARY

The following presents a simplified summary of one or more aspects in order to provide a basic understanding of such aspects. This summary is not an extensive overview of all contemplated aspects, and is intended to neither identify key or critical elements nor delineate the scope of any or all aspects. Its sole purpose is to present some concepts of one or more aspects in a simplified form as a prelude to the more detailed description that is presented later.

In accordance with one or more examples and corresponding disclosure thereof, various aspects are described in connection with improved ways of sending broadcast information in a wireless communications system.

An aspect relates to a method of operating a base station. The method can include assigning a first value to a first information stream and assigning a second value to a second information stream. The first information stream and the second information stream can be combined and a composite value can be produced from the combined information streams. The method can further include transmitting a waveform as a function of the composite value.

Another aspect relates to a wireless communications apparatus that produces two information streams that represent a waveform. The apparatus can include a memory and a processor. The memory can retain instructions related to determining a first value for a first information stream and determining a second value for a second information stream. Further instructions retained in memory can relate to combining the values to produce a composite value and transmitting a waveform as a function of the composite value. The processor can be coupled to the memory and can be configured to execute the instructions retained in the memory.

Still another aspect relates to a wireless communications apparatus. The apparatus can comprise a means for assigning independent values to a first information stream and a second information stream and a means for combining the independent values to produce a composite value. Also included in apparatus can be a means for outputting a waveform that is a function of the composite value, the waveform includes a high-energy beacon signal.

According to another aspect is a machine-readable medium having stored thereon machine-executable instructions for assigning a first value to a first information stream and assigning a second value to a second information stream that is independent from the value assigned to the first information stream. The instructions can also include combining the first value and the second value to produce a composite value and transmitting a waveform that includes a high-energy beacon signal. The waveform can be a function of the composite value.

In a wireless communication system, another aspect relates to an apparatus that includes a processor. The processor can be configured to assign independent values to a first information stream and a second information stream. The independent values can be selectively coded and decoded. The processor can further be configured to combine the independent values for transmission in a waveform that includes a high-energy beacon signal. The waveform can be a function of the combined independent values.

An aspect relates to a method that facilitates receiving information from a base station. The method can include receiving a high-level beacon signal included in a waveform. The waveform can be a function of a first value and a second value. The method can also relate to interpreting the first value as a first information stream and interpreting the second value as a second information stream. The first information stream can represent a first subset of broadcast information and the second information stream can represent a second subset of broadcast information.

Another aspect relates to a wireless communications apparatus that selectively decodes information received in a beacon signal. The apparatus can include a processor and a memory. The memory can retain instructions related to receiving a waveform that includes a high-energy beacon signal. The waveform can be a function of a composite value representing a first value and a second value. The memory can further retain instructions related to independently decoding the first value to obtain a first subset of information and independently decoding the second value to obtain a second subset of information. The processor can be coupled to the memory and can be configured to execute the instructions retained in the memory.

Still another aspect relates to a wireless communications apparatus that enables deciphering two independent information streams that represent a waveform. The apparatus can include a means for receiving a waveform that includes a high-energy beacon signal and a means for breaking the waveform into independent information stream values. Also included in apparatus can be a means for deciphering a first value of a first information stream and a second value of a second information stream from the independent information stream values.

A further aspect relates to a machine-readable medium having stored thereon machine-executable instructions for receiving a waveform that includes a high-energy beacon signal. The waveform can comprise a first value combined with a second value. The instructions can also relate to recreating the first value from the combined values to derive a first information stream and recreating the second value from the combined values to derive a second information stream.

In a wireless communication system, another aspect relates to an apparatus that includes a processor. The processor can be configured to receive a waveform that includes a combination of two independent values. A processor can further be configured to decode a first independent value from the combination to obtain a first information stream and decode a second independent value from the combination to obtain a second information stream.

To the accomplishment of the foregoing and related ends, the one or more aspects comprise the features hereinafter fully described and particularly pointed out in the claims. The following description and the annexed drawings set forth in detail certain illustrative examples of the one or more aspects. These examples are indicative, however, of but a few of the various ways in which the principles of various aspects may be employed and the described examples are intended to include all such aspects and their equivalents.

DETAILED DESCRIPTION

Figure 1:
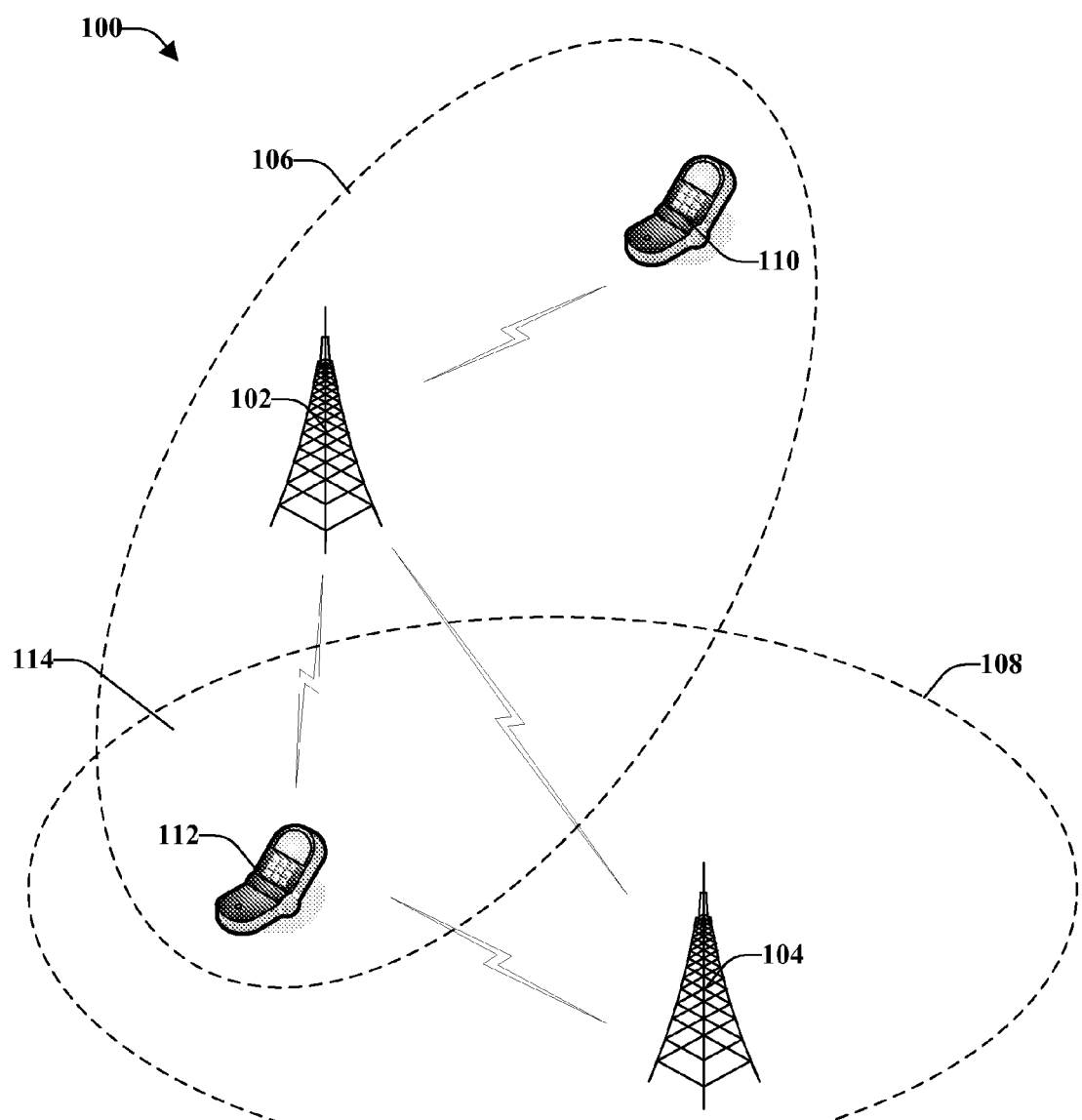
FIG. 1 illustrates a wireless communication system in accordance with various aspects set forth herein.

Various examples are now described with reference to the drawings. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more examples.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various examples are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, user equipment (UE) or the like. A wireless terminal may be a cellular phone, a cordless telephone, a smart phone, a Session Initiation Protocol (SIP) phone, a wireless local loop (WLL) station, a personal digital assistant (PDA), a laptop, a handheld communication device, a handheld computing device, a computing device, a satellite radio, a global positioning system, a processing device connected to a wireless modem and/or other suitable devices for communication. Moreover, various examples are described herein in connection with a base station. A base station may be utilized for communicating with wireless terminal(s) and may also be referred to as an access point, serving station, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various aspects presented herein. System 100 can comprise one or more base stations 102, 104 in one or more sectors 106, 108 that receive, transmit, repeat, etc., wireless communication signals and provide services to each other and/or to one or more mobile devices 110, 112. Base station 102, 104 can be connected to an infrastructure network (e.g., the Internet) and, therefore, provide connectivity to the Internet. In accordance with some aspects, base station 102, 104 can facilitate peer-to-peer communication service (e.g., communications directly between mobile devices 110 and 112).

Each base station 102, 104 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Base stations 102, 104 can transmit information to mobile devices 110, 112 over forward links (downlinks) and receive information from mobile devices 110, 112 over reverse links (uplinks).

In order for the mobile devices 110, 112 to access base station 102, 104 and use the services offered or to utilize the spectrum for peer-to-peer communications, base station 102, 104 broadcasts certain system information. In accordance with some aspects, the set of broadcast information can be divided into one or more subsets. Base station 102, 104 may broadcast some subsets periodically according to predetermined broadcasting cycles and different subsets may be associated with different broadcasting cycles. In accordance with some aspects, base station 102, 104 may broadcast some subsets with a generic message signaling approach, therefore, the broadcasting schedule is not predetermined or fixed (e.g., can be selectively changed).

For example, a first subset of broadcast information might be related to a basic configuration of system 100 to provide mobile devices 110, 112 the ability to access system 100. Included in the first subset of broadcast information can be one or more of (or combinations of) system timing information, spectrum allocation information, transmission power information, service information, communication technology information, system version (compatibility) information, spectrum band information, service operator information, system loading information, and so forth. This list of broadcast information might not vary over time. Further information relating to the information that might be included in the first subset will be provided below.

A second subset of broadcast information might be related to handoff. For example, mobile device 110 might move from a first geographical area 106 to another geographical area 108 causing handoff between two base stations 102, 104. In accordance with some aspects, the geographical areas of two base stations 102, 104 might overlap with each other (illustrated at 114) so that mobile devices 110, 112 experience little, if any, service disruption during handoff.

Base stations 102, 104 might use different sets of system 100 parameters. For example, in an OFDM system the spectrum bandwidth is divided into a number of tones. In each base station, the tones hop according to a particular hopping pattern. The hopping pattern can be controlled by a system parameter and different base stations 102, 104 can choose different values of the system parameter in order to diversify the interference between the base stations 102, 104.

The system parameters allow mobile device 110, 112 to migrate from one base station 102 to another base station 104. It is beneficial to allow mobile device 110, 112 to obtain the system parameters promptly in order to mitigate service disruption during handoff. Therefore, the second subset of broadcast information can be smaller that then the first subset of broadcast information. For example, the second subset might include a small number of fixed information bits and can be broadcast repeatedly with a relatively short broadcasting cycle time. It should be noted that this assumes that when handoff occurs, mobile station 110, 112 has already been connected to a base station 102, 104 and, therefore, obtained at least part of the first subset of broadcast information.

Figure 2:
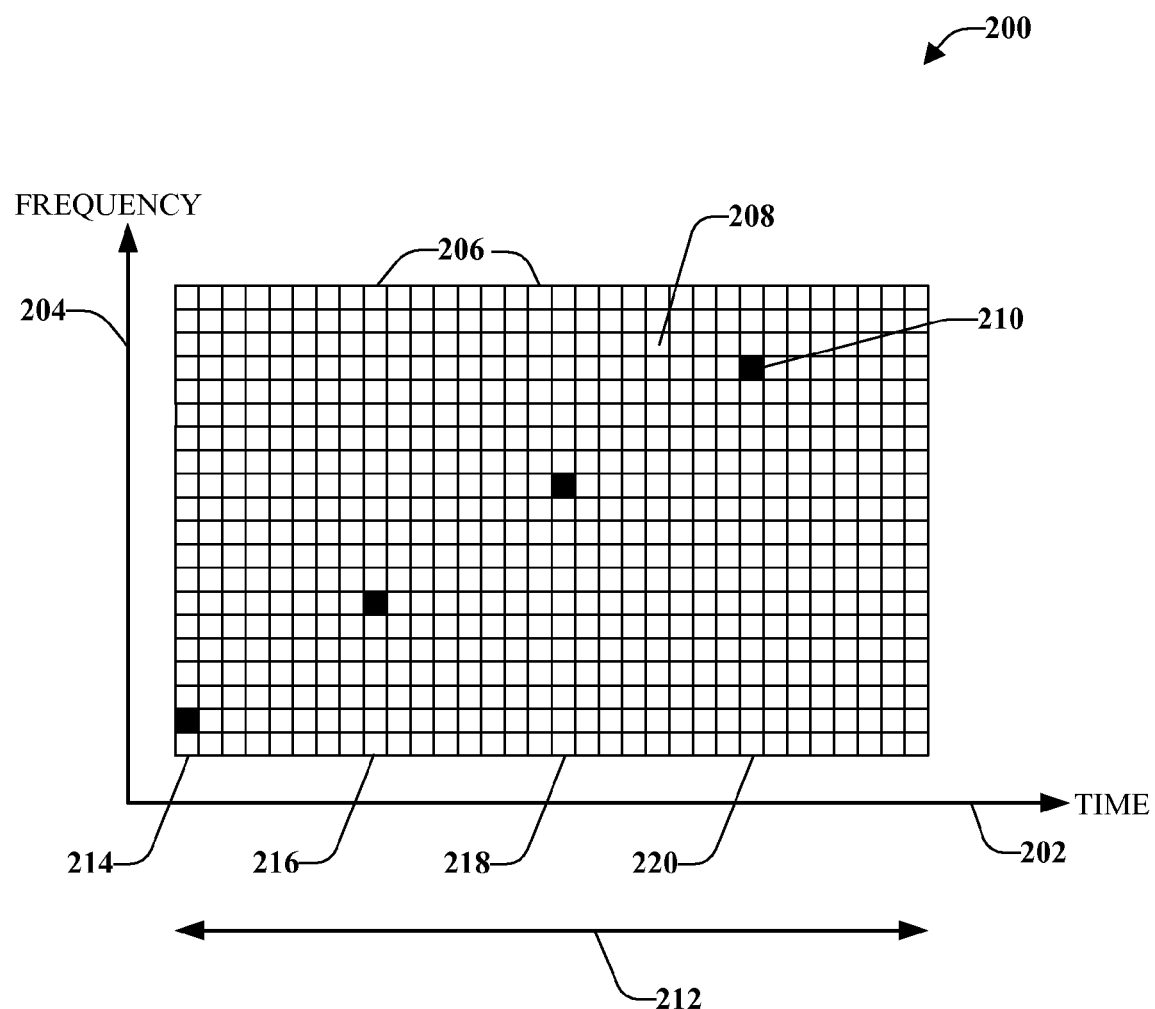
FIG. 2 illustrates a beacon signal in accordance with some aspects.

Turning to FIG. 2, illustrated is a beacon signal 200 in an example Orthogonal Frequency-Division Multiplexing (OFDM) system in accordance with the various aspects described herein. The first and second (or more) subsets of broadcast information can be transported using a special signal or signaling scheme, referred to as a beacon signal.

The horizontal axis 202 represents time and the vertical axis 204 represents frequency. A vertical column, of which a few are labeled at 206, represents the tones in a given symbol period. Each small box, such as box 208, represents a tone-symbol, which is a single tone over a single transmission symbol period. A degree of freedom in an OFDM symbol is a tone-symbol 208.

Beacon signal 200 includes a sequence of beacon signal bursts, which are transmitted sequentially over time. A beacon signal burst includes one or more (e.g., a small number) beacon symbols. Each beacon symbol can be a signal transmitted in one degree of freedom with much higher transmission power than the average per degree of freedom transmission power over a relatively large time interval.

Illustrated are four small black boxes, each of which (210), represents a beacon signal symbol. The transmission power of each beacon signal symbol is much higher (e.g., at least about 10 or 15 dB higher) than the average per tone symbol transmission power over the entire time interval 212. Each OFDM symbol period 214, 216, 218, 220 is a beacon signal burst. In this illustration, each beacon signal burst includes one beacon symbol over one transmission symbol period.

Figure 3:
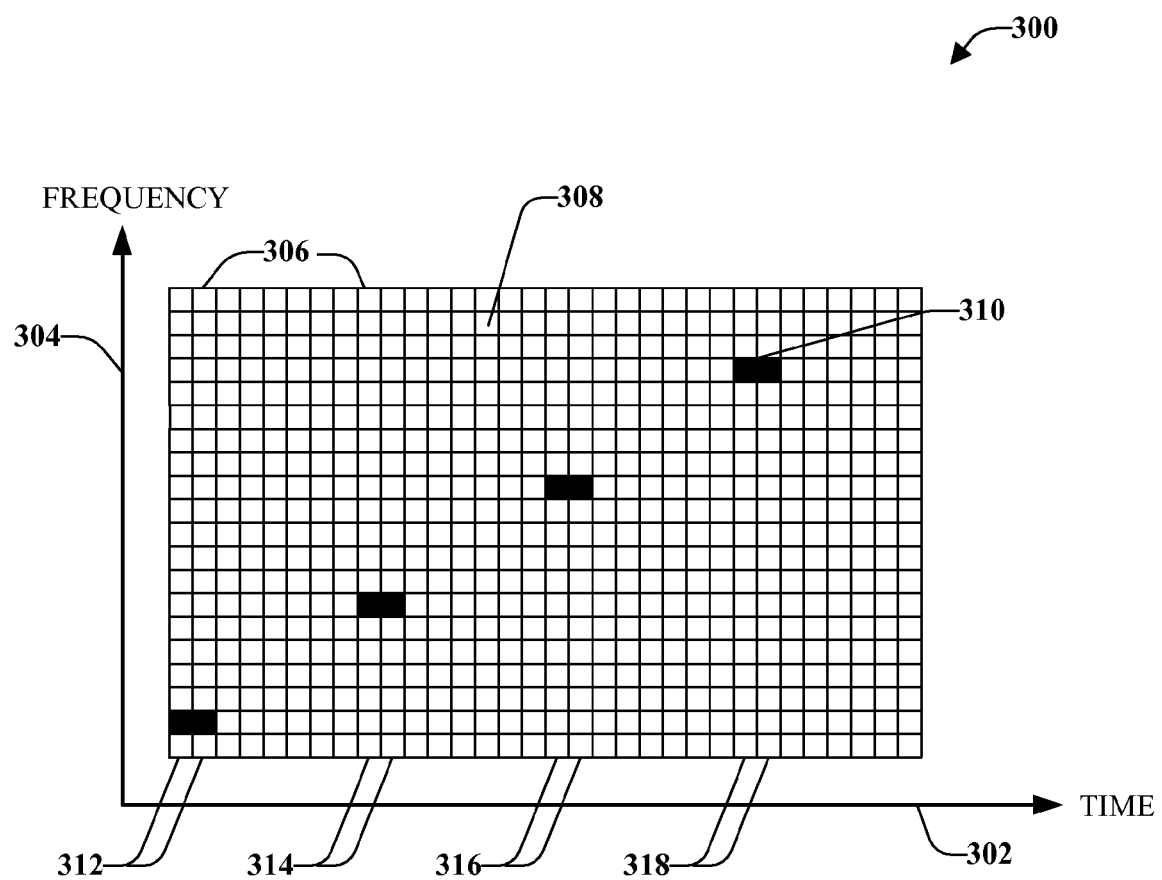
FIG. 3 illustrates another beacon signal that can be utilized with one or more of the disclosed examples.

FIG. 3 illustrates another beacon signal 300 that can be utilized with one or more of the disclosed examples. Beacon signal 300 is similar to beacon signal 200 of the above figure. The difference between these two beacon signals 200, 300 is that beacon signal 300 includes two beacon symbols of the same single tone over two consecutive symbol periods. In particular, a beacon signal burst includes two consecutive OFDM symbol periods 312, 314, 316, 318.

Figure 4:
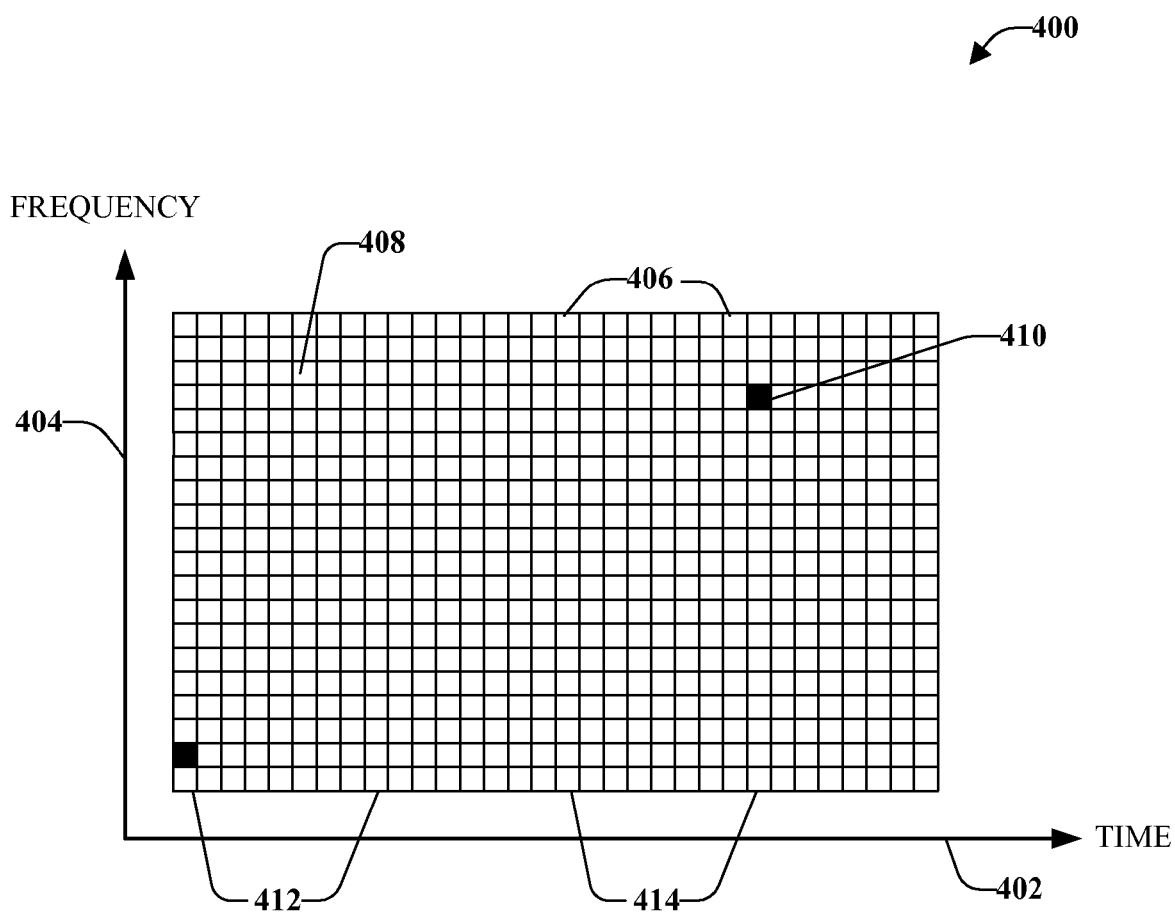
FIG. 4 illustrates yet another beacon that can be utilized with one or more of the disclosed examples.

FIG. 4 illustrates yet another beacon signal 400 that can be utilized with one or more of the disclosed examples. This beacon signal 400 is similar to the above beacons signals 200, 300. The difference is that in this beacon signal 400, each beacon signal burst includes two OFDM symbol periods that might or might not be consecutive. However, only one beacon symbol is transmitted in the two OFDM symbol periods. In a given beacon signal burst, the beacon symbol may occur in any one of the two periods. For example, illustrated are two beacon bursts 412 and 414. The beacon symbol of beacon burst 412 occurs in the first OFDM symbol period, while the beacon symbol of beacon burst 414 occurs in the second OFDM symbol period.

For FIGS. 2, 3, and 4, the time positions of the beacon bursts are predetermined. For example, in FIG. 2 it is predetermined that the beacon bursts are located in OFDM symbols 214, 216, 218, 220. In FIG. 3, it is predetermined that the beacon bursts are located in OFDM symbol pairs 312, 314, 316, 318. In FIG. 4, it is predetermined that the beacon bursts are located in OFDM symbol pairs 412 and 414.

The degrees of freedom in the predetermined OFDM symbols can be chosen to transmit the beacon symbols. For example, in FIG. 2, any one of the tone symbols in OFDM symbol 214 can be chosen to signal the beacon symbol and in FIG. 4 any one of the tone symbols in OFDM symbol pair 412 can be chosen. Therefore, the total number of degrees of freedom of a beacon burst in FIG. 4 is twice as many as that in FIG. 2.

Figure 5:
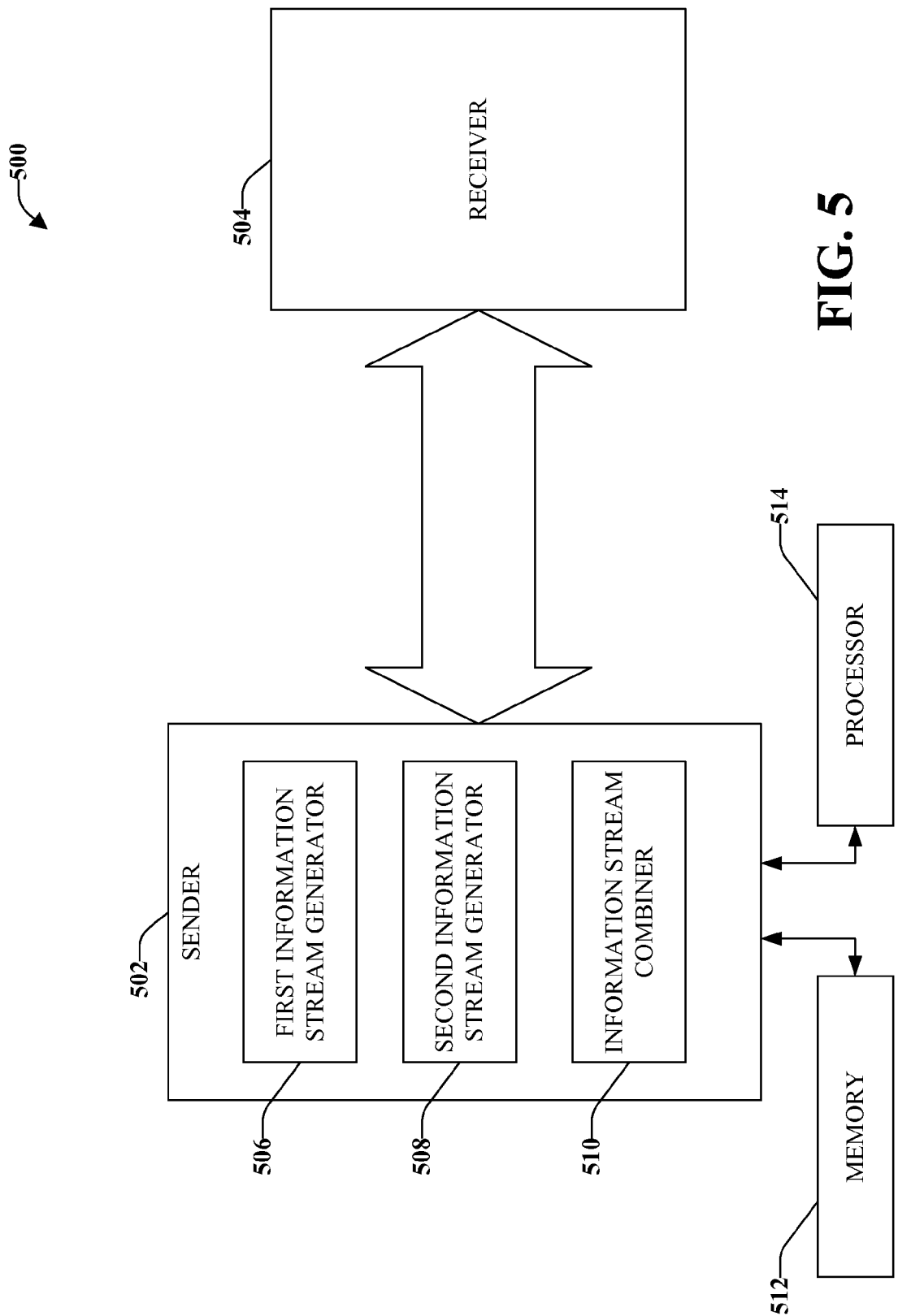
FIG. 5 illustrates an example system that facilitates transmitting independent subsets of information.

FIG. 5 illustrates an example system 500 that facilitates transmitting independent subsets of information. System 500 can be utilized in a wireless communication network to allow mobile devices to communicate with each other and/or with base stations. System 500 can facilitate communication of information in such a manner that changes made to a first subset of information does not affect a second (or more) subset of information. Thus, there can be two different coding schemes that do not interfere with each other (e.g., are independently coded/decoded). Included in system are one or more senders 502 that convey information to one or more receivers 504. Sender 502 and/or receiver 504 can be base stations, mobile devices, or other system components that communicate information.

Sender 502 can include a first information stream generator 506 that can be configured to analyze a broadcast signal and divide the broadcast signal into subgroups in a predetermined manner, creating a first information stream. Additionally or alternatively first information stream generator 506 can be configured to determine which of one or more subgroups to utilize for a particular broadcast signal. For example, the first information stream can be utilized to determine which subgroup to use. A broadcast signal is a well defined time sequence or interval that can be over one OFDM signal or over multiple OFDM signals. For example, a broadcast signal can comprise one or more symbol periods and can be thought of as a block of degrees of freedom.

First information stream generator 506 can determine which subgroup or block to use based on the information that will be carried in the signal, which, for example, might include information related to peer-to-peer communication and/or information related to cellular communication. This information can be processed through encoding (e.g., encoded bit). This encoded bit can have a value of either "0" or "1" and the transmission location of the bit might be based, in part, on the bit value ("0" or "1").

Figure 6:
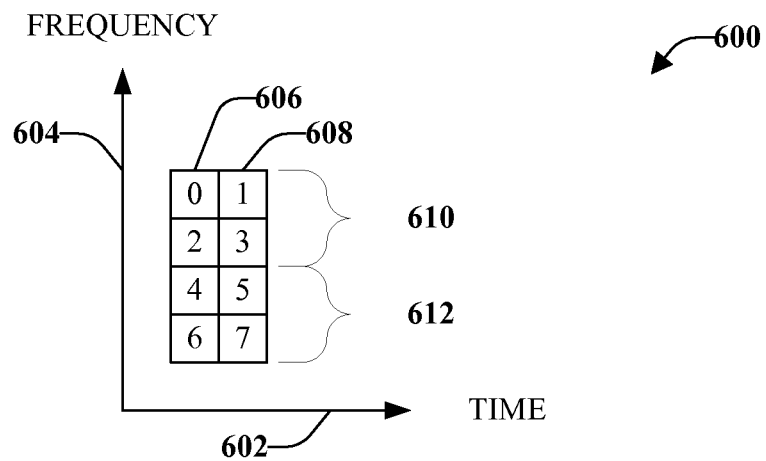
FIG. 6 illustrates an example broadcast signal that can be sent utilizing the various examples disclosed herein.

A representation of a broadcast signal 600 is illustrated in FIG. 6. Broadcast signal 600 is a sub-portion of a beacon symbol, similar to the above beacon symbols 200, 300, 400. It should be understood that broadcast signal 600 is for example purposes and other broadcast symbols can be utilized with the disclosed aspects. Time is represented along the horizontal axis 602 and frequency is represented along the vertical axis 604. The example beacon symbol 600 comprises two symbol periods 606, 608 having four tone-symbols each for a total of eight tone-symbols or degrees of freedom.

The total degrees of freedom in the two symbol periods 606, 608 of the broadcast signal 600 are divided (such as by first information stream generator 506) into a first bandwidth subset 610 and a second bandwidth subset 612. For example, tone-symbols 0, 1, 2 and 3 can be in first bandwidth subset or first block 610 and tone-symbols 4, 5, 6 and 7 can be in second bandwidth subset or second block 612. It should be understood that other configurations and number of blocks of tone-symbols can be utilized and a simple scheme is illustrated.

The selected blocks 610, 612 of tones can be similar to a fixed partition of tone-symbols that does not vary from one beacon signal burst to another. The same partition can be utilized for each block or, in accordance with some aspects, there can be some time varying among the various blocks.

In a given beacon signal burst, the block or subset of tone-symbols used conveys information, which can be referred to as information bit or block coding scheme $\{b_1\}$. First information stream generator 506 can be configured to determine which block coding scheme $\{b_1\}$ will be used during a particular beacon signal burst.

It should be noted that each bandwidth subset 610, 612 in the example is a contiguous block of tone symbols. Moreover, between two bandwidth subsets there may be a few tone symbols left unused. A reason for this is to mitigate the mobile device from mistaking a tone symbol in one bandwidth subset with another tone symbol in another bandwidth subset, due to potential lack of timing and frequency synchronization between the serving station and the mobile device. In another example (not shown) the bandwidth is partitioned such that the degrees of freedom of individual bandwidth subsets interleave with each other, in which case a bandwidth subset might not be a contiguous block of tone symbols.

It should be understood that first information steam generator 506 can determine a bandwidth subset partition in other scenarios. For example, if a beacon burst includes two OFDM symbols, as illustrated in FIG. 4, then the total degrees of freedom in the two OFDM symbols can be partitioned into a multitude of bandwidth subsets. Some bandwidth subsets may include the degrees of freedom in the first OFDM symbol, while another bandwidth subset may include the degrees of freedom in the second OFDM symbol.

System 500 can also include a second information stream generator 508 that can be configured to determine which particular tone-symbol (degree of freedom) to use in a particular broadcast signal, creating a second information stream. In accordance with some aspects, the second information stream can be utilized to determine a waveform to use in the selected subgroup. The degree of freedom chosen can be different for each symbol-period or for each broadcast signal. In accordance with an aspect, the first and second subsets of broadcast information 610, 612 are transported by choosing the degrees of freedom for the beacon symbols in a sequence of beacon bursts. In particular, the total degrees of freedom of a beacon burst can be partitioned into a predetermined number of bandwidth subsets, which can be disjoint or contiguous.

In a given beacon burst, the degree of freedom used to transmit the broadcast symbol conveys information, which can be referred to as information bit or coding scheme $\{c_i\}$. The particular degree of freedom chosen by second information stream generator 508 is determined independently or regardless of which subgroup was selected by first information stream generator 506. For example, second information stream generator 508 can choose a particular tone-symbol (or coding scheme $\{c_1\}$) within a subgroup and first information stream generator 506 can choose the actual tone through selection of a particular subgroup (or block coding scheme $\{b1\}$). The selection of block coding scheme $\{b_1\}$ by first information stream generator 506 and coding scheme $\{c_1\}$ selected by second information stream generator 508 can occur in any order since the selections are independent of each other.

For example, first information stream generator 506 might pick the first sub-group 610 that comprises tone-symbols 0, 1, 2 and 3 for the first information stream $\{b_1\}$ and second information stream generator 508 might pick tone 2 for the second information stream $\{c_1\}$. However, if first information stream generator 506 chooses the second sub-group 612 containing tone-symbols 4, 5, 6 and 7 and second information stream generator 508 chooses the same tone-symbol location, the tone-symbol would now be tone-symbol 6. This is because tone-symbol 6 is in the same location as tone-symbol 2 (but in different sub-groups 610, 612) and second information stream generator 508 is not concerned with which sub-group 610, 612 was chosen by first information stream generator 506.

Second information stream generator 508 can choose the location of the tone-symbol within a sub-group based in part on the coding of scheme $\{c_1\}$ utilizing various algorithms, methods and/or techniques for choosing a coding scheme. The actual tone-symbol used is a function of the block chosen by first information stream generator 506, the particular sequence of $\{c_1\}$ and the hopping sequence. Thus, depending on which sub-group 610, 612 is chosen by first information stream generator 506 the tone-symbol in this example might be 0 or 4; 1 or 5; 2 or 6; or 3 or 7. Since the coding scheme of $\{b_1\}$ and $\{c_1\}$ are independent, if either coding scheme is changed, there is no affect on the other coding scheme.

Figure 7:
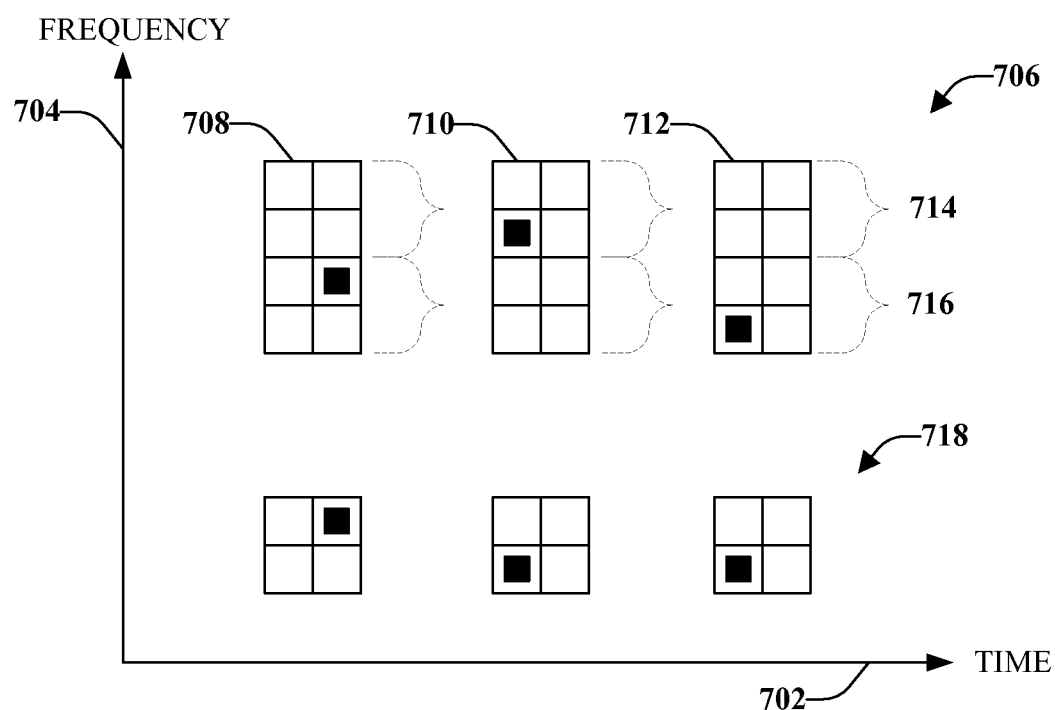
FIG. 7 illustrates a representation of an example coding scheme as viewed by a system component.

A visual representation of an example coding scheme as viewed by the second information stream generator 508 is represented in FIG. 7. Coding scheme $\{c_1\}$ provides a timing scheme and can provide a way for hopping, repeating and so forth. The coding scheme $\{c_1\}$ might repeat in time (or other interval), which can be a very small interval.

Time is represented along the horizontal axis 702 and frequency is represented along the vertical axis. The top portion of the figure, at 702, illustrates three different beacon symbols 708, 710 and 712. The top half of each beacon symbol 708, 710, 712 is a first sub-group and the bottom half is the second subgroup, represented as 714 and 716, respectively, similar to the beacon symbol 600 illustrated in the above figure. As illustrated, first information stream generator 506 can choose for the first information stream $\{b_1\}$ the second sub-group for beacon signal 708, the first sub-group for beacon signal 710 and the second sub-group for beacon signal 712. Second information stream generator 508 can choose a location for second information stream $\{c_1\}$, illustrated by the black boxes. A high energy signal is sent in the chosen location, regardless of the sub-group chosen by first information stream generator 506. In the example, the period is only three and second information stream $\{c_1\}$ can repeat. First information stream $\{b_1\}$ might have a completely different periodicity. In other words, the actual block in which second information stream $\{c_1\}$ is located is a function of first information stream $\{b_1\}$, however, from the perspective of second information stream $\{c_1\}$, the coding does not change (since second information stream $\{c_1\}$ is not concerned with the block in which the high energy signal is sent). The periodicity provides timing information that can be used to decode the information bits. After observance of a few sequences, the starting point and ending point can be determined, which can provide a certain assurance of timing within that block. Further information relating to timing information will be provided below.

The broadcast signal from the perspective of second information stream generator 508 is illustrated at the bottom portion 718 of the figure. This portion 718 illustrates the combination of the two information schemes $\{b_1\}$, $\{c_1\}$, however, this is not to suggest that the two information schemes are combined; these streams are still independent schemes and the combination is shown for explanatory purposes only.

Thus, second information stream generator 508 is not concerned, and does not need to be aware, of the particular subgroup chosen by first information stream generator 506. This is because second information stream generator 508 is concerned only with the tone-symbol location, not the group in which the tone-symbol might be located.

Figure 8:
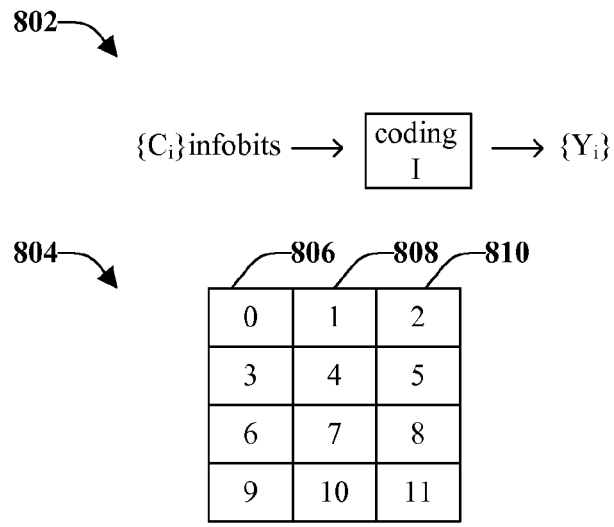
FIG. 8 illustrates a coding "I" that can determine a sequence of information bits.

In accordance with some aspects, information schemes $\{b_1\}$ and $\{c_1\}$ can be thought of in different terms. Coding is a mapping of information bits to a signaling position. These information schemes $\{b_1\}$ and $\{c_1\}$ can be thought of as information bits. Over time, there can be a multitude of $\{c_1\}$ information bits sent. There can also be a coding "I", which can determine a sequence of $\{Y_i\}$ from $\{c_1\}$, which is a sequence of bits where $\{Y_i\}$ is one bit. The representation of this is illustrated in FIG. 8, at 802.

To continue the above example, at 804 illustrated is a broadcast signal that has three symbol periods 806, 808, 810 of four degrees of freedom each. If the number (e.g., 0, 1, 3, . . . , 11) of the degree of freedom is provided, it indicates where the signaling is to occur. Thus, $\{Y_i\}$ can be a sequence of $Y_0, Y_1, Y_2, Y_3, \ldots Y_{11}$, which can repeat based on the periodicity. Thus, any particular $\{Y_i\}$ can equal from 0 to 11, in this example.

The separate sequence of information bits $\{b_1\}$ has a different type of coding (e.g., coding "II") that creates a signal $\{X_i\}$. Thus, coding II=$\{X_i\}$. By itself $\{X_i\}$ has some periodicity that might not have anything to do with $\{Y_i\}$. Each $\{X_i\}$ can equal zero up to the number of sub-groups selected by first information stream generator 508. In this example, $\{X_i\}$ can be equal to "0" or "1", wherein "0" represents a first sub-group and "1" represents a second sub-group.

Figure 9:
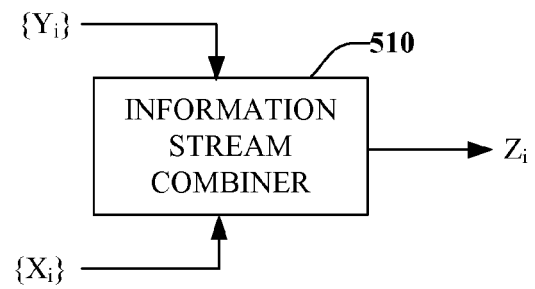
FIG. 9 illustrates combining various information bits to produce a signal $Z_j$.

Information bits $\{X_i\}$ and $\{Y_i\}$ can be combined by information stream combiner 510, as illustrated in FIG. 9 to produce a value $Z_i$ utilizing the following equation, where Q is represents a maximum value of the first information stream:

$$Z_i = \{X_i\} * Q + \{Y_i\} \qquad \text{Equation 1.}$$

Figure 10:
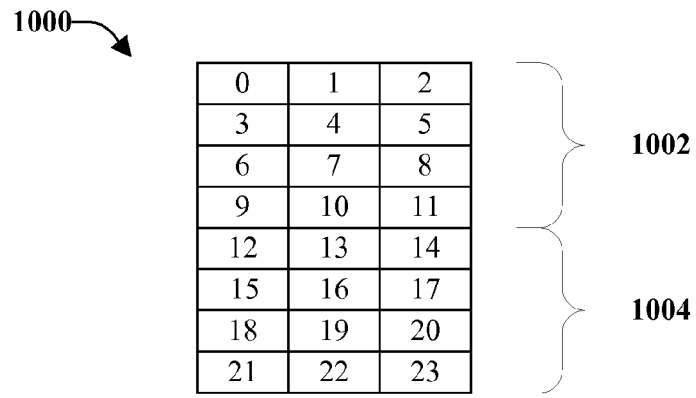
FIG. 10 illustrates a broadcast signal representing value $Z_j$.

The value $Z_i$ can be thought of as a broadcast signal 1000 occupying a larger space, as the example illustrated in FIG. 10. In this example, the degrees of freedom are labeled 0, 1, 2, 3, . . . , 23. The broadcast signal 1000 can be divided into two or more blocks or subgroups 1002 and 1004 (such as by first information stream generator 506), each containing 12 tones (which is the value of Q for this example).

In the illustrated example $\{X_i\}$ is equal to "0" for subgroup 1002 and $\{X_i\}$ is equal to 1 for subgroup 1004. Utilizing Equation 1, if $\{X_i\}$ is equal to "0", then $Z_i$ is equal to $\{Y_i\}$, which is the up space or first subgroup 1002. If, however, $\{X_i\}$ is equal to "1", then the starting point is degree of freedom "12" in the lower space or second subgroup 1104. Thus, $\{X_i\}$ indicates which block or subgroup was chosen and $\{Y_i\}$ indicates the location within the block, which allows for independent coding even though the separate coding schemes might be combined to transmit the information. It should be noted that partitioning can be performed differently than that shown and described.

Referring back to FIG. 5, a memory 512 can be operatively coupled to sender 502 to encode information in a beacon signal. Memory 512 can store information and/or retain instructions relating to generating a first subset of broadcast information bits and a second subset of broadcast information bits, such as in a predetermined manner. Memory 512 can further store information relating to partitioning a set of bandwidth degrees of freedom into two or more subsets. Further information stored by memory 512 can relate to deciding which subset to use, which can be a function of the first subset of broadcast information bits. Additionally, memory 512 can store information relating to choosing one or more bandwidth degrees of freedom in the subset, which can be a function of the second subset of broadcast information bits.

Memory 512 can further retain instructions for transmitting or sending the chosen one or more bandwidth. The first and the at least second subset of information can be sent at a high energy as compared to other information, which can be transmitted at a lower energy. The first and second subsets can be disjoint subsets of the set of broadcast information bits. The subject might be disjoint from each other. In accordance with some aspects, the information sent can be related to peer-to-peer communication. Other information that can be stored by memory 512 can be a periodicity, or how often to repeat a sequence of a first stream $\{b_1\}$ and/or a second stream $\{c_1\}$ of information bits.

In accordance with some aspects, memory 512 can retain instructions for transmitting the beacon signal at a power in each selected bandwidth degree of freedom that is X dB higher than an average transmission power used to transmit other beacon signals. X can be at least 10 dB. Memory 512 can further retain instructions for partitioning the two or more subsets of bandwidth degrees of freedom in a predetermined manner and independently of the set of broadcast information bits.

Alternatively or additionally, memory 512 can retain instructions relating to determining a first value for a first information stream and determining a second value for a second information stream. The determinations can be performed independently. The second value can provide a timing sequence that might repeat at a different interval than a timing sequence of the first value. Further instructions can relate to combining the first and second value to produce a composite value and transmitting a waveform as a function of the composite value. The waveform can include a high energy beacon signal wherein a transmission power of the beacon signal per degree of freedom about 10 dB (or more) higher than a transmission power of other sent signals.

Alternatively or additionally, memory 512 can store information and/or retain instructions relating to determining a first coding scheme $\{b_i\}$; determining a second coding scheme $\{c_i\}$, which can be performed independently. The second coding scheme $\{c_1\}$ can provide a timing sequence that might repeat at a different interval than a timing sequence of first coding scheme $\{b_i\}$. Memory 512 can further retain instructions relating to combining the first coding scheme $\{b_i\}$ and the second coding scheme $\{c_i\}$ for transmission to a mobile device in a single beacon signal burst. The single beacon signal burst can be transmitted at a high energy as compared to other signal burst. Memory 512 can retain instructions for creating a signal $\{X_i\}$ from the first coding scheme $\{b_i\}$ and creating a sequence of $\{Y_i\}$ bits from the second coding scheme $\{c_1\}$. In accordance with some aspects, memory 512 can retain instructions for creating a value $Z_i$ from the combination of the first coding scheme $\{b_i\}$ and the second coding scheme $\{c_i\}$, wherein $Z_i$ represents a broadcast signal occupying a space.

In accordance with some aspects, memory 512 can store information and/or retain instructions relating to selectively using a portion of frequency tones in a portion of time symbols in which to transmit information. For example, memory 512 can retain instruction relating related to separating a block that represents frequency tone and time symbol into two or more subgroups. The two or more subsets can represent a first information stream. Memory 512 can also retain instructions relating to dividing the subgroups into at least one frequency tone in one time symbol that represents a micro block or second information stream. A change to the first information stream does not change the second information stream and vice versa. In addition, a mapping based on the first information stream and the second information are mutually exclusive on the frequency and the time. Further, memory 512 can retain instructions relating to selecting one of the two or more subgroups as a function of a first information stream and selecting the micro block in which to transmit a signal as a function of a second information stream. Memory 512 can further retains instructions for combining the first information stream and the second information stream before transmitting a high-energy signal that includes both streams.

A processor 514 can be operatively connected to sender 502 (and/or memory 512) to facilitate analysis of information related to updating and verifying broadcast information and/or can be configured to execute the instructions retained in memory 512. Processor 514 can be a processor dedicated to analyzing information to be communicated from sender 502 and/or generating information that can be utilized by first information scheme generator 506, second information stream generator 508 and/or information scheme combiner 510. Additionally or alternatively, processor 514 can be a processor that controls one or more components of system 500, and/or a processor that analyzes information, generates information and/or controls one or more components of system 500.

Figure 11:
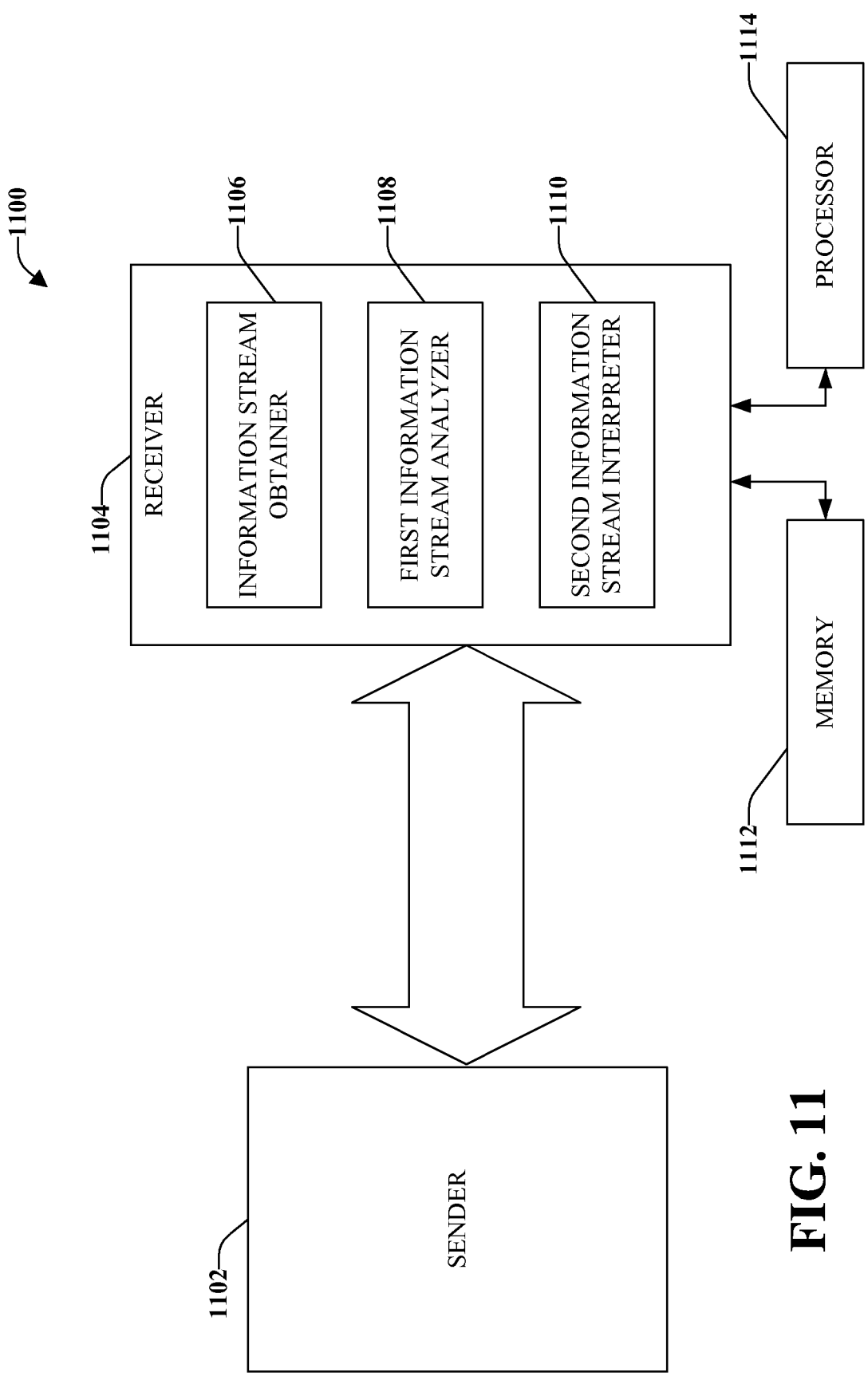
FIG. 11 illustrates a system that facilitates interpreting subsets of information included in a broadcast signal.

With reference now to FIG. 11 illustrated is a system 1100 that facilitates interpreting subsets of information included in a broadcast signal. System 1100 can be configured to receive information streams in a combined format and decipher the combination at substantially the same time at it is received by an intended recipient. Included in system can be a sender 1102 that transmits the information and a receiver 1104 that can be the intended recipient. It should be understood that system 1100 can include more senders 1102 and receivers 1104, however only one of each is illustrated and described for purposes of simplicity.

Sender 1102 can be configured to transmit information that includes at least two streams of information that are independent of each other (e.g., such as combination $Z_i$). For example, a first stream of information can relate to a basic configuration of system 1100 and a second set of information can relate to handoff. Further information relating to basic configuration information will be provided below.

Figure 12:
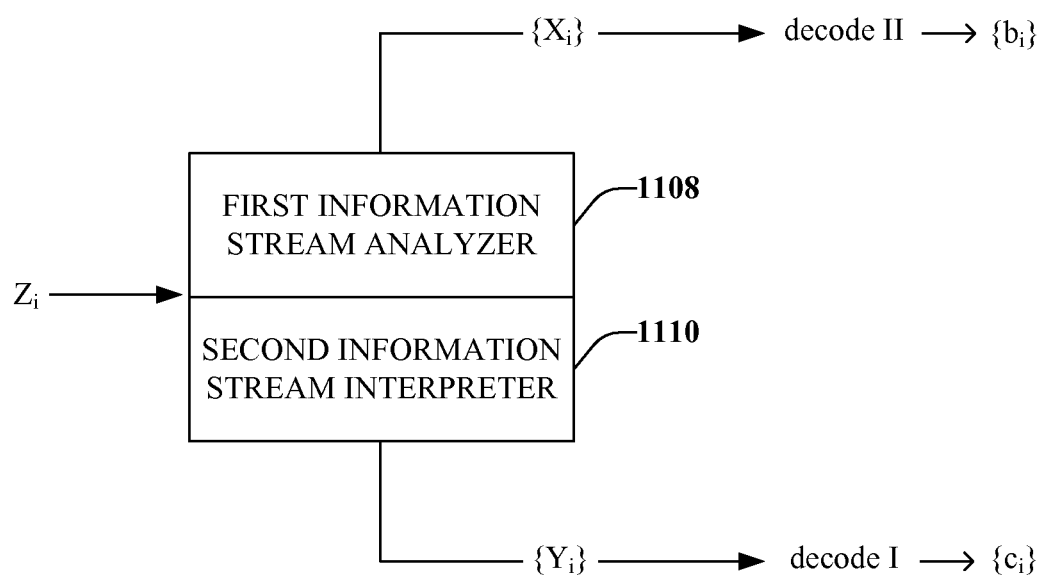
FIG. 12 illustrates an example representation of decoding a broadcast signal.

Receiver 1104 can include an information stream obtainer 1106 that can be configured to receive information that contains one or more information streams or bits of information (e.g., $Z_i$). For example, the information stream can contain a first stream of information, such as $\{b_1\}$, which can be represented as $\{X_i\}$ and a second stream of information, such as $\{c_1\}$, which can be represented as $\{Y_i\}$. At substantially the same time as the broadcast information is obtained, a first information stream analyzer 1108 and a second information stream interpreter 1110 can evaluate the broadcast information and break it into its subcomponents (e.g., first information stream, second information stream, $\{X_i\}$, $\{Y_i\}$ and so forth). An example representation of decoding a broadcast signal is provided in FIG. 12.

In further detail, first information stream analyzer 1108 can be configured to derive the stream relating to $\{b_1\}$, which can be presented as $\{X_i\}$. In order to extract $\{X_i\}$ from the information stream, independent coding can include analyzing the stream with the following equation, where L is the number of degrees of freedom:

$$\hat{X}_i = \text{floor}(Z_i/L) \qquad \text{Equation 2.}$$

Second information stream interpreter 1110 can be configured to extract information bits $\{c_i\}$, represented as $\{Y_i\}$, from the stream information. Such extraction can utilize the following equation.

$$\hat{Y}_i = \text{mod}(Z_i, L) \qquad \text{Equation 3.}$$

Thus, receiver 1104 can be configured to accept $Z_i$, break $Z_i$ into its subcomponents $\{X_i\}$ and $\{Y_i\}$. Additionally, receiver 1104 can be configured to analyze $\{X_i\}$ to decode $\{b_i\}$ and analyze $\{Y_i\}$ to decode $\{c_i\}$. Thus, if the encoding for only one part (e.g., $\{b_i\}$) is changed, it does not have an affect of the encoding for the second part (e.g., $\{c_i\}$). Likewise, if the decoding is changed for one (e.g., $\{b_i\}$), it does not have an impact on the other one (e.g., $\{c_i\}$).

Information included in a subset of the broadcast information might be related to a basic configuration of the system 1100 to provide receiver 1104 the ability to access system 1100. Included in the subset can be one or more of (or combinations of) system timing information, spectrum allocation information, transmission power information, service information, communication technology information, system version (compatibility) information, spectrum band information, service operator information, system loading information, and so forth.

The system timing information communicates the current time to the receiver 1104 (which can be a mobile device). This time information can be measured using a time unit that is specific to the underlying wireless communication system. For example, the time unit can be a function of the transmission symbol period of system 1100. The time information can also be given using a commonly used time unit (e.g., second, millisecond, and so forth). In this case, the time can be given by the usual year-month-day-hour-minute-second formation, which is not specific to the underlying wireless communication system 1100.

The spectrum allocation information can indicate whether the allocation is a Frequency Division Duplex (FDD) system, a Time Division Duplex (TTD) system or another type of allocation. In addition, the spectrum allocation information can include the frequency of the designated carriers and/or the frequency distance between the designated downlink and uplink carriers in a FDD system.

The transmission power information can include the current transmission power and/or the maximum transmission power capability of the sender 1102 (which can be a base station). The service information can include the type of service provided in the current spectrum band (e.g., traditional cellular service, peer-to-peer ad hoc network service, cognitive radio service, and so forth). The communication technology information can include information relating to the air interface technology used in the current spectrum band (e.g., Code Division Multiple Access (CDMA), Orthogonal Frequency Division Multiple Access (OFDMA), Global System for Mobile Communication (GSM), and others.)

The system version (compatibility) information can include a vendor's identifier, a software release version number and/or other information relating to the software version. The version information can be used to determine the compatibility between sender 1102 and receiver 1104.

Information relating to the spectrum band can identify other spectrum bands that might provide services in the geographical area. The information about the service operator (and sender 1102) can include a name of the service operator, a geographical location of sender 1102, as well as other information.

Additionally or alternatively, the first subset might also include other time-varying information, such as loading information of the current spectrum band and/or other spectrum bands. The loading information might include the loading of the traffic channels, which can be measured by the utilization of the bandwidth and/or power of the traffic channels. Also included can be the loading of MAC states, which might be measured by the number of active mobile devices currently in system 1100. Loading information can also relate to the loading of the access channels, which may be represented as a priority threshold so that only the receiver 1104 whose priority exceeds the threshold can access the sender 1102. The loading information might vary over time for a given sender 1102.

In accordance with some aspects, the first subset of broadcast information might include system information relating to neighboring service base stations. For example, sender 1102 might advertise the available service provided by an adjacent base station so that receiver 1104 can tune to the adjacent base station that can provide a more appealing service for that receiver 1104. Additionally or alternatively, sender 1102 might broadcast the loading information of an adjacent base station.

A memory 1112 can be operatively coupled to receiver 1102 and can store information and/or retain instructions relating to deciphering information received in a communication and/or breaking the received communication into subcomponents of information. Memory 1112 can store information relating to the information included in each subcomponent.

In accordance with some aspects, memory 1112 can retain instructions relating to selectively decoding information received in a beacon signal. The instructions can include receiving a beacon signal, which can be identified as a beacon signal sent at a high energy as compared to other received beacon signals. The beacon signal can include one or more bandwidth degrees of freedom. The instructions can further include determining which bandwidth degree of freedom was received from a subset of degrees of freedom and deciding which subset from at least two subsets was received. Memory 1112 can further retain instructions relating to reconstructing a set of bandwidth degrees of freedom from the two or more subsets of information included in the beacon signal, wherein the subsets might be disjoint. The information in the first subset can relate to peer-to-peer communication or it can relate to other information. The memory 1112 can further retain instructions relating to identifying the beacon signal as being received having a power in each selected bandwidth degree of freedom that is X dB higher than an average transmission power used to transmit other signals. X is at least 10 dB.

Additionally, memory 1112 can retain instructions relating to selectively determining portion of frequency and a portion of time in which an information signal was received. The instructions can include receiving a signal that includes a set of frequency tones in a set of time symbols, ascertaining a micro block in which the signal was received and determining a subgroup that contains the micro block and identifying a block that includes at least two subgroups. The subgroup might have been selected as a function of a first information stream and the micro block might have been selected as a function of a second information stream. A mapping based on the first information stream and the second information are mutually exclusive on the frequency and the time. That is to say, a change to the first information stream does not change the second information stream and vice versa. The instructions can further relate to analyzing the first information stream utilizing the equation $\hat{X}_i = \text{floor}(Z_i/L)$. Also, the instructions can relate to analyzing the second information stream utilizing the equation $\hat{Y}_i = \text{mod}(Z_i, L)$.

Additionally or alternatively, memory 1112 can retain instructions relating to receiving a waveform that includes a high-energy beacon signal. The waveform can be a function of a composite value that represents a first value and a second value. Memory 1112 can further retain information related to independently decode the first value to obtain a first subset of information and independently decoding the second value to obtain a second subset of information. The second value can provide a timing sequence that might repeat at a different interval than a timing sequence of the first value. Receiving the waveform can include identifying the beacon signal burst as being received at a high energy as compared to other received beacon signal bursts.

In accordance with some aspects, system 1110 can selectively decode information received in a beacon signal. Memory 1112 can retain instructions relating to receiving a single beacon signal burst that includes a first coding scheme $\{b_i\}$ and a second coding scheme $\{c_i\}$. The single beacon signal burst might be identified since it can be received at a high energy as compared to other received beacon signal bursts. The single beacon signal burst can include a value $Z_i$ that is a combination of the first coding scheme $\{b_i\}$ and the second coding scheme $\{c_i\}$, wherein $Z_i$ represents a broadcast signal occupying a space. The first coding scheme $\{b_i\}$ can be decoded to obtain a first subset of information and the second coding scheme $\{c_i\}$ can be decoded to obtain a second subset of information. The decoding of the first coding scheme $\{b_i\}$ and decoding the second coding scheme $\{c_i\}$ can be performed independently. The second coding scheme $\{c_1\}$ can have a timing sequence that might repeat at a different interval than a timing sequence of first coding scheme $\{b_i\}$. Memory 1112 can further retain instructions relating to interpreting a signal $\{X_i\}$ from the first coding scheme $\{b_i\}$ and interpreting a sequence of $\{Y_i\}$ bits from the second coding scheme $\{c_1\}$.

A processor 1114 can be operatively connected to receiver 1104 (and/or memory 1112) to facilitate analysis of received information and/or can be configured to execute the instructions retained in memory 1112. Processor 1114 can be a processor dedicated to analyzing information received from sender 1102 and/or generating information that can be utilized by information stream obtainer 1106, first information stream analyzer 1108 and/or second information scheme interpreter 1110. Additionally or alternatively, processor 1114 can be a processor that controls one or more components of system 1100, and/or a processor that analyzes information, generates information and/or controls one or more components of system 1100.

Figure 13:
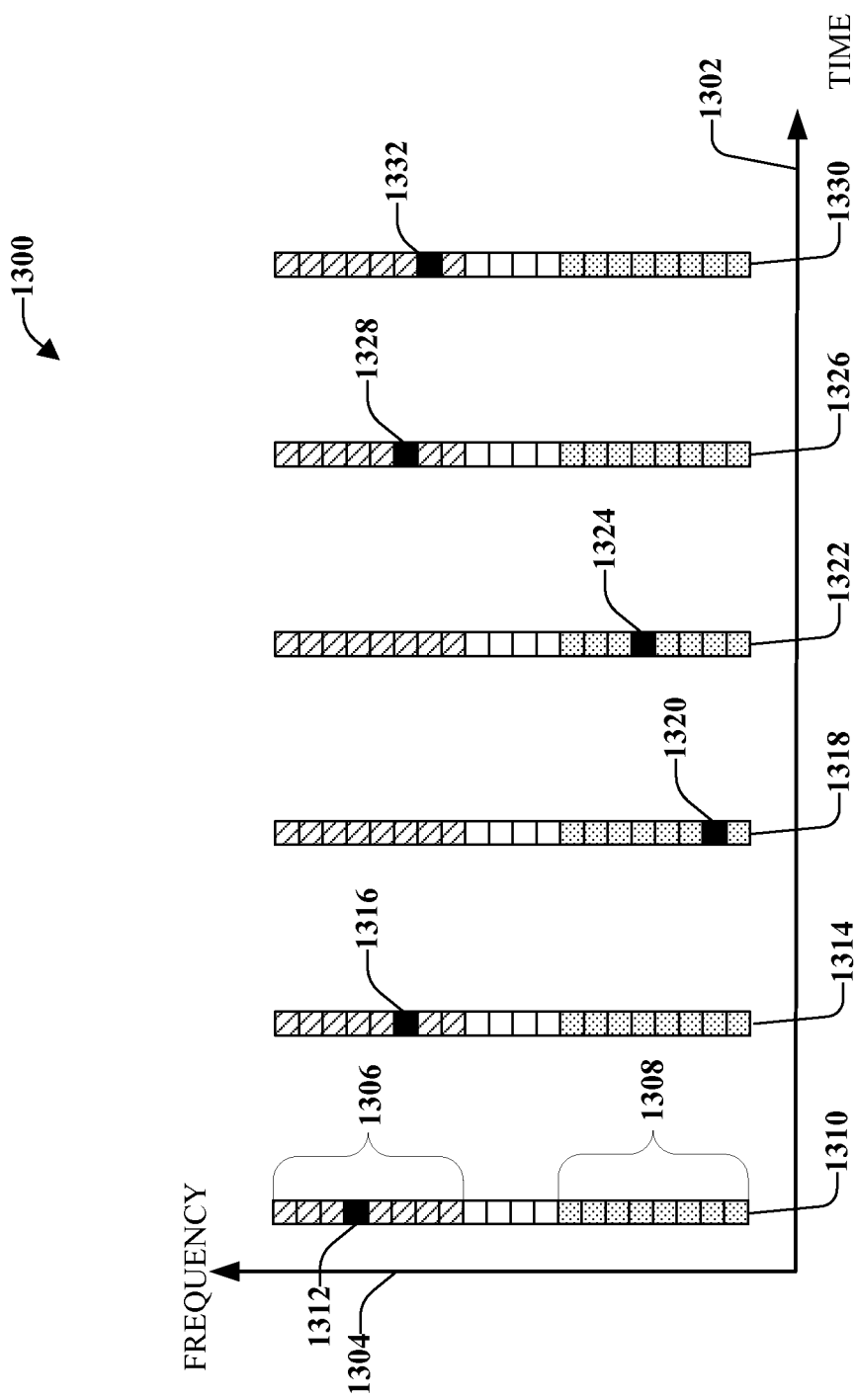
FIG. 13 illustrates an example beacon signal when a second subset of broadcast information is repeatedly broadcast with a relatively short broadcasting cycle time.

FIG. 13 illustrates an example beacon signal when a second subset of broadcast information is repeatedly broadcast with a relatively short broadcasting cycle time. The horizontal line 1302 represents time and the vertical line 1304 represents frequency. In this example, in a beacon burst, the degrees of freedom are divided into two bandwidth subsets: subset 1306 with index (e.g., $\{X_i\}$) "0" and subset 1308 with index (e.g., $\{X_i\}$) "1". Each bandwidth subset 1306, 1308 in this example contains eight tone symbols and the relative indices (e.g., $\{Y_i\}$) are 0, 1, . . . 7, from the top to the bottom.

The second sequence of information bits corresponding to the second subset 1308 includes a fixed and finite set of bits, which are repeatedly sent in three consecutive beacon bursts. For example, the second sequence of information bits determines three relative indices (e.g., $\{Y_i\}$) r1, r2 and r3. In beacon burst 1310, r1 is used to determine the relative index of the beacon symbol (relative index=3 in the example), illustrated at 1312. In beacon burst 1314, r2 is used to determine the relative index of the beacon symbol (relative index=5 in the example), illustrated at 1316. In beacon burst 1318, r3 is used to determine the relative index of the beacon symbol (relative index=6 in the example), illustrated at 1320. The pattern repeats over time: in beacon burst 1322, r1 is used to determine the relative index of the beacon symbol (relative index=3 in the example), illustrated at 1324. In beacon burst 1326, r2 is used to determine the relative index of the beacon symbol (relative index=5 in the example), illustrated at 1328. In beacon burst 1330, r3 is used to determine the relative index of the beacon symbol relative index=6 in the example) illustrated at 1332, and so forth.

Meanwhile, the first sequence of information bits corresponding to the first subset includes many more bits. In particular, the first sequence of information bits determines a sequence of bandwidth subset index (e.g., $\{X_i\}$) m1, m2, m3, m4, m5, m6 and so forth. In beacon burst 1310, m1 is used to determine the index of the bandwidth subset (subset index=0 in the example. In beacon burst 1314, m2 is used to determine the index of the bandwidth subset (subset index=0 in the example). In beacon burst 1318, m3 is used to determine the index of the bandwidth subset (subset index=1 in the example). In beacon burst 1322, m4 is used to determine the index of the bandwidth subset (subset index=1 in the example). In beacon burst 1326, m5 is used to determine the index of the bandwidth subset (subset index=0 in the example). In beacon burst 1330, m6 is used to determine the index of the bandwidth subset (subset index=0 in the example). Note that while the relative indices r1, r2, r3 repeat in a short broadcasting cycle, the subset indices m1, m2, . . . , may repeat in a much longer broadcasting cycle or may not completely repeat at all.

In one example of a system using approximately 1.25 MHz bandwidth, the total bandwidth is divided into 113 tones. A beacon burst includes one or two OFDM symbol periods. In a beacon burst, the tones are divided into two or three bandwidth subsets, each of which includes 37 tone symbols in a given OFDM symbol period (e.g., M=2 or 3, and K=37). The relative indices repeat every 18 consecutive beacon bursts.

Alternatively, not illustrated, it is possible that the first subset of broadcast information is conveyed with the relative indices while the second subset of broadcast information is conveyed with the bandwidth subset indices.

Figure 14:
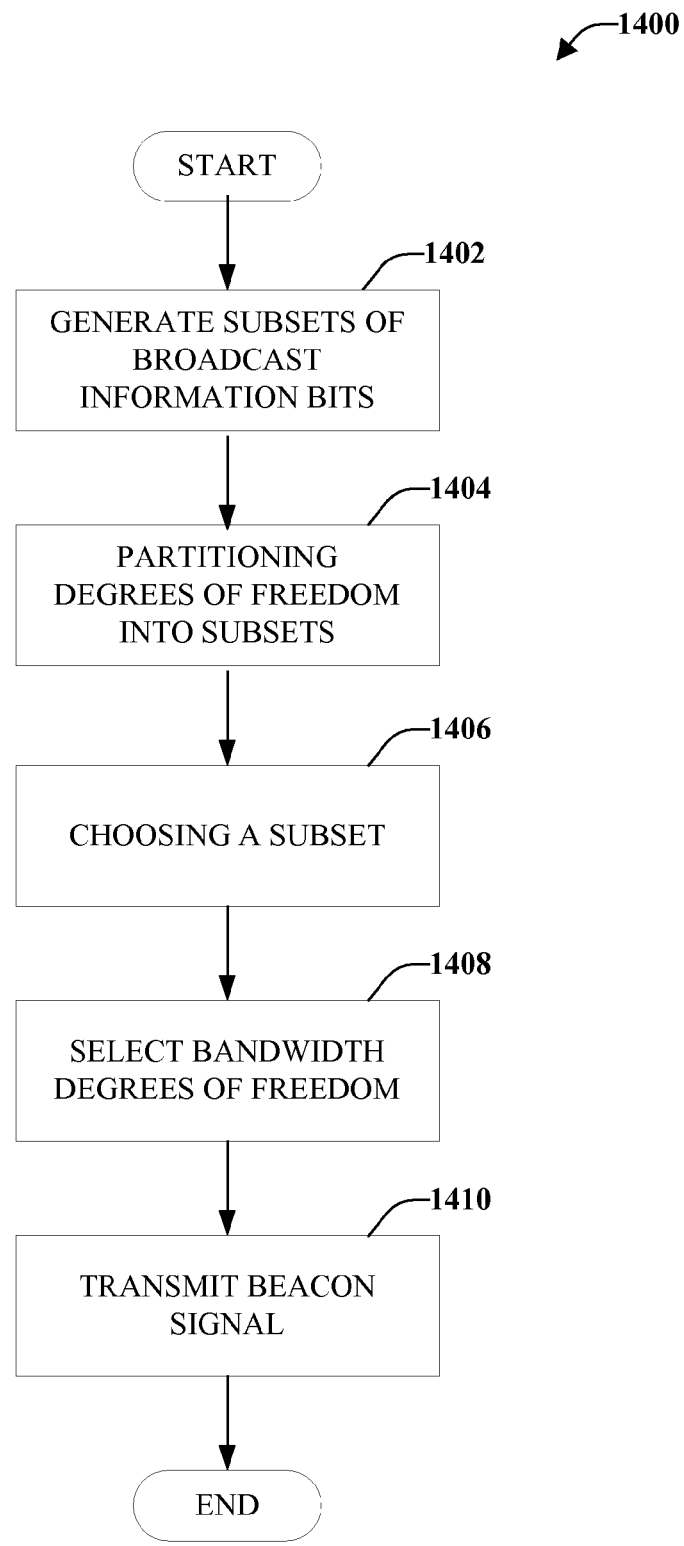
FIG. 14 illustrates an example method of transmitting a set of broadcast information bits in accordance with the disclosed aspects.

With reference now to FIG. 14, illustrated is an example method 1400 of transmitting a set of broadcast information bits in a broadcast signal implemented in accordance with the disclosed aspects. While, for purposes of simplicity of explanation, the methods in this detailed description are shown and described as a series of acts, it is to be understood and appreciated that the methods are not limited by the order of acts, as some acts may, in accordance with one or more aspects, occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a methodology in accordance with one or more aspects.

In a given beacon burst, the beacon symbol uses a degree of freedom out of all the available degrees of freedom to convey the first and the second subset of broadcast information. The chosen degree of freedom belongs to one of the bandwidth subsets. In a given beacon burst, the first subset of broadcast information is encoded to choose which bandwidth subset (e.g., block) the beacon signal shall use, while the second subset of broadcast information is encoded to determine which degree of freedom the beacon signal shall use within the chosen bandwidth subset.

The first subset of broadcast information may be represented by a first sequence of information bits and the second subset of broadcast information may be represented by a second sequence of information bits. The first subset can be related to a basic configuration, which may include spectrum configuration information for peer-to-peer communications devices to determine how to use a particular band of spectrum. The band of spectrum may be the same as or different from the band in which the broadcast information is sent. The spectrum configuration information may instruct peer-to-peer communications devices whether the particular band of spectrum can be used for peer-to-peer communications or not, and if so, the power budget for peer-to-peer communications transmissions. The second subset can be related to handoff, for example. In accordance with some aspects, the second subset does not include information related to peer-to-peer communications. It should be understood that the sequences of information bits might include broadcast information as well as certain redundancy bits (e.g., parity check bits) for coding protection. In a given beacon burst, a portion of the first sequence of information bits and a portion of the second sequence of information bits may be sent.

Method 1400 can facilitate transmission of a set of broadcast information bits using a predetermined set of bandwidth degrees of freedom and starts, at 1402, with generation of a first subset of broadcast information bits and a second subset of broadcast information bits. The two subsets of broadcast information bits can be generated from a multitude of broadcast information bits and can be generated in a predetermined manner. At 1404, a predetermined set of bandwidth degrees of freedom are partitioned into two or more subsets. Each subset can include a multitude of bandwidth degrees of freedom.

At 1406, a subset from the at least two or more subsets of bandwidth degrees of freedom is chosen of broadcast information bits as a function of the first subset of broadcast information bits. The subgroups can be contiguous or remote from each other. In accordance with some aspects, the first and second subsets of broadcast information bits are disjoint subsets of the set of broadcast information bits. The subgroups can be partitioned into a multiple number of subsets or degrees of freedom. Each bandwidth degree of freedom in a tone can be an OFDM symbol.

At 1408, at least one of the bandwidth degrees of freedom in the chosen subset is selected as a function of the second subset of broadcast information bits. The beacon signal is transmitted, at 1408, during the selected subset bandwidth degree of freedom. In accordance with some aspects, the beacon signal can be transmitted at substantially the same time as other signals. For example, the beacon signal may be superposed to other signals. The beacon symbol can be transmitted at a high energy as compared to other beacon symbols. The beacon signal can comprises a sequence of blocks that occur in time.

In accordance with some aspects, at least one subset of the two or more subsets of broadcast information bits includes control information to be received by a wireless device for peer-to-peer communication in which a wireless device communicates directly with another wireless device. The control information can include one or more of a frequency band location information, whether peer-to-peer communication is allowed in the frequency band, a control parameter that controls a maximum transmission power to be used by the wireless device for peer-to-peer communications, or combinations thereof.

Determining which one of two or more bandwidth subsets to use, at 1402, and determining which degree of freedom within the chosen bandwidth subsets to transmit the beacon symbol, at 1404, can be performed independently. For example purposes and not limitation, the available tone symbols in a given beacon burst are numbered with an absolute index a=0, 1, . . . , N−1, where N is an integer that represents the total number of available tone symbols. In each bandwidth subset, the tone symbols are numbered with a relative index r=0, 1, . . . , K, where K is an integer that represents the number of tone symbols in each bandwidth subset. In this example, the number of tone symbols in each bandwidth subset is the same. Furthermore, the absolute index of the first tone symbol of each bandwidth subset (e.g., the tone symbol whose relative index is equal to 0) is given by s=$s_0, s_1, \ldots, s_{M-1}$, where M is an integer that represents the number of bandwidth subsets. Therefore, for a given tone symbol, the absolute index (a) is related to the index of the bandwidth subset to which the tone symbol belongs (m) and the relative index (r) as follows:

$$a = s_m + r \qquad \text{Equation 4.}$$

At 1402, the index of the bandwidth subset (m) can be determined by the sequence of information of the first subset of broadcast information. At 1404, the relative index (r) can be determined by the sequence of information of the second subset of broadcast information. It should be noted that the determination of m, at 1402, and the determination of r, at 1404, can be performed independently. From m and r, at 1408, the absolute index (a) is calculated for the beacon symbol. From one beacon burst to another, the beacon symbols might use different bandwidth subsets since different portions of the sequence of information are used to determine m.

Encoding and decoding of the first and second subsets of broadcast information can be performed independently in accordance with the disclosed aspects. For example, when the encoding scheme of the first subset of broadcast information is changed, there is no impact on the encoding and decoding of the second subset of broadcast information, and vice versa. Additionally, since m varies over time, the beacon symbol originates from different bandwidth subsets, thereby increasing diversity.

Figure 15:
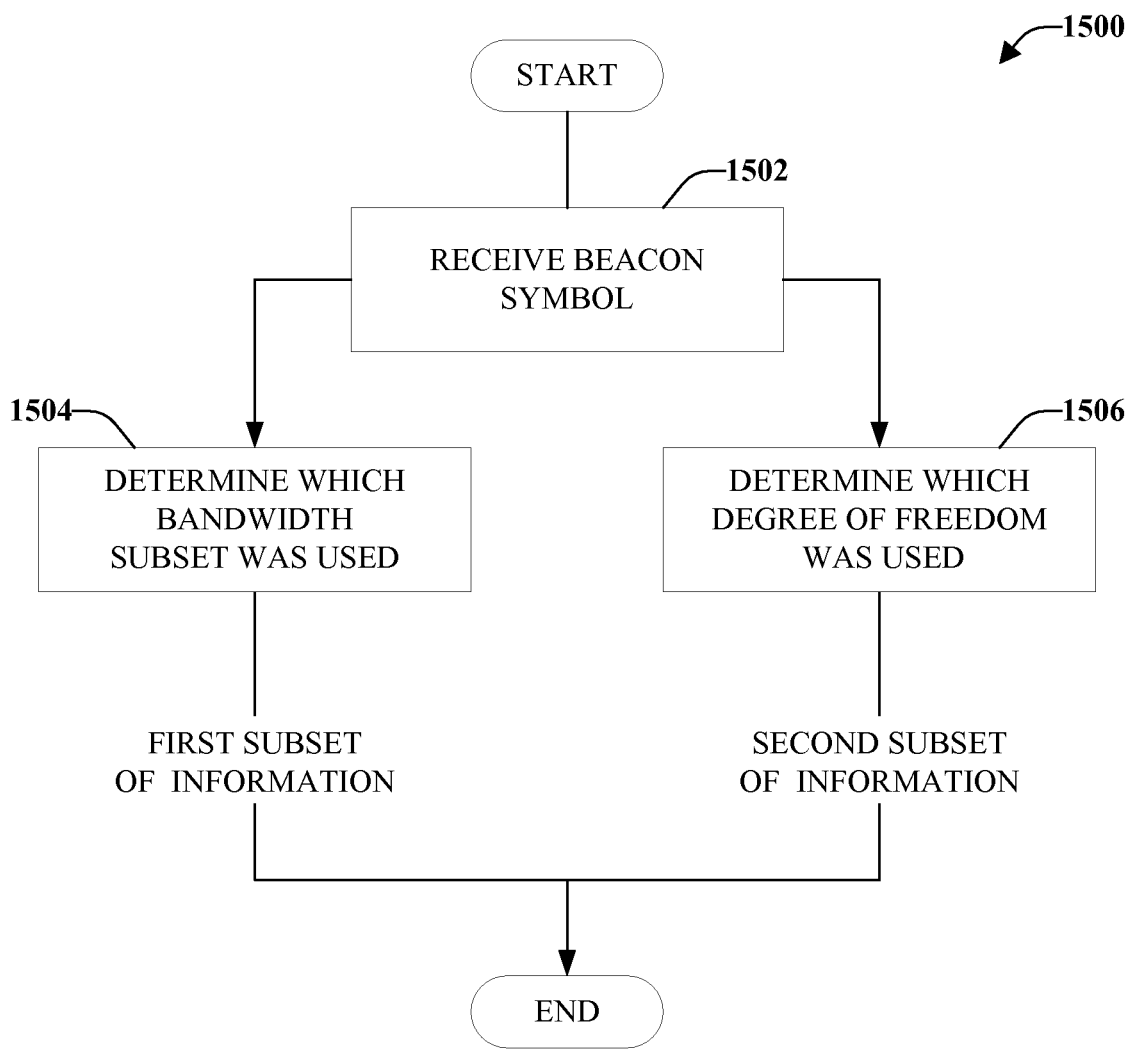
FIG. 15 illustrates an example method of decoding two subsets of broadcast information from a beacon symbol in accordance with various aspects.

FIG. 15 illustrates an example method 1500 of decoding two subsets of broadcast information from a beacon symbol in accordance with various aspects. The beacon symbol can comprise a sequence of blocks that occur in time. Method 1500 starts, at 1502, with receipt of a signal in a time period of a beacon burst. The signal can be received at a high energy as compared to other received signals. In addition, the signal can be received at substantially the same time as other signals. The degree of freedom in which the beacon symbol was transmitted can be determined at substantially the same time as receipt of the signal. To determine the degree of freedom, the fact that the per degree of freedom transmission power of the beacon symbol is much higher than average is utilized.

At 1504, it is determined which one of the predetermined multiple bandwidth subsets to which the beacon symbol belongs (e.g., in which it was received). The degree of freedom within the chosen bandwidth subset in which the beacon symbol is received is determined, at 1506. The results of 1504 and 1506 can be used to reconstruct the first and second subsets of broadcast information, respectively. The first subset can be related to a basic configuration and the second subset can be related to handoff.

It should be understood that determining which one of the predetermined multiple bandwidth subsets to which the beacon symbol belongs, at 1504, and determining the degree of freedom within the chosen bandwidth subset in which the beacon symbol is transmitted, at 1506, can be performed independently. Continuing the example of FIG. 14, the absolute index (a) of the received beacon symbol is detected. Since the bandwidth subsets are disjoint in this example, the indices m and r can be uniquely derived from a. Once the bandwidth subsets are predetermined, the determination of m depends on which bandwidth subset the absolute index (a) falls into, and, therefore, is independent of the determination of r.

Figure 16:
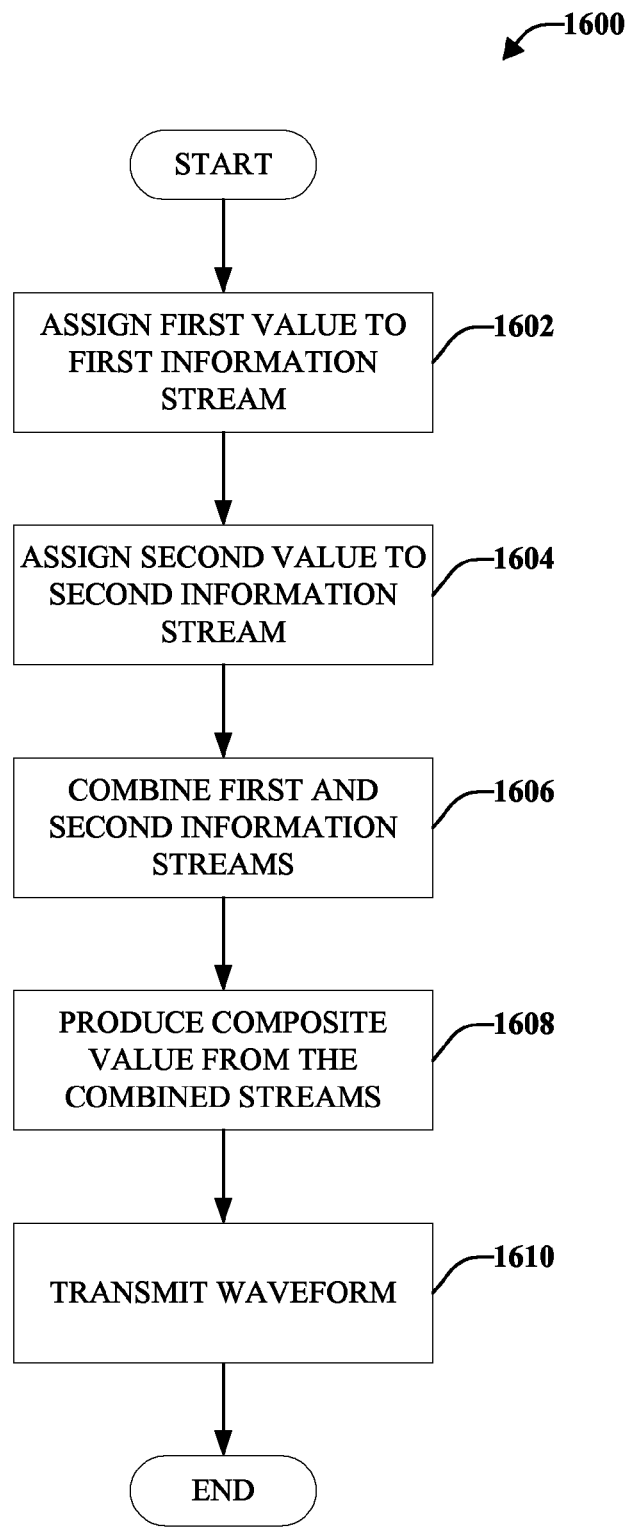
FIG. 16 illustrates an example method of operating a base station.

FIG. 16 illustrates an example method 1600 of operating a base station. Method 1600 starts, at 1602, where a first value is assigned to a first information stream. The first information stream can represent a first subset of broadcast information. Assigning the first value to the first information stream can comprise coding each of a multitude of information bits $\{c_i\}$ and determining a sequence of bits $\{Y_i\}$ from $\{c_i\}$, wherein $\{Y_i\}$ represents a single bit. The sequence of $\{Y_i\}$ bits can be based on a periodicity.

At 1604, a second value is assigned to a second information stream. The second information stream can represent a second subset of broadcast information. Assigning the value of the second information stream can comprise coding an information bit $\{b_i\}$ and creating a signal $\{X_i\}$ from $\{b_i\}$. The signal $\{X_i\}$ can have a periodicity that is independent of the periodicity of the sequence of $\{Y_i\}$ bits.

The first information stream and the second information stream can be combined, at 1606. This combination allows both information streams to be sent at substantially the same time, if desired. However, the values for each stream are different and derived independently. Combining the first and second information streams can be calculated with equation $(Z_i = \{X_i\} * Q + \{Y_i\})$. In this equation, $\{Y_i\}$ represents the first value assigned to the first information stream, $\{X_i\}$ represents the second value assigned to the second information stream, and Q represents a maximum value of the first information stream. The combined information streams can create a broadcast signal that occupies a space that is larger than a space of the first information stream and a space of the second information stream.

Figure 17:
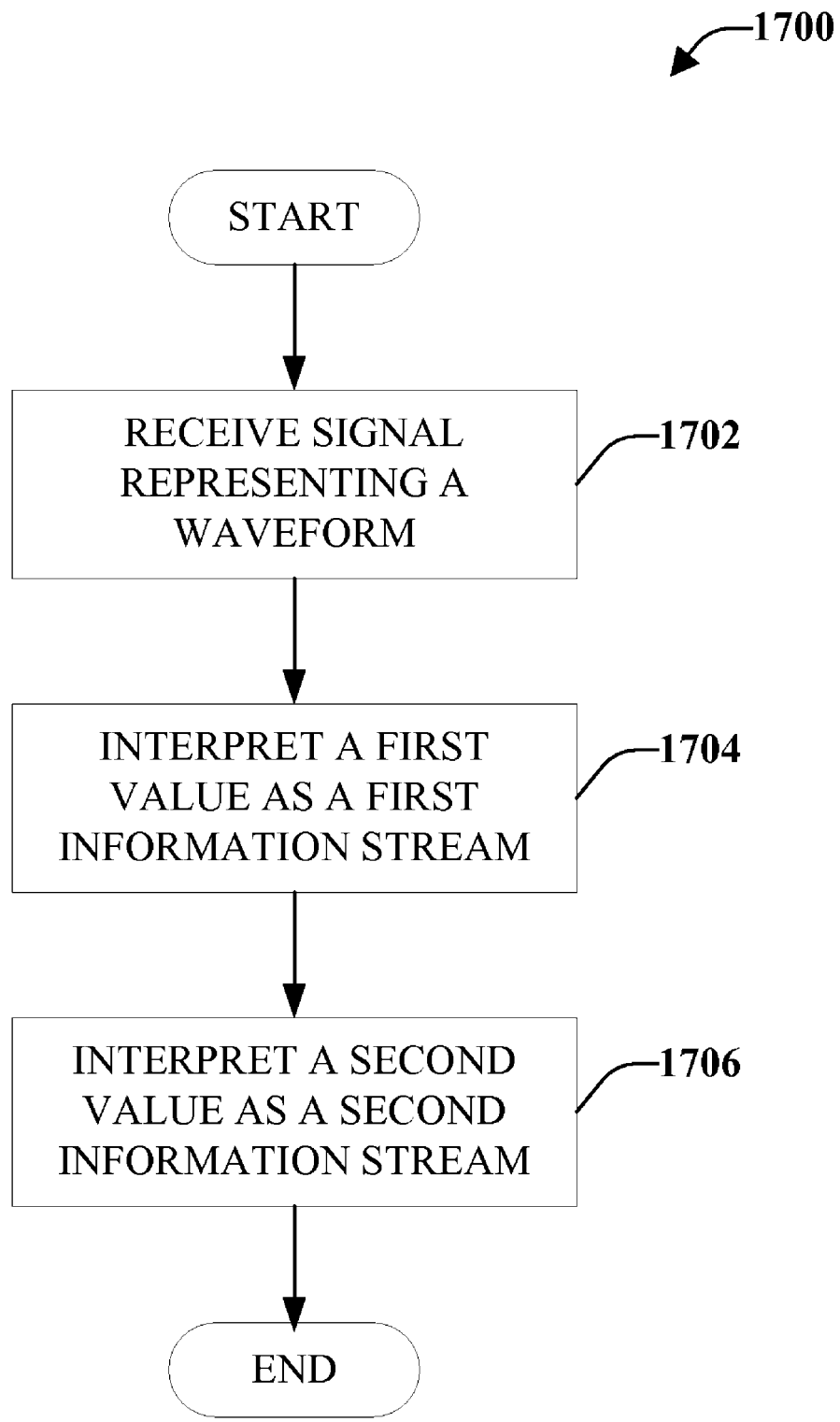
FIG. 17 illustrates an example method that facilitates interpretation of a waveform mapping representation received in a communication.

The combined values or composite value produces a composite value, at 1608. A waveform is transmitted as a function of the composite value, at 1610. The waveform can include a high-energy beacon symbol. The transmission power of the beacon symbol per degree of freedom can be at least 10 dB higher than transmission powers at which other signals are sent. The waveform can occupy a small degree of freedom. An intended recipient can receive the waveform and separate the composite value into its subcomponents (e.g., the first information stream and the second information stream). FIG. 17 illustrates an example method 1700 that facilitates interpretation of a waveform received in a communication. The waveform representation can be received from a sender that utilized the method 1600 discussed with reference to the above figure.

Method 1700 starts, at 1702, when a high-energy beacon signal included in a waveform is received. The received signal can include a combination of a first value and a second value. The combination of the first value and the second value comprises a broadcast signal that occupies a space that is larger than a space of the first information stream and a space of the second information stream. The signal can be received at a high energy and/or can occupy a small degree of freedom. Additionally or alternatively, the signal can be received at substantially the same time as other signals At substantially the same time as receiving the waveform it is parsed into at least two subcomponents or values. At 1704, a first value of a first information stream is identified and, at

1706, a second value of a second information stream is determined. The first information stream can represent a first subset of broadcast information and the second information stream can represent a second subset of broadcast information. The identification and determination of the streams can be performed independently and in any order. Thus, if an encoding and/or a decoding of a stream is changed it does not affect the encoding and/or decoding of the other stream.

Interpreting the first value as a first information stream can include determining a sequence of bits $\{Y_i\}$ included in $\{c_i\}$, where $\{Y_i\}$ represents a single bit and decoding each of a multitude of information bits $\{c_i\}$. Interpreting the second value as a second information stream can include receiving a signal that is a function of $X_i$ included in $\{b_1\}$ and decoding the information bit $\{b_1\}$.

In accordance with some aspects, interpreting the first value comprises decoding a sequence of $\{Y_i\}$ bits and interpreting the second value comprises decoding a signal $\{X_i\}$. The signal $\{X_i\}$ has a periodicity that is independent of a periodicity of the sequence of $\{Y_i\}$ bits.

Figure 18:
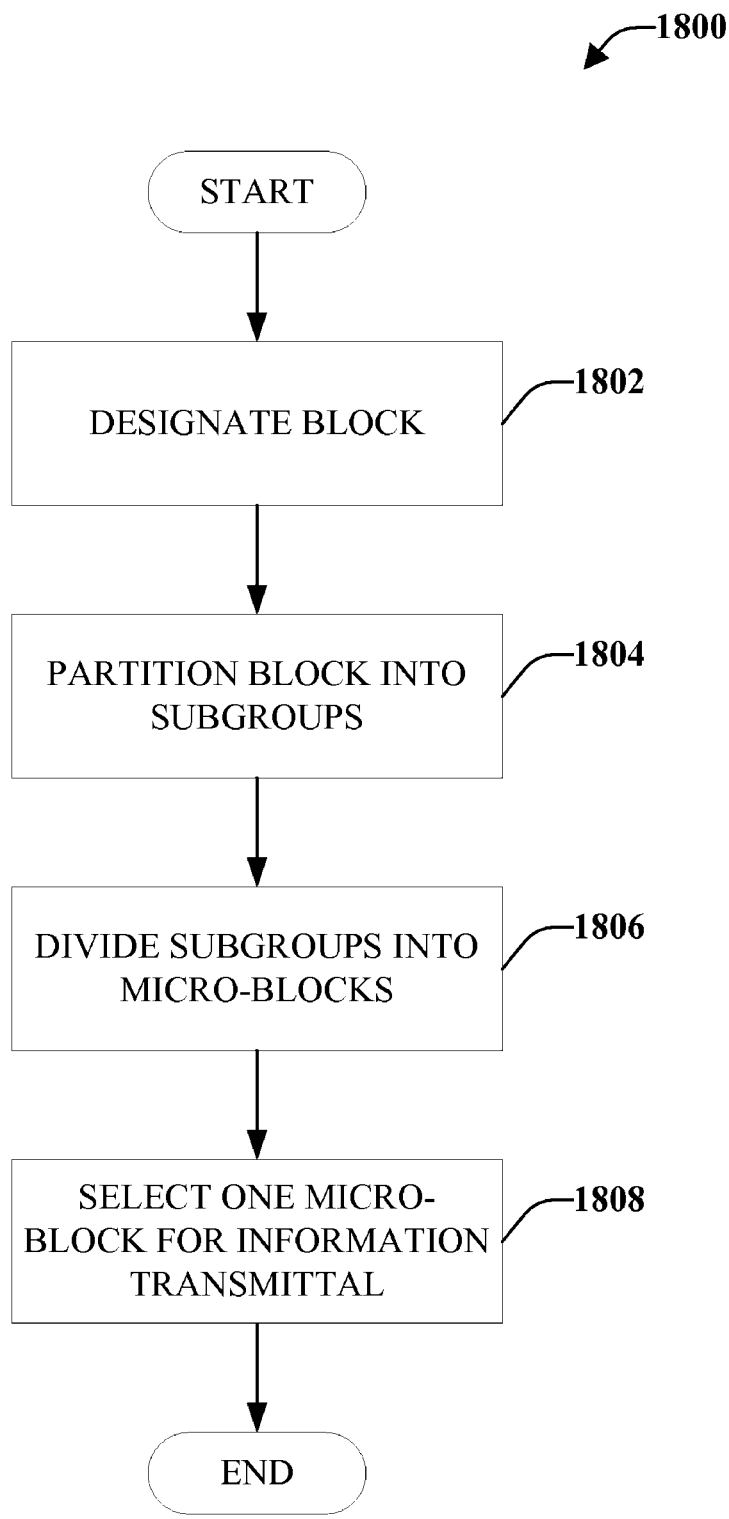
FIG. 18 illustrates an example method that uses a set of frequency tones in a set of time symbols for transmitting information.

FIG. 18 illustrates an example method 1800 that uses a set of frequency tones in a set of time symbols for transmitting information. Different subsets of information might be desired to be sent during a single transmission. The different subsets of information can be intended for the same or different recipients, depending on the applicability of the information to the recipient (e.g., system parameter information, handoff information, and so forth). Method 1800 allows one or more subcomponents of the transmitted information to be modified without affecting the other subcomponents of the information.

At 1802, at least some frequency tones and some time symbols are designated as a block. The block can comprise a set of frequency tones in a set of time symbols. This block can represent a period of time during which information is transmitted and can be repeated over time. The block can be partitioned into two or more subgroups, at 1804. Each subgroup can include a subset of frequency tones in a subset of time symbols. The subgroups can represent a first information stream (e.g., $\{b_1\}$). The subgroups can be next to each other or disjoint from each other. At 1806, the two or more subgroups are divided into micro blocks. Each micro block can include at least one frequency tone in one time symbol. Each micro block can represent a second stream of information (e.g., $\{c_1\}$). The micro blocks do not have to be equally spaced. A mapping can be based on the first and the second information streams and can be mutually exclusive on the frequency and the time. That is to say, changing an information stream does not affect the other information stream. Thus, changing the frequency or a first subcomponent (e.g., subgroup) does not result in a timing (e.g., micro block) or a second subcomponent change.

One of the micro blocks (e.g., degree of freedom) within one of the two or more subgroups is selected for information transmittal, at 1808. The selection of the subgroup and the selection of the micro block represent information included in the transmitted information. The subgroups can be selected as a function of a first information stream and the micro blocks can be selected as a function of a second information stream. In the selected micro block, the information is transmitted at high energy as compared to the non-selected micro blocks.

Figure 19:
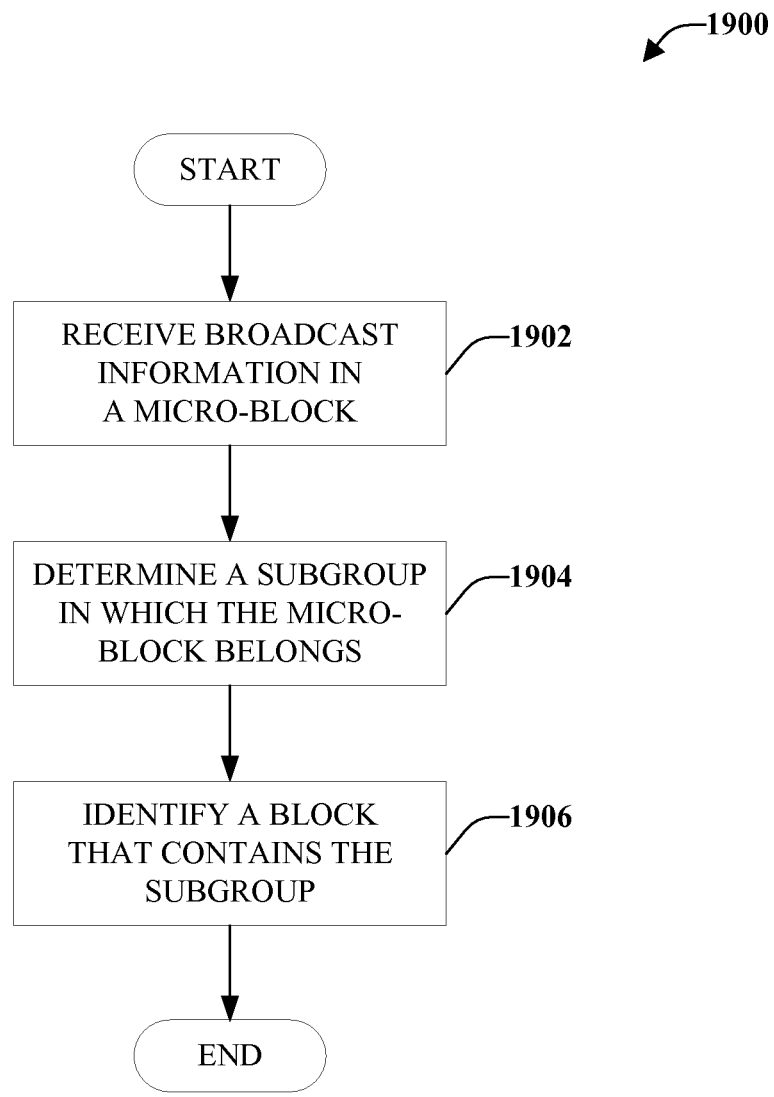
FIG. 19 illustrates an example method for interpretation of a transmitted signal that signifies a frequency tone in a set of time symbols.

FIG. 19 illustrates an example method 1900 for interpretation of a received signal that signifies a set of frequency tones in a set of time symbols. At 1902, broadcast information is received. This broadcast information can be received in a micro block chosen from a block, the micro block can comprise one or more frequency tones in one time symbol. The broadcast information can include two or more subsets of information that were combined in order to send a single signal (e.g., micro block). The location of the information within the signal represents information that should be decoded by the receiver of the information in order to fully appreciate the received signal. Decoding the information involves determining, at 1904, a subgroup from at least two subgroups in which the micro block belongs and identifying, at 1906, a block that contains the subgroup. The block can include a set of frequency tones in a set of time symbols. The subgroup can represent or be selected as a function of a first information stream and the micro block can represent or be selected as function of a second information stream. A mapping based on the first and the second information streams are mutually exclusive on the frequency and the time. The determination of the subgroup and the micro block conveys information that is included in the transmitted information. Decoding the first information stream can be performed without affecting a decoding of the second information stream.

In accordance with some aspects, in a given beacon bust, which degree of freedom is used to transmit the beacon symbol conveys information. Each beacon burst in effects sends an information symbol whose value is equal to one element in a predetermined alphabet table. Suppose the K degrees of freedom are available for the beacon signal in a beacon burst and that the degrees of freedom are indexed as 0, 1, K−1. In an example, the alphabet table is given as 0, 1, . . . , K−1: the value of the information symbol is equal to the index of the degree of freedom used by the beacon symbol. In this case, the size of the alphabet table is equal to K. In another example, the size of the alphabet table may be smaller than the number of degrees of freedom in a beacon burst. For example, the alphabet table is given as 0 and 1: the information symbol can be equal to 0 if the index of the degree of freedom used by the beacon symbol is less than floor (K/2). In another example, the alphabet table is given as 0 and 1: the information symbol can be equal to 0 if the index of the degree of freedom used by the beacon symbol is an even number, and equal to 1 otherwise.

Denote N the size of the alphabet table. In an example, the information symbol in a single beacon burst may be used to send a fixed integer number of broadcast information bits. For example, if N=2, then an information symbol can be used to send 1 bit. In another example, a predetermined number of information symbols, which can be consecutive, may be used to send a fixed integer number of broadcast information bits. For example, if N=3, then two information symbols can together signal 9 distinct values. Eight of those values can be used to send three bits, keeping the last value reserved. Therefore, the sequence of beacon bursts can convey a sequence of broadcast information bits.

In accordance with some examples, the beacon bursts are periodically numbered. For example, referring back to FIG. 2, beacon burst 214 is numbered as 0. Beacon burst 216 is numbered as 1 and beacon burst 218 is numbered as 2. Then, the numbers repeat: beacon burst 220 is numbered as 0, and so forth. This numbering structure may be signaled by the beacon symbols carried in the sequence of beacon bursts.

For example, consider FIG. 2 in which the alphabet table is given as 0 and 1: the information symbol can be equal to 0 if the index of the degree of freedom used by the beacon symbol is less than floor(K/2), and equal to 1 otherwise, where K is the number of the degrees of freedom. In effect, the signaling scheme divides the degrees of freedom into two bandwidth subsets: those whose indices are less than floor(K/2) and those whose indices are greater than or equal to floor (K/2). In a beacon burst, the information symbol is signaled by the selection of which bandwidth subset to use for the beacon symbol. Meanwhile, the degrees of freedom with a bandwidth subset can be indexed with a relative index, and a relative index can be signaled in each beacon burst. In the interval of several beacon bursts, the sequence of the relative indices can be used to provide additional information, including the numbering structure.

The numbering structure is in effect a synchronization structure, and should be used in the example in which a predetermined multiple of information symbols may be used to send a fixed integer number of broadcast information bits. In that case, the numbering structure helps to determine which information symbols should be used together to determine the broadcast information bits. For example, in FIG. 2, suppose that the alphabet size of the information symbol in each beacon burst is 3. The information symbols of beacon bursts 214 and 216 may jointly signal 3 bits, and those of beacon bursts 218 and 220 may jointly signal another 3 bits. The numbering structures assist in identifying the grouping of 214 and 216 so that the receiving devices do not make an error by grouping 216 and 218 together.

In accordance with some aspects, the numbering structure can be derived solely from the sequence of the information symbols observed over time. For example, in the above example, the alphabet size of an information symbol is 3 and, therefore, a pair of information symbols can signal 9 distinct values. Eight of those values are used to signal 3 bits and the last value is reserved or unused. The receiving device can utilize the above structure "blindly" to derive the numbering structure. Specifically, the receiving device can assume a first numbering structure and check the pairs of (214, 216), (218, 220) and so forth, and none of the pairs will have the value that is reserved, from which the receiving device can tell that the assumed numbering structure is correct. On the other hand, the receiving device can also assume a second numbering structure and check the pairs of (216 and 218) and so forth, and by randomness, it is possible that some pairs will have the value that is reserved, from which the receiving device can tell that the assumed numbering structure is incorrect.

Generally, there are two or more steams of information that can be sent utilizing a broadcast signal. The first stream is usually used by most cellular networks and include some parameters such as cell identification, sector identification, transmission power, access power and other information that helps the mobile device to determine the identity of a base station. This first stream include parameters used by the mobile device to determine when it is should access the base station, when it should perform handoff and so forth.

The second stream or type of information can be information used to support both cellular and non-cellular applications. For example, there is a licensed spectrum but it might also be desirable to allow peer-to-peer networks, wherein certain mobile devices can perform ad hoc communication to mitigate going through a base station. However, a challenge associated with allowing the mobile device to randomly establish this type of communication is that a service provider might not have ownership of the spectrum where it is desired to establish the communication. For example, a service provider with which the device is registered might have ownership of a spectrum on the east coast but might not have ownership of a spectrum on the west coast. The service provider that owns the spectrum on the west coast would not want unregistered devices to communicate in its spectrum. Thus, the device needs information from the local service provider before communication can be established.

In another example, today there might be unused spectrum and devices can establish peer-to-peer communications. However, a few years from now, an infrastructure might be built and the owner (e.g., service provider) of that infrastructure (e.g., spectrum) would no longer permit the peer-to-peer communications. Thus, the service provider would want to establish control relating to how the spectrum is used. Thus, the mobile device should obtain this information before it starts to transmit in these locations.

In accordance with some aspects, the information relating how to use the spectrum, which can be referred to as progressive information, can be placed in the second stream, since the first stream can be used for Ultra Mobile Broadband (UMB) information. The progressive information might not be very urgent and, the longer the mobile device listens, the amount of information received will become larger.

Either of the first or the second stream can be encoded with one of the two encoding schemes described previously. For example, the first stream can be encoded as the information bits $\{b_i\}$ while the second stream can be encoded as the information bits $\{c_i\}$. Alternatively, the second stream can be encoded as the information bits $\{b_i\}$ while the first stream can be encoded as the information bits $\{c_i\}$.

Figure 20:
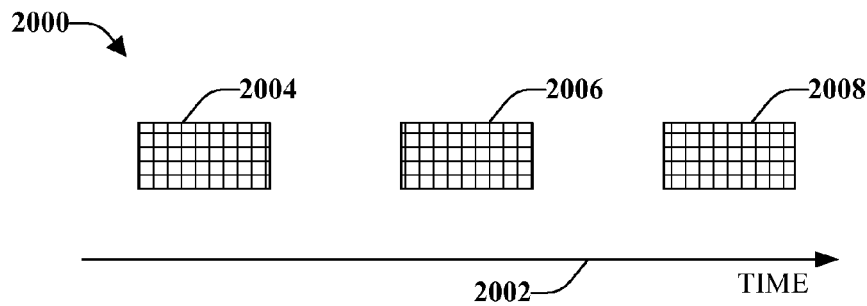
FIG. 20 illustrates a portion of a broadcast message that includes timing information.

With reference now to FIG. 20, illustrated is a portion of a broadcast message 2000 that includes timing (e.g., synchronization) information. Time is illustrated along the horizontal axis 2002. Conceptually broadcast message 2000 is a stream of information bits $\{b_i\}$. In block 2004, b1 is transmitted; b2 is transmitted in block 2006 and b3 is transmitted in block 2008. In order to convey timing information, blocks 2004, 2006, 2008 should have a pattern (e.g., timing pattern) or numbering to allow the receiving device to interpret the message in a proper sequence.

For example, if the broadcast message begins with block b1 2004, there might be certain things that should be broadcast in block b2 2006. This can be performed with numbering mechanics, which can be found through multiple ways, such as finding $\{c_i\}$, were $\{c_i\}$ has a particular periodicity, which can be broadcast linearly. Once $\{c_i\}$, is decoded and the periodicity found, that can be used for the timing difference. In accordance with some aspects, the information carried on $\{c_i\}$ can be used to find a numbering mechanic.

Figure 21:
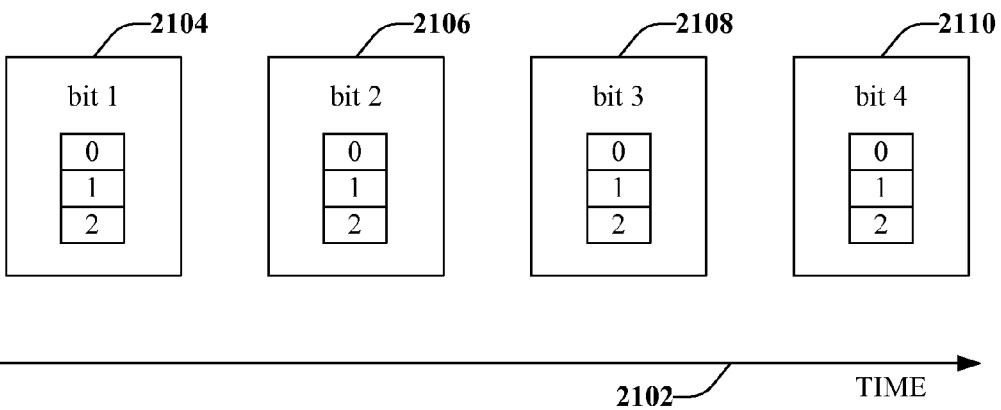
FIG. 21 illustrates information bits that can be utilized to determine timing information.

In another example, illustrated in FIG. 21, $\{b_i\}$ can be used to determine a starting point. For example, each time there can be three levels carried. Time is represented along the horizontal axis 2102 and there are three information bits 2104, 2106, and 2108. Each block within the information bits can transmit either 1, 2 or 3 (e.g., three levels). Information bits 2104, 2106, 2108 collectively can signal nine-levels (0 through 8). The last level "8" can be reserved or unused, or can be used to carry information, not timing.

Adding another level with a fourth bit 2110 provides a problem because the sender can pick any combination of bits (e.g., 2104 and 2106; 2106 and 2108; 2108 and 2110) and the receiver might not know which bits were received. However, in accordance with the example, bit 2108 should not be used because it carries bit number 8, which should not be used. Thus, if the incorrect combination is chosen (e.g., 2106 and 2108), then there is a possibility that the receiver will see bit 8 since it is value coding. If bit 8 is found by receiver, it indicates that the timing is misaligned, which provides a timing structure (e.g., since 8 was not supposed to be there, it is an error).

Figure 22:
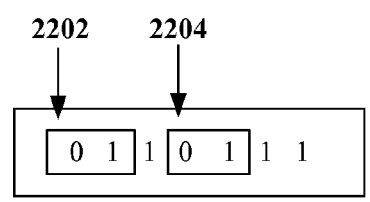
FIG. 22 illustrates an example bit stream that includes timing information.

To determine timing, the receiver would obtain the timing information and a bit stream, such as the example illustrated in FIG. 22, which can provide a mark or indicator. This allows a phase structure to be defined where there can be synchronous and asynchronous messages. For example, the first two-bits after the mark 2202, 2204 carry some synchronous messages (e.g., the location itself provides information about how to interpret the message). The synchronous message does not necessarily have a message, the location itself is the message. The remainder of the message (e.g., bits) can be taken together as an asynchronous message, which can be pieced together to obtain a header/body/message. The starting point and ending point can be determined by the message format, not necessarily the position or location.

Figure 23:
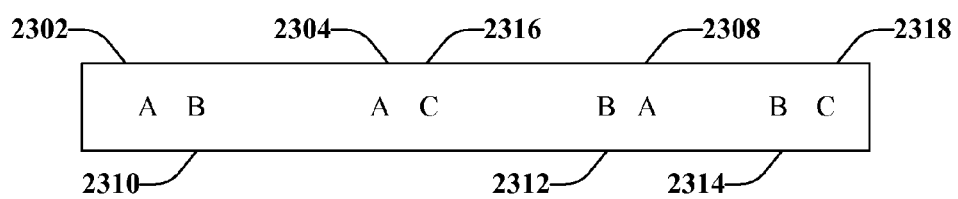
FIG. 23 illustrates an example message that utilizes one or more of the disclosed aspects.

At the receiving device listens for a longer duration to the message, the more bits it will receive. Within a synchronous message there can be multiple groups of synchronous messages where some messages repeat at certain times and other message repeat at different times. An example message illustrating this is in FIG. 23, where message "A" repeats every so often (illustrated at 2302, 2304, 2306) and messages "B" and "C" have a different periodicity (illustrated at 2308, 2310 and 2312, 2314, respectively). Thus, there can be different periodicity for different synchronous messages because the position itself becomes the timing that will define the interpretation of the bits.

The message can include particular information about how the spectrum is to be used, whether the device is allowed to use the spectrum and/or other information, or combinations thereof. For example, if the message is broadcast in spectrum "1", the message does not have to advise whether that spectrum can be used, it can just indicate that the device can use spectrum "2", where spectrum "2" is a waveform not affected. Thus, the message does not have to relate to the spectrum in which the broadcast message is being broadcast, but can relate to other spectrums that might be available. The receiving device can listen to the particular part of the message and make a decision to use another spectrum that is available. The message indicating the use of a current or another spectrum can be in either a synchronous or an asynchronous message.

Figure 24:
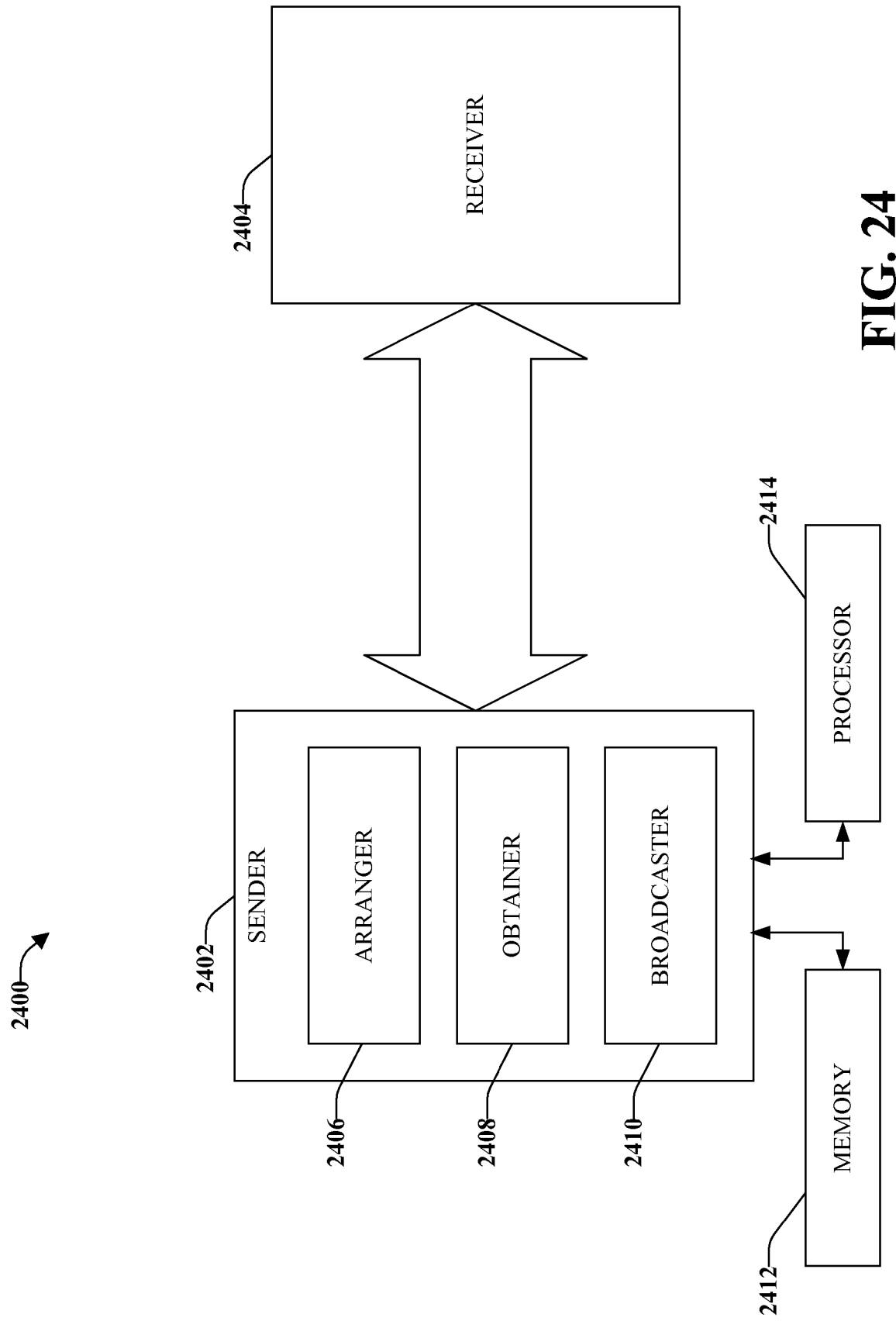
FIG. 24 illustrates an example system for transmitting a sequence of broadcast information bits that includes one or more subsequences.

FIG. 24 illustrates an example system 2400 for transmitting a sequence of broadcast information bits that includes one or more subsequences. System 2400 includes one or more senders 2402 that broadcast information to one or more receivers 2404. Sender 2402 can determine and change a broadcasting schedule. For example, sender 2402 may broadcast some messages more frequently than other messages and/or broadcast some messages only once or a few times and then never repeat.

Sender can include an arranger 2406 that can be configured to define one or more subsequences of broadcast information bits and determine a structure for the one or more subsequences within a broadcast message. The structure can be defined as positions of each subsequence within the broadcast message. The position determination can be predefined.

The sequence can have a certain structure (e.g., numbering/timing structure), that can be configured by an obtainer 2408 to indicate the positions or locations of each subsequence within the broadcast message or signal. The set of broadcast information can include a multiple of subsets, wherein each subset of broadcast information is sent, by a broadcaster 2410, using a particular subsequence. In accordance with some aspects, the subsequences can be interleaved with each other.

A memory 2412 can be operatively coupled to receiver 2402 and can store information and/or retain instructions relating to defining one or more subsequences of broadcast information bits and determining a structure of the subsequences contained in a broadcast signal. A timing structure can be encoded in the broadcast signal.

Memory 2412 can further retain instructions relating to marking the beginning of each of the subsequences and transmitting the broadcast signal. Marking the beginning of each of the subsequence can define a phase or timing structure. The indicated beginning of each of the subsequences can allow synchronous and asynchronous messages to be included in the broadcast signal. A broadcast signal can include an asynchronous message, a synchronous message or combinations thereof. In accordance with some aspects, the location of the messages conveys information. The asynchronous message can include a message header that provides a definition of the asynchronous message. A definition of the synchronous message can be a function of its position within the broadcast signal.

Two or more subsequences included in the broadcast signal can have different periodicities or can be interleaved with each other. In accordance with some aspects, a broadcasting cycle of a subsequence is at least one second and is transmitted one broadcasting cycle after another broadcasting cycle. Additionally or alternatively, broadcast signal includes information about the use of a spectrum, devices allowed to use the spectrum or combinations thereof.

A processor 2414 can be operatively connected to receiver 2404 (and/or memory 2412) to facilitate analysis of received information and/or can be configured to execute the instructions retained in memory 2412. Processor 2414 can be a processor dedicated to analyzing information received from sender 2402 and/or generating information that can be utilized by arranger 2406, obtainer 2408 and/or broadcaster 2410. Additionally or alternatively, processor 2414 can be a processor that controls one or more components of system 2400, and/or a processor that analyzes information, generates information and/or controls one or more components of system 2400.

Figure 25:
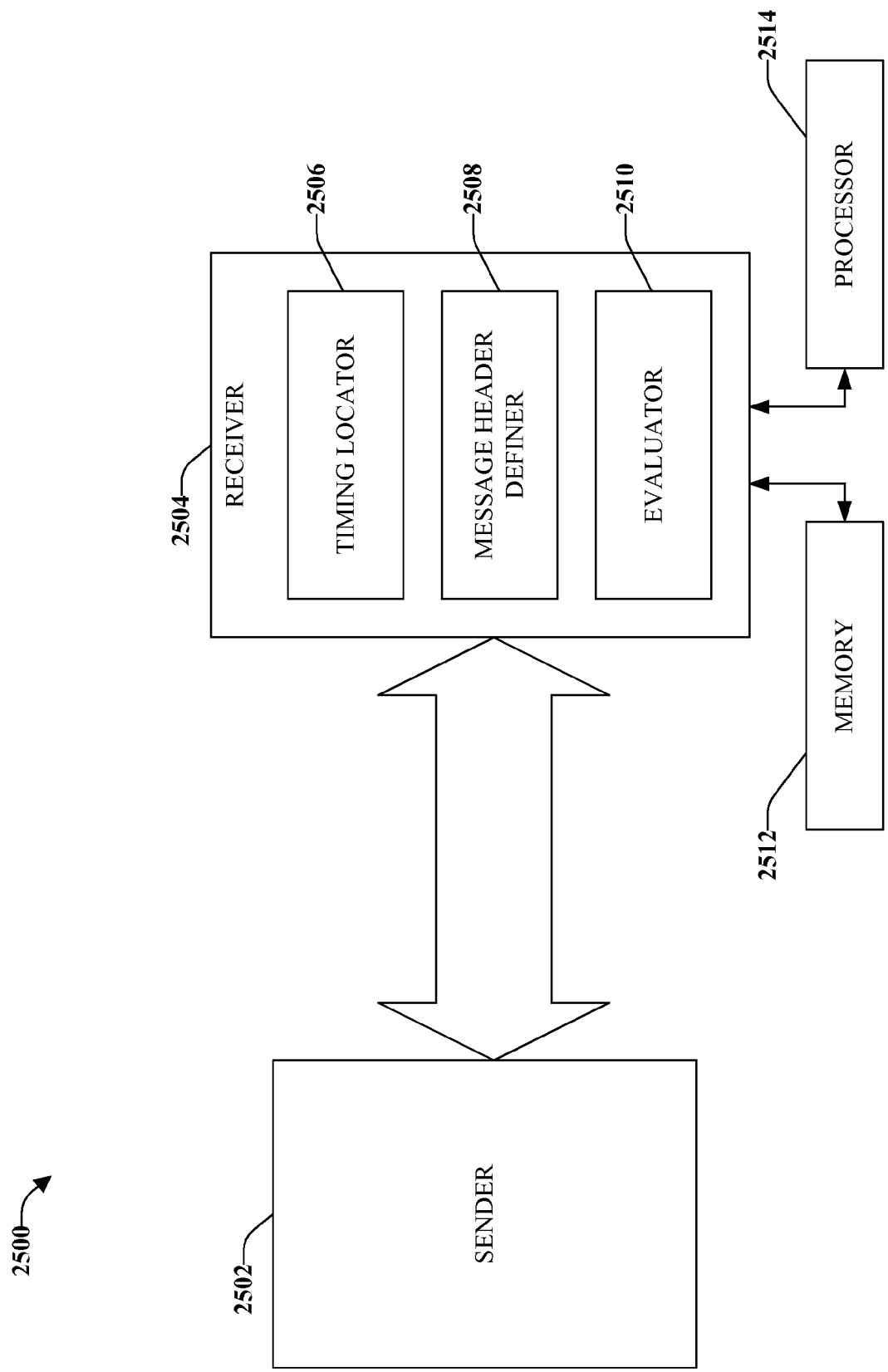
FIG. 25 illustrates an example system for interpreting a broadcast signal that includes a multiple of subsequences.

With reference now to FIG. 25, illustrated is an example system 2500 for interpreting a broadcast signal that includes a multiple of subsequences. A sender 2502 can be configured to broadcast information intended for receiver 2504. The broadcast information can include a multiple of subsequences or might include a single subsequence. In order to interpret the subsequences, receiver 2504 can include a timing locator 2506, a message header definer 2508 and an evaluator 2510.

Timing locator 2506 can be configured to evaluate a received broadcast message and ascertain a timing structure. In accordance with some aspects, the format of at least a subset of the subsequences (e.g., the interpretation of bits conveyed in the subsequence) can be predetermined as a function of the position within the subsequence. The format can repeat according to a predetermined broadcasting cycle. For example, the information bits conveyed in the subsequence can repeat according to the broadcasting cycle. Thus, the information is sent in a synchronous manner and the subsequence is called a synchronous subsequence. In accordance with some aspects, different subsequences may have different broadcasting cycles.

In accordance with some aspects, the format of some subsequences is not predetermined as a function of the position within the subsequence. The information bits conveyed in the subsequence may belong to different broadcast messages, which are not predetermined or fixed. Each message may include at least one of a message head and a message body. Thus, the message can be sent in an asynchronous manner and the subsequence can be referred to as an asynchronous subsequence. Message header definer 2508 can be configured to evaluate the broadcast signal (or subsequences included in the broadcast signal) to define the header.

In accordance with some aspects, the synchronous and asynchronous subsequences can coexist in the sequence of broadcast information. In a short time interval, the receiver 2504 should be able to obtain the necessary broadcast information form the beacon signal to access the sender (e.g., serving station). As time passes, receiver 2504 can receive more and more beacon bursts and can accumulate more and more broadcast information bits.

Based on the information received and interpreted at least in part by the defined message headers, evaluator 2510 can make a determination whether receiver 2504 should change from a first spectrum to a second spectrum, stay on the current spectrum, alter its transmit power, or other parameters.

For example, a first mobile device would like to establish communication with a second mobile device (e.g., peer-to-peer communication). A message can be broadcast by a base station serving the geographic region in which both mobile devices are located. The broadcast message might include information indicating the devices can establish a peer-to-peer communication if they use a specific spectrum. This can be transmitted on a channel "A" similar to the message illustrated in FIG. 23. The purpose of channel "B" can be to provide a different periodicity. Each of the mobile devices would find the timing of the message to determine how to interpret the bits. Once interpreted, the bits can be evaluated to determine if a certain spectrum should be used, if there are priorities for communication or other information. Additional information that can be provided is power information, such as an indication that the mobile device(s) can only use power below a threshold level. Additionally or alternatively, there can be physical layer/mac layer parameters the devices should have in order to determine respective transmissions.

A memory 2512 can be operatively coupled to receiver 2502 and can store information and/or retain instructions relating to receiving a broadcast signal that includes at least one subsequence of broadcast information bits. The subsequence can include at least one asynchronous message or at least one synchronous message, or combinations thereof. A definition of the synchronous message can be a function of a position of the synchronous message in the broadcast signal and the asynchronous message can include a message header that provides the definition of the asynchronous message.

Memory 215 can further retain instructions relating to locating a beginning position of each subsequence included in the received broadcast signal and decoding the at least one subsequence based in part on the beginning position location. Finding a beginning position can include locating an indicator included in the beacon signal. The beginning position of a synchronous message can convey information. Memory 2512 can further retain instructions related to modifying at least one parameter based in part on the interpreted messages.

A processor 2514 can be operatively connected to receiver 2504 (and/or memory 2512) to facilitate analysis of received information and/or can be configured to execute the instructions retained in memory 2512. Processor 2514 can be a processor dedicated to analyzing information received from sender 2502 and/or generating information that can be utilized by information stream obtainer 2506, first information stream analyzer 2508 and/or second information scheme interpreter 2510. Additionally or alternatively, processor 2514 can be a processor that controls one or more components of system 2500, and/or a processor that analyzes information, generates information and/or controls one or more components of system 2500.

Figure 26:
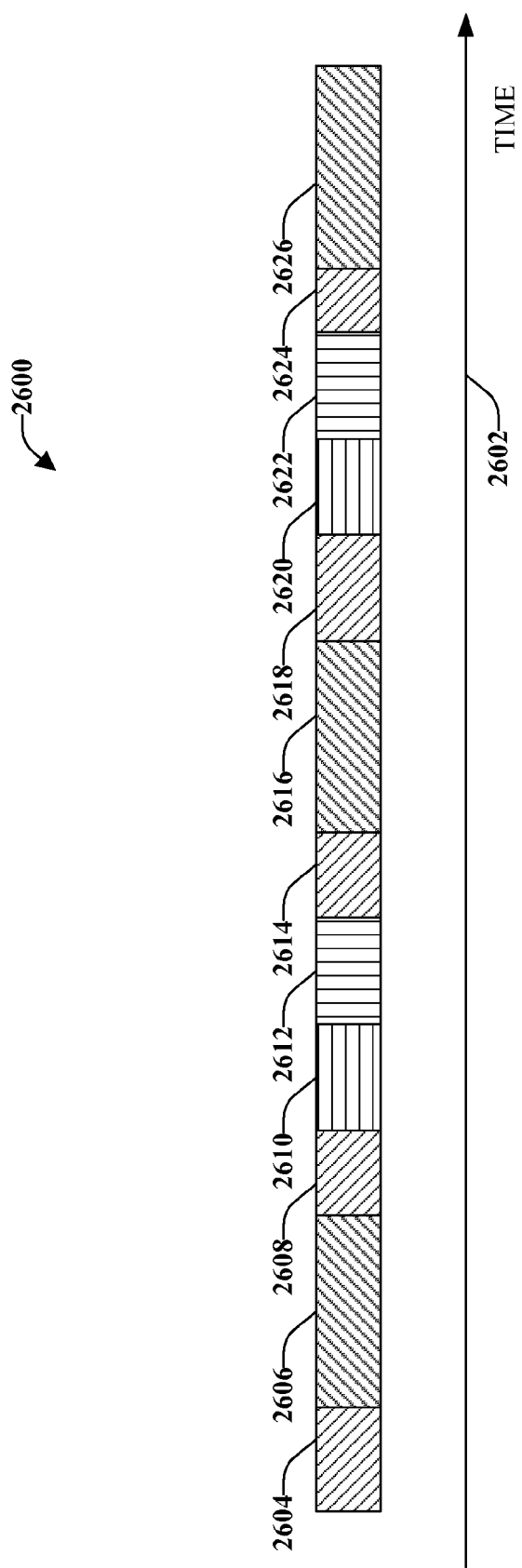
FIG. 26 illustrates an example of partitioning a sequence of broadcast information bits into a multiple of subsequences implemented in accordance with the disclosed aspects.

According to some aspects, the sequence of broadcast information bits includes a multiple of sequences. FIG. 26 illustrates an example of partitioning the sequence of broadcast information bits 2600 into a multiple of subsequences implemented in accordance with the disclosed aspects.

The horizontal axis 2602 represents the logical time during which the sequence of broadcast information bits 2600 is sent. A number of boxes are shown sequentially over time, each of which represents a block of information bits within the sequence 2600. The length of a box illustrates the size of the corresponding block. The filing pattern of a box represents the block of bits belonging to an associated subsequence. The boxes with different filling patterns are associated with different subsequences. For example, boxes 2604, 2608, 2614, 2618 and 2624 all have the same filling pattern and are used to send bits of a first subsequence. Boxes 2606, 2616 and 2626 all have the same filling pattern and are used to send bits of a second subsequence. Boxes 2610 and 2620 both have the same filling pattern and are used to send bits of a third subsequence. Boxes 2612 and 2622 both have the same filing pattern and are used to send bits of a fourth subsequence.

In accordance with some aspects, the broadcasting cycle of one subsequence may be different from that of another subsequence. For example, the first subsequence has a shorter cycle than the second subsequence, while the block size of the first subsequence is smaller than that of the second subsequence.

The sequence is partitioned into the multiple of subsequences in a predetermined and fixed manner in the sense that the position of each subsequence within the sequence of broadcast information bits is predetermined and fixed. The subsequences are interleaved with each other. In order to allow the receiving device to synchronize with the sequence, in one example, the sequence has a certain structure (e.g., numbering/timing structure) to indicate the positions of the subsequences. For example, the numbering structure may be signaled by the beacon symbols carried in the sequence of beacon bursts, similar to an earlier example. In another example, one subsequence (e.g., the fourth subsequence in FIG. 26) is a parity check of all the other subsequences. For example, box 2622 contains the parity check bits of preceding boxes of all the other subsequences, including boxes 2614, 2616, 2618 and 2620. Then, the receiving device can utilize the coding structure and run a moving-window search to detect the position of the parity check box and, therefore, determine the synchronization structure.

The set of broadcast information includes a multiple of subsets. Each subset of broadcast information is sent using a particular subsequence. A subsequence may have its own format to interpret the bits conveyed in the subsequence. Different subsequences may use different formats. In accordance with some aspects, a subsequence may use a synchronous or asynchronous format, as will be explained in more detail below. The sequence may include a variety of synchronous subsequences and one or a multitude of asynchronous subsequences. In accordance with an example, there is only on asynchronous subsequence in the sequence.

Figure 27:
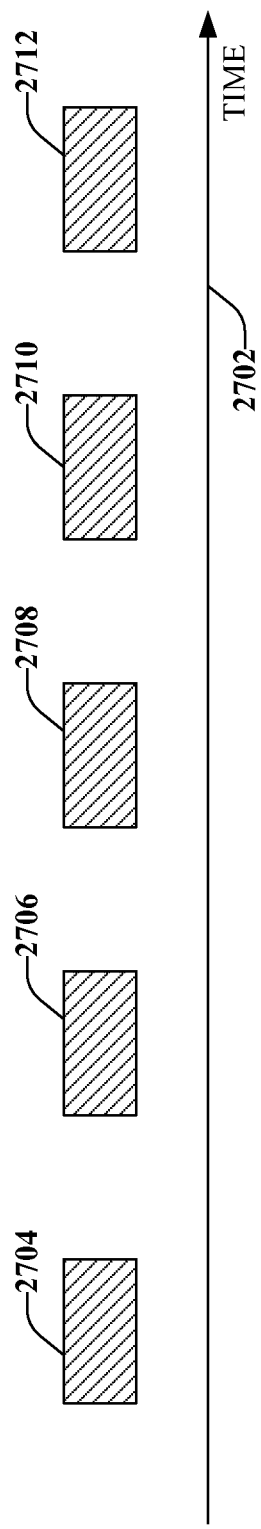
FIG. 27 illustrates as example of a synchronous subsequence implements in accordance with the disclosed aspects.

The format of a synchronous subsequence (e.g., the interpretation of the information bits conveyed in the subsequence) is predetermined as a function of the position within the subsequence. Therefore, no message head is needed to indicate how the bits should be interpreted. FIG. 27 illustrates an example of a synchronous subsequence 2700 implemented in accordance with the disclosed aspects.

The horizontal line 2702 represents time. Boxes 2704, 2708 and 2712 can convey the information about version number and transmission power. The version number can be the software release version number and may be used to determine the compatibility between a serving station and a mobile device. The transmission power may be the current transmission power of the serving station as well as the maximum power capability. Box 2706 can convey the information about spectrum allocation and type of service. The spectrum allocation information might indicate whether the spectrum is FDD, TDD and so forth, and might further include the frequency of the designated carriers or the frequency distance between the designated downlink and uplink carriers in a FDD system. The type of service can be traditional cellular service, peer-to-peer ad hoc network service, cognitive radio service, and so forth. Box 2710 can convey the information about spectrum allocation and technology supported. The technology supported indicates the air interface technology (e.g., CDMA, OFDMA, GSM, and the like). It should be noted that because the information of the version number is sent in the predetermined positions of the subsequence, there is no need to add the message head.

In a given synchronous subsequence, the format can repeat according to a predetermined broadcasting cycle. Different pieces of information may have different broadcasting cycles (e.g., as a function of how frequent the information should be sent to the receiving devices). In the illustrated example, the information of version number or spectrum allocation repeats every other box, while the broadcasting cycle for type of service or technology supported is longer. In this manner, the receiving device can obtain the time critical broadcast information in a short time interval. Then, as the receiving device continues receiving the beacon bursts, the receiving device can obtain more and more broadcast information, including less time critical information.

Figure 28:
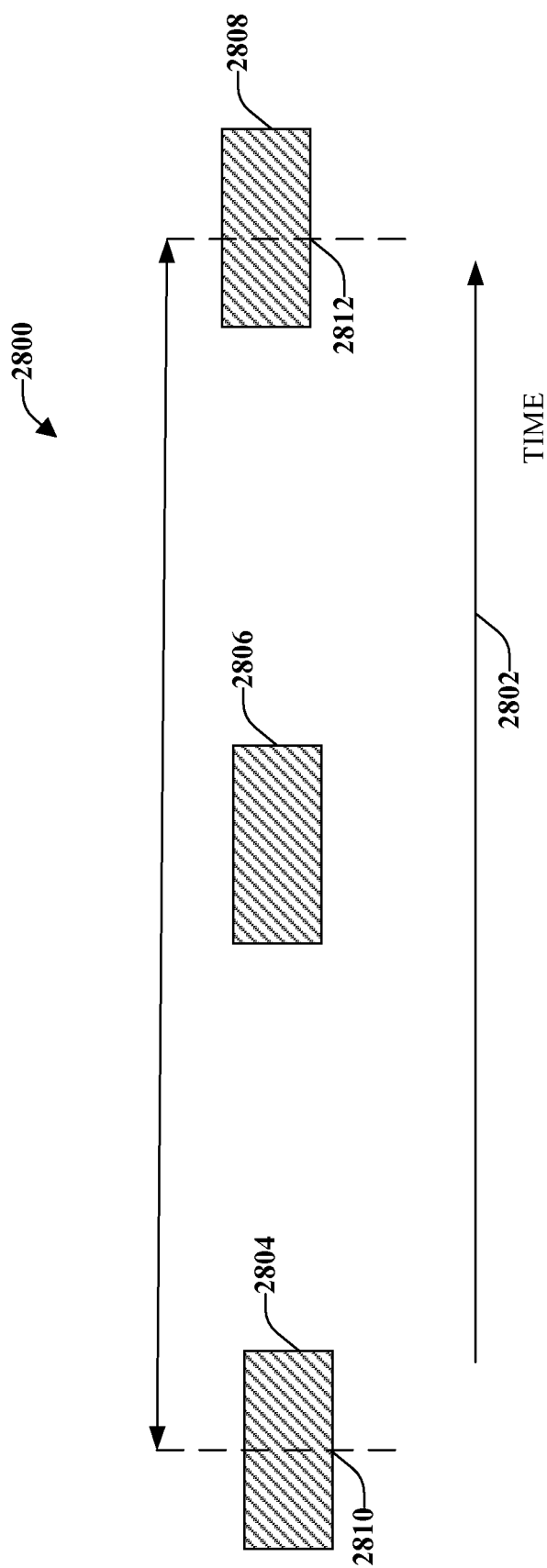
FIG. 28 illustrates an example of an asynchronous subsequence implements in accordance with various aspects disclosed herein.

The format of asynchronous subsequences is not predetermined as a function of the position within the subsequence. The information bits conveyed in the subsequence might belong to different broadcast messages, and delimiters can be added to indicate the beginning and the ending of individual messages. FIG. 28 illustrates an example of an asynchronous subsequence 2800 implemented in accordance with various aspects disclosed herein.

Time is illustrated along horizontal line 2802. Boxes 2804, 2806 and 2808 are part of the asynchronous subsequence. In the illustration, a message starts within box 2804, continues in box 2806 and ends in box 2808. The beginning and ending points of the message 2810 and 2812 are defined by some delimiters. The subsequence can be used to send different messages with different lengths. There is no strictly defined order in which the message are sent. The serving station has the freedom to determine and change the broadcasting schedule. Therefore, the occurrence of a particular message is not predetermined. Each message may include at least one of a message head and a message body.

In general, the message are sent sequentially with a given asynchronous subsequence. In accordance with some aspects, there are multiple asynchronous subsequences, which interleave with each other within the sequence of broadcast information, in which case more than one message can be sent in parallel.

Figure 29:
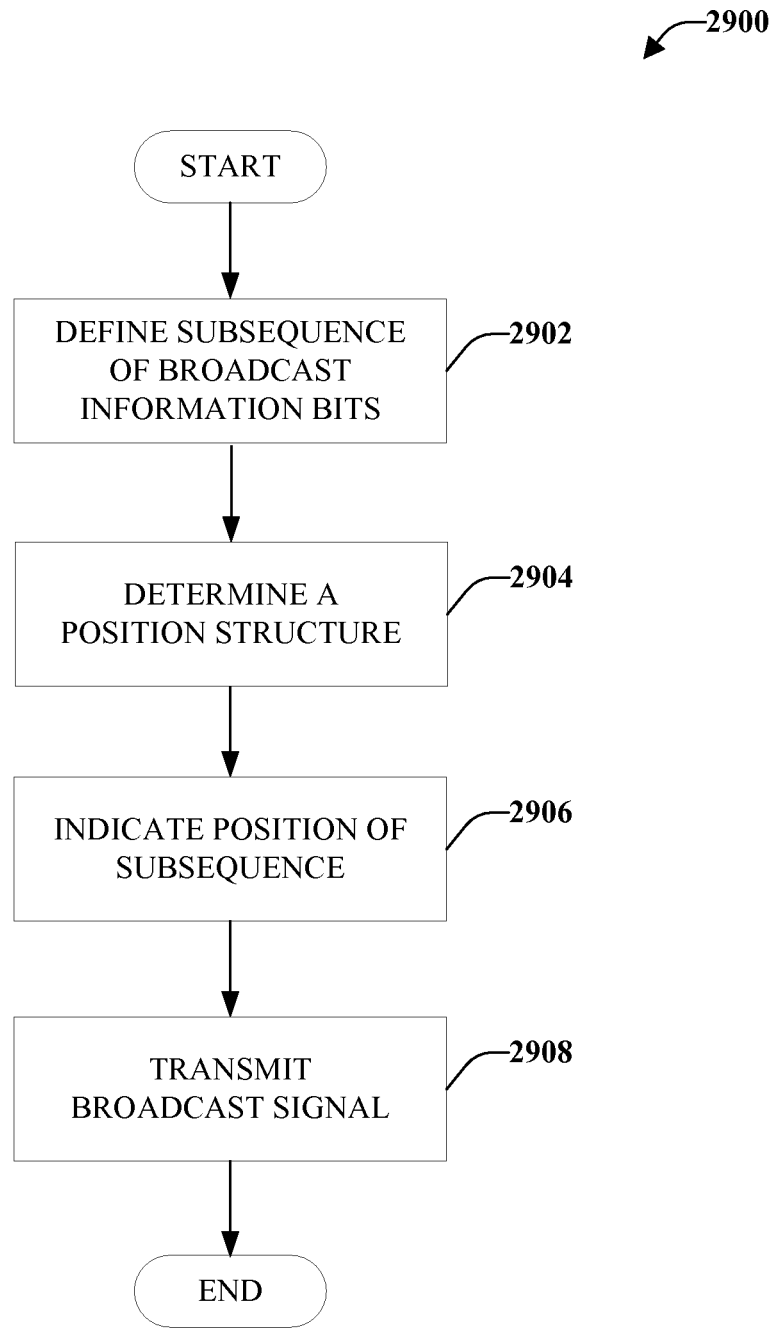
FIG. 29 illustrates an example method of transmitting a broadcast signal that includes a sequence of broadcast information bits.

FIG. 29 illustrates an example method 2900 of transmitting a broadcast signal that includes one or more sequences of broadcast information bits. Method 2900 starts, at 2902, where one or more subsubsequences of broadcast information bits contained in a broadcast message are defined. At 2904 a position structure of the one or more subsequences are determined. Determining the position structure can include determining positions of each subsequence within the broadcast message, which can be predefined. The structure can be defined as at least one of a numbering or a timing or combinations thereof.

In order for a receiver of a message, that includes one or more subsequences to understand the message, the positions of one or more subsequences are indicated or marked, at 2906. In accordance with some aspects, a timing structure can be determined for indicating positions of the one or more subsequences. The timing structure can be encoding in the broadcast signal.

The broadcast signal is transmitted, at 2908, to an intended recipient. Two or more subsequences can be sent with different periodicities (e.g., a first message can be broadcast within the broadcast signal more frequently than at least a second message). A first message might be broadcast only a few times and never repeated. A broadcasting cycle of the one of the subsequences can be about one second and the subsequence can be transmitted one broadcasting cycle after another broadcasting cycle. Two or more subsequences can be interleaved with each other.

The sequence of broadcast information bits can include an asynchronous message, a synchronous message or combinations thereof (e.g., at least one asynchronous message and one or more synchronous messages included in the sequence of broadcast information bits). The synchronous message can be defined as a function of a position of the synchronous message in the broadcast signal. A message header that provides the definition of the asynchronous message can be included in the asynchronous message.

Figure 30:
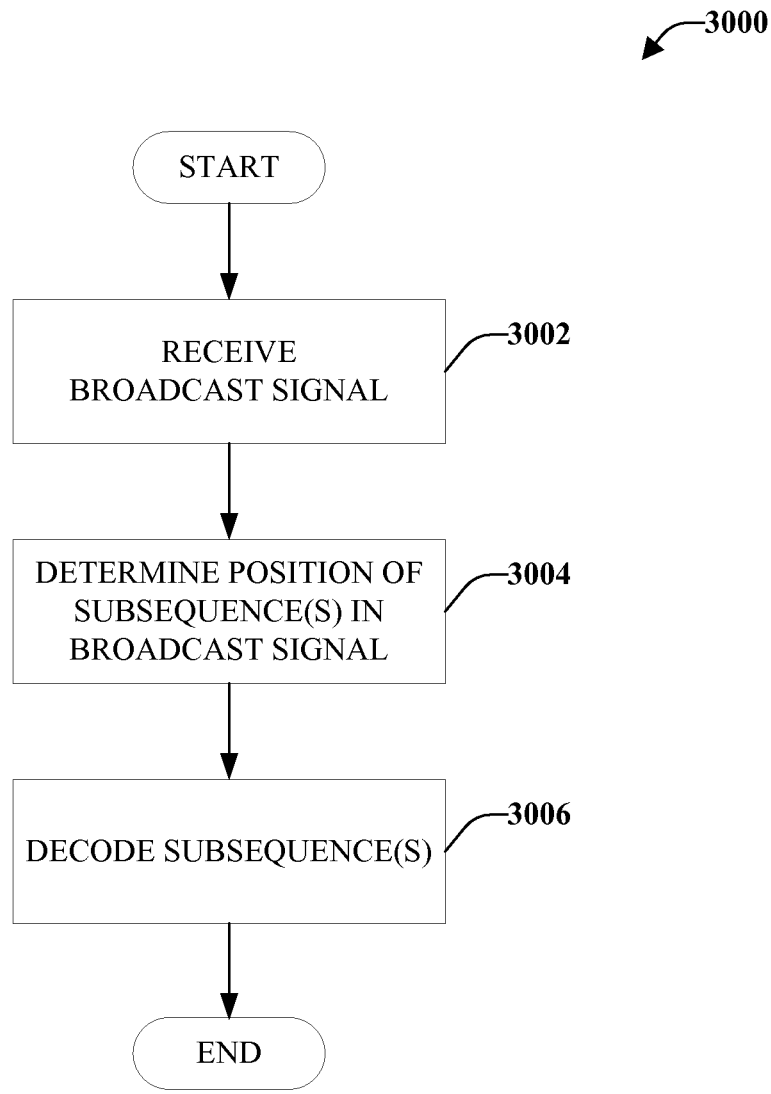
FIG. 30 illustrates an example method for interpreting timing information and related messages within a received broadcast signal.

FIG. 30 illustrates an example method 3000 for interpreting timing information and related messages within a received broadcast signal. At 3002, a broadcast message that includes at least one subsequence of broadcast information bits is received. A subsequence can be about one second or longer and can be received one broadcasting cycle after another broadcasting cycle. Two or more subsequences can be received at different periodicities and/or may be interleaved with each other. In accordance with some aspects, the broadcast signal can include at least one asynchronous message or at least one synchronous message or combinations thereof. A definition of the one or more synchronous messages can be a function of a position of the synchronous message in the received broadcast signal. The one or more asynchronous messages can include a message header that indicates a definition of the asynchronous message.

At 3004, a position of one or more subsequences is determined based on an indicator contained in the broadcast signal. The indicator can specify a location or position of each subsequence within the broadcast signal. The one or more subsequences of broadcast information can be decoded, at 3006 based in part on the determined position. A timing structure included in the broadcast signal can also be decoded. The timing can be determined based in part on a starting location or position of the one or more subsequences.

Based in part on the information included in the decoded message, one or more parameters can be changed. For example, a determination can be made to change from a first spectrum to another spectrum based on information included in the message. Another example is modifying a power based on message information, determining which spectrum to use, or changing other parameters.

In accordance with some aspects, method 3000 further comprises piecing together portions of the broadcast signal to derive a header/body/message sequence and/or determining a starting point and ending point of the message based in part on a message format.

It will be appreciated that, in accordance with one or more aspects described herein, inferences can be made regarding transmission and/or interpretation of broadcast signals. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a degree of freedom during which to transmit a beacon symbol. According to another example, an inference can be made relating to combining and/or decoding a substream of information included in a broadcast signal independently from another stream of information. In accordance with another example, an inference can be made relating to one or more subsequences included in a broadcast message. It will be appreciated that the foregoing examples are illustrative in nature and are not intended to limit the number of inferences that can be made or the manner in which such inferences are made in conjunction with the various examples described herein.

Figure 31:
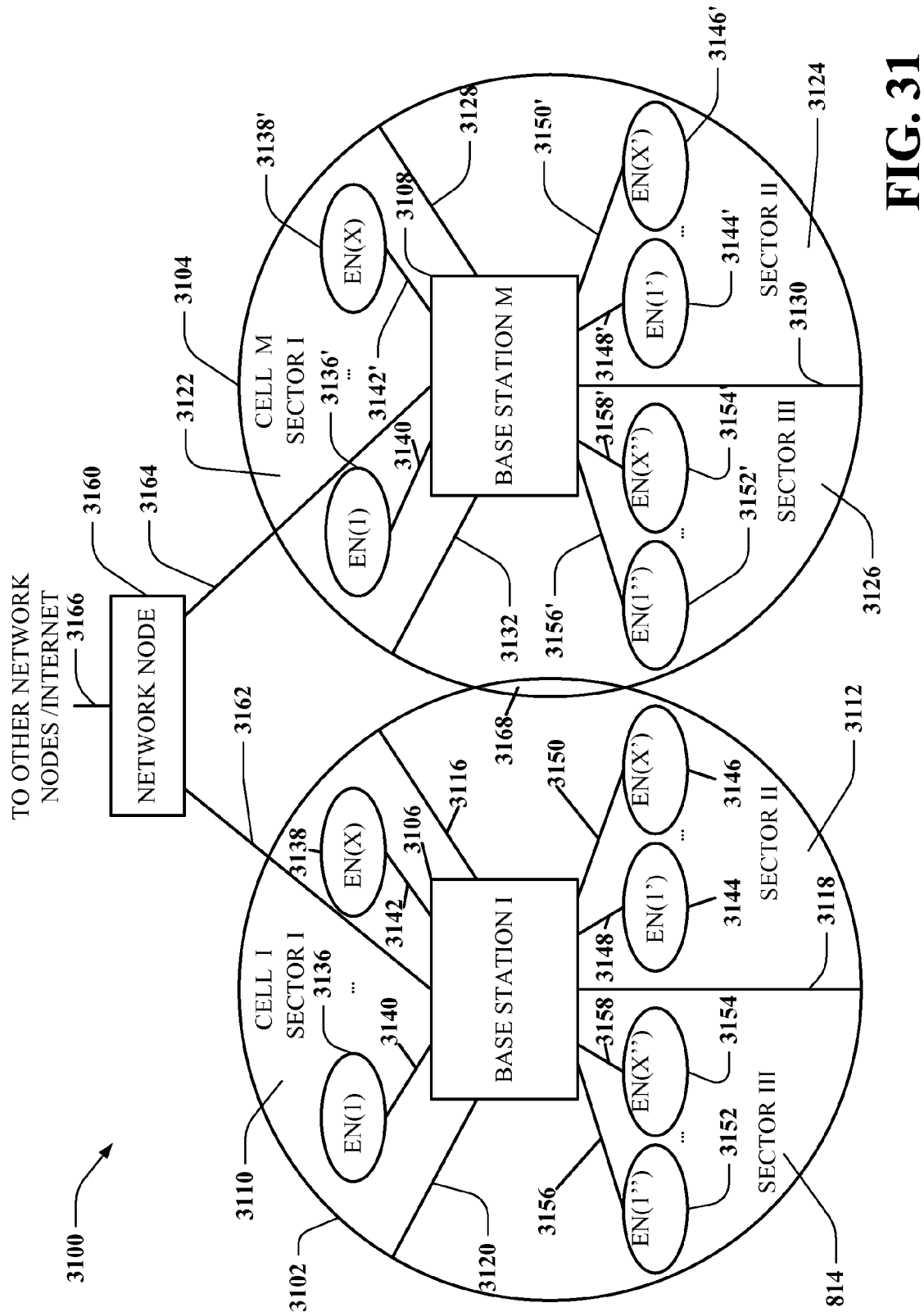
FIG. 31 is an illustration of an example communication system implemented in accordance with various aspects including multiple cells.

FIG. 31 depicts an example communication system 3100 implemented in accordance with various aspects including multiple cells: cell I3102, cell M 3104. Note that neighboring cells 3102, 3104 overlap slightly, as indicated by cell boundary region 3168, thereby creating potential for signal interference between signals transmitted by base stations in neighboring cells. Each cell 3102, 3104 of system 3100 includes three sectors. Cells which have not be subdivided into multiple sectors (N=1), cells with two sectors (N=2) and cells with more than 3 sectors (N>3) are also possible in accordance with various aspects. Cell 3102 includes a first sector, sector I3110, a second sector, sector II 3112, and a third sector, sector III 3114. Each sector 3110, 3112, 3114 has two sector boundary regions; each boundary region is shared between two adjacent sectors.

Sector boundary regions provide potential for signal interference between signals transmitted by base stations in neighboring sectors. Line 3116 represents a sector boundary region between sector I3110 and sector II 3112; line 3118 represents a sector boundary region between sector II 3112 and sector III 3114; line 3120 represents a sector boundary region between sector III 3114 and sector 1 3110. Similarly, cell M 3104 includes a first sector, sector I3122, a second sector, sector II 3124, and a third sector, sector III 3126. Line 3128 represents a sector boundary region between sector I3122 and sector II 3124; line 3130 represents a sector boundary region between sector II 3124 and sector III 3126; line 3132 represents a boundary region between sector III 3126 and sector I3122. Cell I3102 includes a base station (BS), base station I3106, and a plurality of end nodes (ENs) (e.g., wireless terminals) in each sector 3110, 3112, 3114. Sector 1310 includes EN(1) 3136 and EN(X) 3138 coupled to BS 3106 through wireless links 3140, 3142, respectively; sector II 3112 includes EN(1') 3144 and EN(X') 3146 coupled to BS 3106 through wireless links 3148, 3150, respectively; sector III 3114 includes EN(1") 3152 and EN(X") 3154 coupled to BS 3106 through wireless links 3156, 3158, respectively. Similarly, cell M 3104 includes base station M 3108, and a plurality of end nodes (ENs) in each sector 3122, 3124, 3126. Sector I3122 includes EN(1) 3136' and EN(X) 3138' coupled to BS M 3108 through wireless links 3140', 3142', respectively; sector II 3124 includes EN(1') 3144' and EN(X') 3146' coupled to BS M 3108 through wireless links 3148', 3150', respectively; sector 3 3126 includes EN(1") 3152' and EN(X") 3154' coupled to BS 3108 through wireless links 3156', 3158', respectively.

System 3100 also includes a network node 3160 which is coupled to BS I 3106 and BS M 3108 through network links 3162, 3164, respectively. Network node 3160 is also coupled to other network nodes, e.g., other base stations, AAA server nodes, intermediate nodes, routers, etc. and the Internet through network link 3166. Network links 3162, 3164, 3166 may be, e.g., fiber optic cables. Each end node, e.g., EN(1) 3136 may be a wireless terminal including a transmitter as well as a receiver. The wireless terminals, e.g., EN(1) 3136 may move through system 3100 and may communicate through wireless links with the base station in the cell in which the EN is currently located. The wireless terminals, (WTs), e.g., EN(1) 3136, may communicate with peer nodes, e.g., other WTs in system 3100 or outside system 3100 through a base station, e.g., BS 3106, and/or network node 3160. WTs, e.g., EN(1) 3136 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 32:
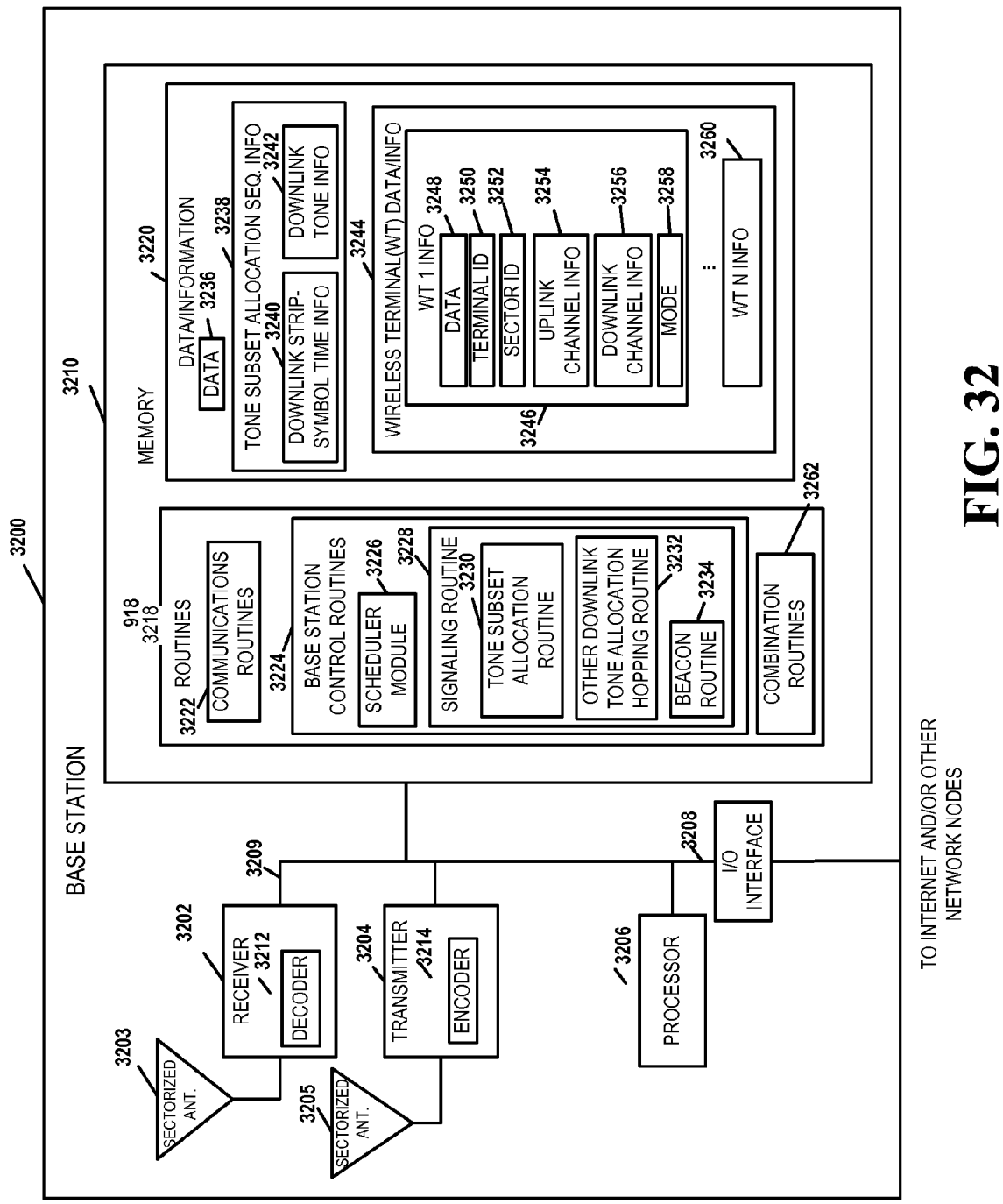
FIG. 32 is an illustration of an example base station in accordance with various aspects.

FIG. 32 illustrates an example base station 3200 in accordance with various aspects. Base station 3200 implements tone subset allocation sequences, with different tone subset allocation sequences generated for respective different sector types of the cell. Base station 3200 may be used as any one of base stations 806, 808 of the system 3100 of FIG. 31. The base station 3200 includes a receiver 3202, a transmitter 3204, a processor 3206, e.g., CPU, an input/output interface 3208 and memory 3210 coupled together by a bus 3209 over which various elements 3202, 3204, 3206, 3208, and 3210 may interchange data and information.

Sectorized antenna 3203 coupled to receiver 3202 is used for receiving data and other signals, e.g., channel reports, from wireless terminals transmissions from each sector within the base station's cell. Sectorized antenna 3205 coupled to transmitter 3204 is used for transmitting data and other signals, e.g., control signals, pilot signal, beacon signals, etc. to wireless terminals 3300 (see FIG. 33) within each sector of the base station's cell. In various aspects, base station 3200 may employ multiple receivers 3202 and multiple transmitters 3204, e.g., an individual receiver 3202 for each sector and an individual transmitter 3204 for each sector. Processor 3206 may be, e.g., a general purpose central processing unit (CPU). Processor 3206 controls operation of base station 3200 under direction of one or more routines 3218 stored in memory 3210 and implements the methods. I/O interface 3208 provides a connection to other network nodes, coupling the BS 3200 to other base stations, access routers, AAA server nodes, etc., other networks, and the Internet. Memory 3210 includes routines 3218 and data/information 3220.

Data/information 3220 includes data 3236, tone subset allocation sequence information 3238 including downlink strip-symbol time information 3240 and downlink tone information 3242, and wireless terminal (WT) data/info 3244 including a plurality of sets of WT information: WT 1 info 3246 and WT N info 3260. Each set of WT info, e.g., WT 1 info 3246 includes data 3248, terminal ID 3250, sector ID 3252, uplink channel information 3254, downlink channel information 3256, and mode information 3258.

Routines 3218 include communications routines 3222, base station control routines 3224, and combination routines 3262. Base station control routines 3224 includes a scheduler module 3226 and signaling routines 3228 including a tone subset allocation routine 3230 for strip-symbol periods, other downlink tone allocation hopping routine 3232 for the rest of symbol periods, e.g., non strip-symbol periods, and a beacon routine 3234. Combination routines 3262 can further include information combination routines (not shown), value combination routines (not shown) and/or flow stream combination routines (not shown).

Data 3236 includes data to be transmitted that will be sent to encoder 3214 of transmitter 3204 for encoding prior to transmission to WTs, and received data from WTs that has been processed through decoder 3212 of receiver 3202 following reception. Downlink strip-symbol time information 3240 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 3242 includes information including a carrier frequency assigned to the base station 3200, the number and frequency of tones, and the set of tone subsets to be allocated to the strip-symbol periods, and other cell and sector specific values such as slope, slope index and sector type.

Data 3248 may include data that WT1 3300 has received from a peer node, data that WT 1 3300 desires to be transmitted to a peer node, and downlink channel quality report feedback information. Terminal ID 3250 is a base station 3200 assigned ID that identifies WT 1 3300. Sector ID 3252 includes information identifying the sector in which WT1 3300 is operating. Sector ID 3252 can be used, for example, to determine the sector type. Uplink channel information 3254 includes information identifying channel segments that have been allocated by scheduler 3226 for WT1 3300 to use, e.g., uplink traffic channel segments for data, dedicated uplink control channels for requests, power control, timing control, etc. Each uplink channel assigned to WT 1 3300 includes one or more logical tones, each logical tone following an uplink hopping sequence. Downlink channel information 3256 includes information identifying channel segments that have been allocated by scheduler 3226 to carry data and/or information to WT1 3300, e.g., downlink traffic channel segments for user data. Each downlink channel assigned to WT1 3300 includes one or more logical tones, each following a downlink hopping sequence. Mode information 3258 includes information identifying the state of operation of WT1 3300, e.g. sleep, hold, on.

Communications routines 3222 control the base station 3200 to perform various communications operations and implement various communications protocols. Base station control routines 3224 are used to control the base station 3200 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 3228 controls the operation of receiver 3202 with its decoder 3212 and transmitter 3204 with its encoder 3214. The signaling routine 3228 is responsible for controlling the generation of transmitted data 3236 and control information. Tone subset allocation routine 3230 constructs the tone subset to be used in a strip-symbol period using the method of the aspect and using data/information 3220 including downlink strip-symbol time info 3240 and sector ID 3252. The downlink tone subset allocation sequences will be different for each sector type in a cell and different for adjacent cells. The WTs 3300 receive the signals in the strip-symbol periods in accordance with the downlink tone subset allocation sequences; the base station 3200 uses the same downlink tone subset allocation sequences in order to generate the transmitted signals. Other downlink tone allocation hopping routine 3232 constructs downlink tone hopping sequences, using information including downlink tone information 3242, and downlink channel information 3256, for the symbol periods other than the strip-symbol periods. The downlink data tone hopping sequences are synchronized across the sectors of a cell. Beacon routine 3234 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Combination routines 3262 can further include can further include information combination routines (not shown), value combination routines (not shown) and/or flow stream combination routines (not shown). For example, an information combination routine can include routines for choosing a sub-group from at least two sub-groups in a predetermined manner, selecting a degree of freedom to transmit a beacon signal independent of the choice of the sub-group, and transmit at least two subsets of information at a high energy level within the chosen sub-group and the selected degree of freedom. The selected degree of freedom can be a function of the chosen sub-group.

In another example, value combination routines can include assigning independent values to a first information stream and a second information stream and combining the independent values for transmission in a single high level beacon signal. The independent values can be selectively coded and decoded. Stream combination routines can related to dividing a block comprising a frequency unit and a time unit into a first information stream and at least a second information stream, combining the first information stream and the at least a second information stream and transmitting the combined information streams during the chosen portion of the frequency and the time. The streams can represent a chosen portion of the frequency and the time.

Figure 33:
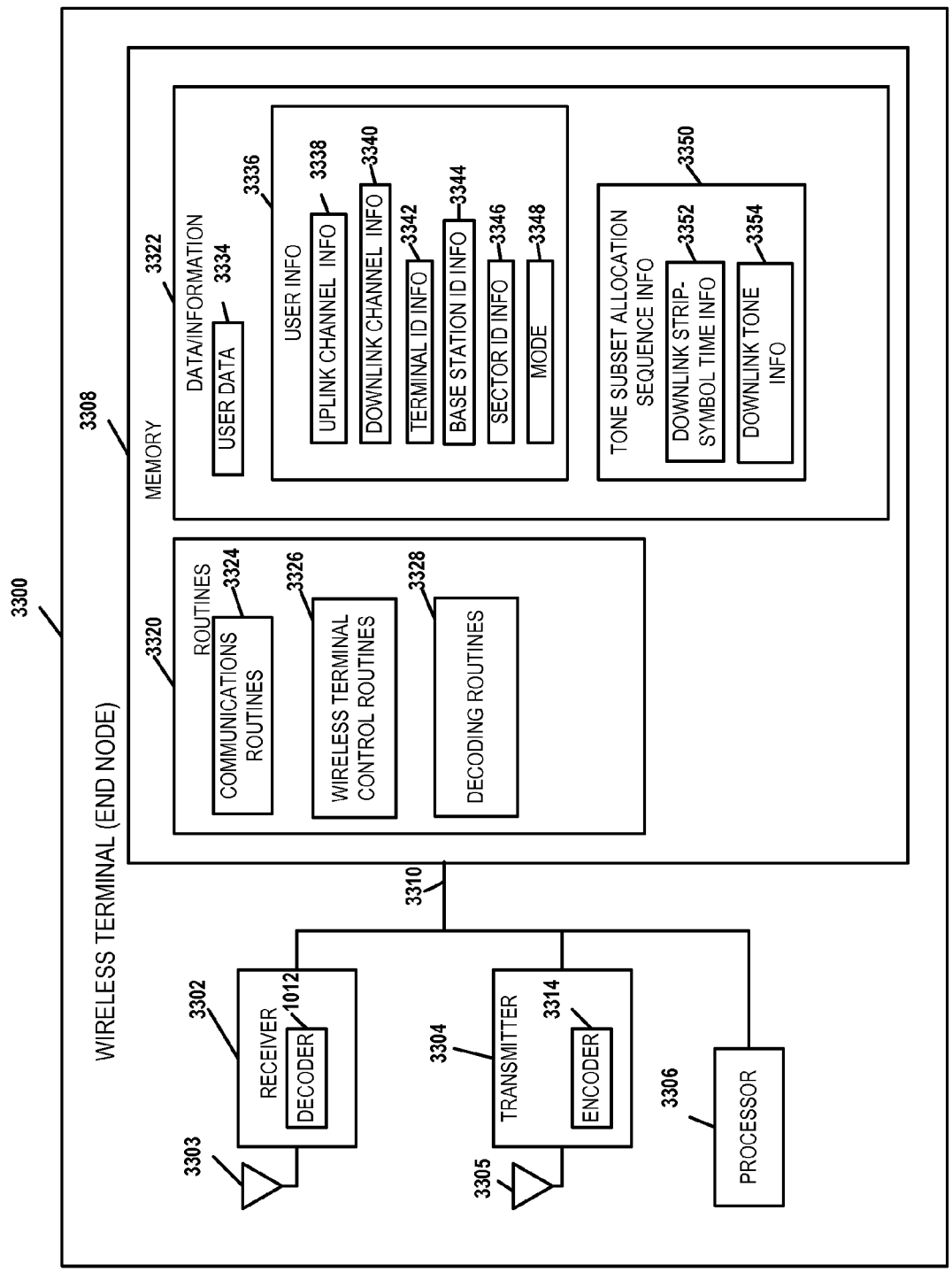
FIG. 33 is an illustration of an example wireless terminal (e.g., mobile device, end node, . . . ) implemented in accordance with various aspects described herein.

FIG. 33 illustrates an example wireless terminal (e.g., end node, mobile device, . . . ) 3300 which can be used as any one of the wireless terminals (e.g., end nodes, mobile devices, . . . ), e.g., EN(1) 836, of the system 800 shown in FIG. 8. Wireless terminal 3300 implements the tone subset allocation sequences. Wireless terminal 3300 includes a receiver 3302 including a decoder 3312, a transmitter 3304 including an encoder 3314, a processor 3306, and memory 3308 which are coupled together by a bus 3310 over which the various elements 3302, 3304, 3306, 3308 can interchange data and information. An antenna 3303 used for receiving signals from a base station 3200 (and/or a disparate wireless terminal) is coupled to receiver 3302. An antenna 3305 used for transmitting signals, e.g., to base station 3200 (and/or a disparate wireless terminal) is coupled to transmitter 3304.

The processor 3306 (e.g., a CPU) controls operation of wireless terminal 3300 and implements methods by executing routines 3320 and using data/information 3322 in memory 3308.

Data/information 3322 includes user data 3334, user information 3336, and tone subset allocation sequence information 3350. User data 3334 may include data, intended for a peer node, which will be routed to encoder 3314 for encoding prior to transmission by transmitter 3304 to base station 3200, and data received from the base station 3200 which has been processed by the decoder 3312 in receiver 3302. User information 3336 includes uplink channel information 3338, downlink channel information 3340, terminal ID information 3342, base station ID information 3344, sector ID information 3346, and mode information 3348. Uplink channel information 3338 includes information identifying uplink channels segments that have been assigned by base station 3200 for wireless terminal 3300 to use when transmitting to the base station 3200. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 3340 includes information identifying downlink channel segments that have been assigned by base station 3200 to WT 3300 for use when BS 3200 is transmitting data/information to WT 3300. Downlink channels may include downlink traffic channels and assignment channels, each downlink channel including one or more logical tone, each logical tone following a downlink hopping sequence, which is synchronized between each sector of the cell.

User info 3336 also includes terminal ID information 3342, which is a base station 3200 assigned identification, base station ID information 3344 which identifies the specific base station 3200 that WT has established communications with, and sector ID info 3346 which identifies the specific sector of the cell where WT 3300 is presently located. Base station ID 3344 provides a cell slope value and sector ID info 3346 provides a sector index type; the cell slope value and sector index type may be used to derive tone hopping sequences. Mode information 3348 also included in user info 3336 identifies whether the WT 3300 is in sleep mode, hold mode, or on mode.

Tone subset allocation sequence information 3350 includes downlink strip-symbol time information 3352 and downlink tone information 3354. Downlink strip-symbol time information 3352 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 3354 includes information including a carrier frequency assigned to the base station 3200, the number and frequency of tones, and the set of tone subsets to be allocated to the strip-symbol periods, and other cell and sector specific values such as slope, slope index and sector type.

Routines 3320 include communications routines 3324, wireless terminal control routines 3326, synchronization routines 3328, paging message generation/broadcast routines 3330, and paging message detection routines 3332. Communications routines 3324 control the various communications protocols used by WT 3300. For example, communications routines 3324 may enable communicating via a wide area network (e.g., with base station 3200) and/or a local area peer-to-peer network (e.g., directly with disparate wireless terminal(s)). By way of further example, communications routines 3324 may enable receiving a broadcast signal (e.g., from base station 3200). Wireless terminal control routines 3326 control basic wireless terminal 3300 functionality including the control of the receiver 3302 and transmitter 3304. Synchronization routines 3328 control synchronizing wireless terminal 3300 to a received signal (e.g., from base station 3200). Peers within a peer-to-peer network may also be synchronized to the signal. For example, the received signal may be a Beacon, a PN (pseudo random) sequence signal, a pilot signal, etc. Further, the signal may be periodically obtained and a protocol (e.g., associated with synchronization routines 3328) also known to peers may be utilized to identify intervals corresponding to distinct functions (e.g., peer discovery, paging, traffic). Paging message generation/broadcast routines 3330 control creating a message for transmission during an identified peer paging interval. A symbol and/or tone associated with the message may be selected based upon a protocol (e.g., associated with paging message generation/broadcast routines 3330). Moreover, paging message generation/broadcast routines 3330 may control sending the message to peers within the peer-to-peer network. Paging message detection routines 3332 control detection and identification of peers based upon messages received during an identified peer paging interval. Further, paging message detection routines 3332 may identify peers based at least in part upon information retained in buddy peer list 3356.

Routines 3320 include communications routines 3324 and wireless terminal control routines 3326. Communications routines 3324 control the various communications protocols used by WT 3300. By way of example, communications routines 3324 may enable receiving a broadcast signal (e.g., from base station 3200). Wireless terminal control routines 3326 control basic wireless terminal 3300 functionality including the control of the receiver 3302 and transmitter 3304.

Routines can also include decoding routines 1028, which can include information decoding routines, value decoding routines and/or stream decoding routines (not shown). For example information decoding routines can include receiving a first and at least a second subset of information at a high energy level within a sub-group and a degree of freedom, decoding the first subset of information based in part on the received subgroup and decoding decode the at least a second subset of information based in part on the degree of freedom.

In another example, value decoding routines can include receiving a beacon signal that includes a combination of two independent values, decoding a first independent value from the combination to obtain a first information stream and decoding a second independent value from the combination to obtain a second information stream. A stream decoding routine can include receiving a combination of information streams during a portion of frequency and a portion of time, dividing the combination of information streams into a first information stream and at least a second information streams and decoding the first information stream and the second information stream into its corresponding a frequency unit and time unit.

Figure 34:
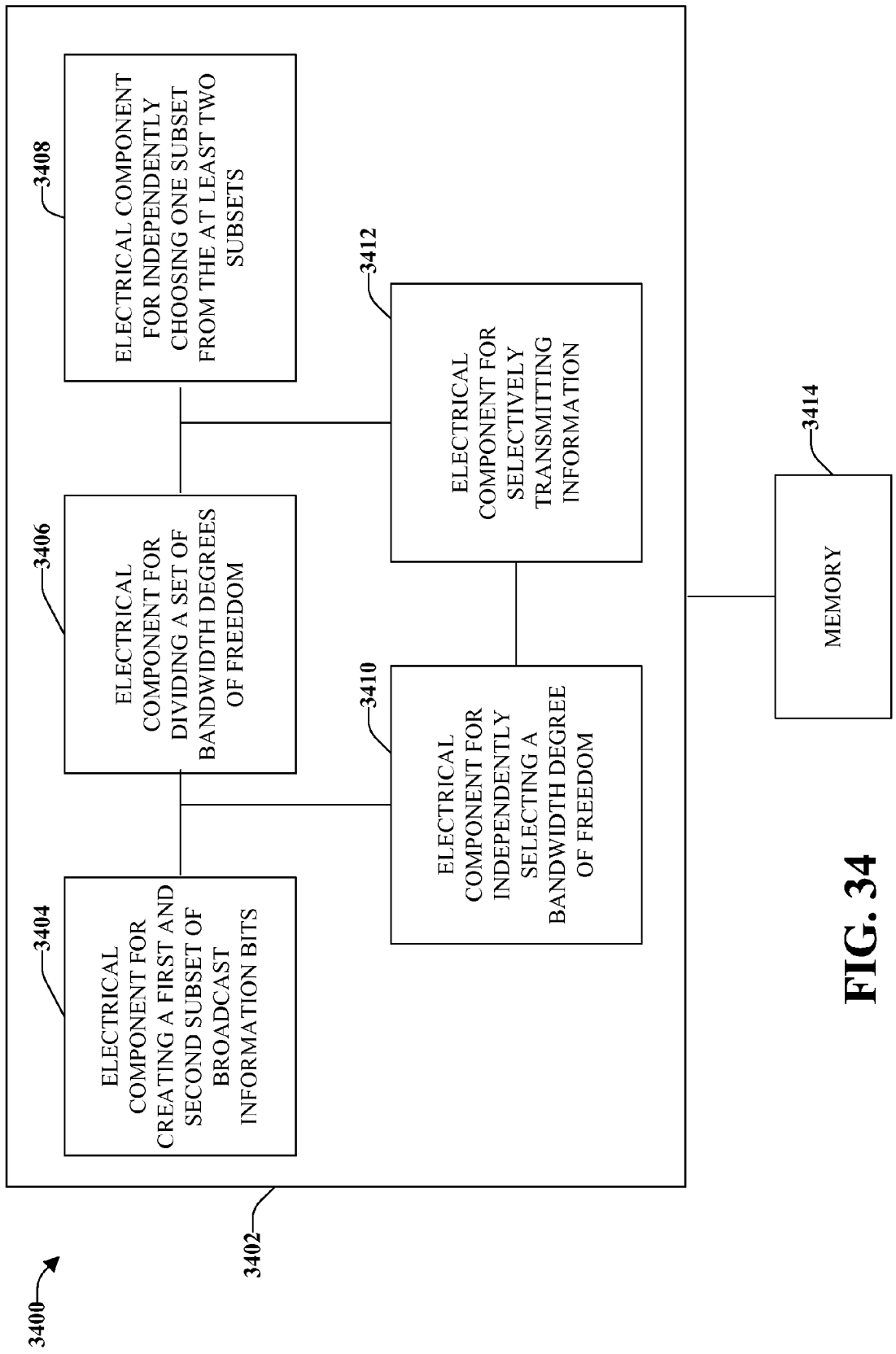
FIG. 34 illustrates a system that enables independent coding of at least two subsets of information in a beacon signal within a wireless communication environment.

With reference to FIG. 34, illustrated is a system 3400 that enables independent coding of at least two subsets of information in a beacon signal within a wireless communication environment. For example, system 3400 may reside at least partially within a base station. It is to be appreciated that system 3400 is represented as including functional blocks, which may be functional blocks that represent functions implemented by a processor, software, or combination thereof (e.g., firmware).

System 3400 includes a logical grouping 3402 of electrical components that can act in conjunction. For instance, logical grouping 3402 may include an electrical component for creating a first and a second subset of broadcast information bits 3404 from a multitude of broadcast information bits. Further, logical grouping 3402 can comprise an electrical component for dividing a set of bandwidth degrees of freedom into at least two subsets 3406. Pursuant to an illustration, the two groups can be a contiguous block of tone-symbols or each block of tone-symbols can be remote from each other. Moreover, between two bandwidth subsets there may be a few tone-symbols left unused.

Logical grouping 3402 can further comprising an electrical component for independently choosing one subset from the at least two subsets 3408 as a function of the first subset of broadcast information. Also included can be an electrical component for independently selecting one or more of the bandwidth degrees of freedom in the chosen subset 3410. Choosing the bandwidth degrees of freedom can be a function of the second subset of broadcast information. Since electrical components 3408 and 3410 operate independently of each other, a change to one subset of information does not have an affect on other subsets of information. Logical grouping 3402 can further comprise an electrical component for selectively transmitting information in the at least one bandwidth degree of freedom 3412. The information can be related to a basic configuration of a wireless system. The second subset of information can be related to handoff. The subsets of information can be transmitted at a high-energy as compared to other non-selected tone-symbols and/or groups.

In accordance with some aspects, electrical grouping 3402 can include an electrical component for transmitting the beacon signal at a power in each selected bandwidth degree of freedom that is at least 10 dB higher than an average transmission power used in each non-selected degree of freedom in the set of bandwidth degrees of freedom.

Additionally, system 3400 may include a memory 3414 that retains instructions for executing functions associated with electrical components 3404, 3406, 3408, 3410 and 3412. While shown as being external to memory 3414, it is to be understood that one or more of electrical components 3404, 3406, 3408, 3410 and 3412 may exist within memory 3414.

Figure 35:
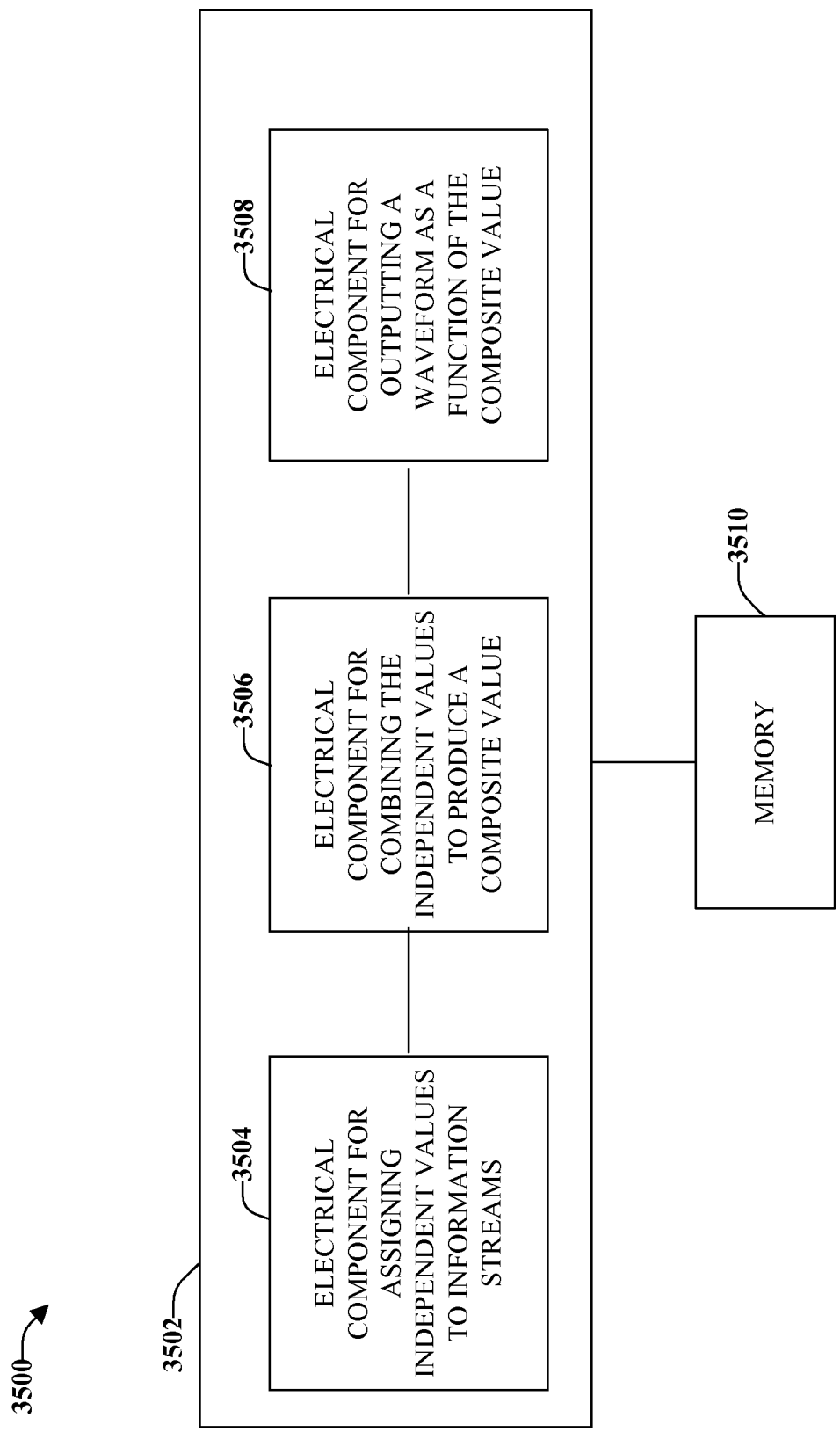
FIG. 35 illustrates a system that facilitates sending two independent information streams that represent a waveform.

With reference to FIG. 35, illustrated is a system 3500 that facilitates sending two independent information streams that represent a waveform. System 3500 may reside at least partially within a base station. It is to be appreciated that system 3500 is represented as including functional blocks, which may be functional blocks that represent functions implemented by a processor, software, or combination thereof (e.g., firmware).

System 3500 includes a logical grouping 3502 of electrical components that can act in conjunction. Logical grouping 3502 may include an electrical component for assigning independent values to a first information stream and a second information stream 3504. The values are assigned as independent values so that a change to one of the information streams does not have an affect on the other information stream. Also included in logical grouping 3502 is an electrical component for combining the independent values to produce a composite value 3506. Further, logical grouping 3502 can comprise an electrical component for outputting a waveform that is a function of the composite value 3508. Electrical component 3508 can output other signals at substantially a same time as outputting the produced waveform mapping. The waveform can include a high-energy beacon signal. Electrical component for outputting the waveform 3508 can provide a transmission power of the beacon signal per degree of freedom being at least 10 dB higher than a transmission power of other signals sent at substantially a same time.

In accordance with some aspects, logical grouping 3502 can comprise an electrical component for assigning a periodicity to the first information stream that is different from a periodicity of the second information stream (not shown). That is to say, each different stream of information can repeat at a similar time or at different times without affecting the other. Additionally or alternatively, logical grouping 3502 can include an electrical component for representing the second information stream as a sequence of $\{Y_i\}$ bits (not shown). The means for combining the independent information stream values 3506 can utilize equation $Z_i=\{X_i\}*Q+\{Y_i\}$, where Q a maximum value of the first information stream. A chosen block of a broadcast message can be indicated by $\{X_i\}$ and $\{Y_i\}$ indicates a location within the chosen block. A space occupied by $Z_i$ can be larger than a space occupied by $\{X_i\}$ and a space occupied by $\{Y_i\}$.

Additionally, system 3500 may include a memory 3510 that can retain instructions for executing functions associated with electrical components 3504, 3506, and 3508. While shown as being external to memory 3510, it is to be understood that one or more of electrical components 3504, 3506, and 3508 may exist within memory 3510.

Figure 36:
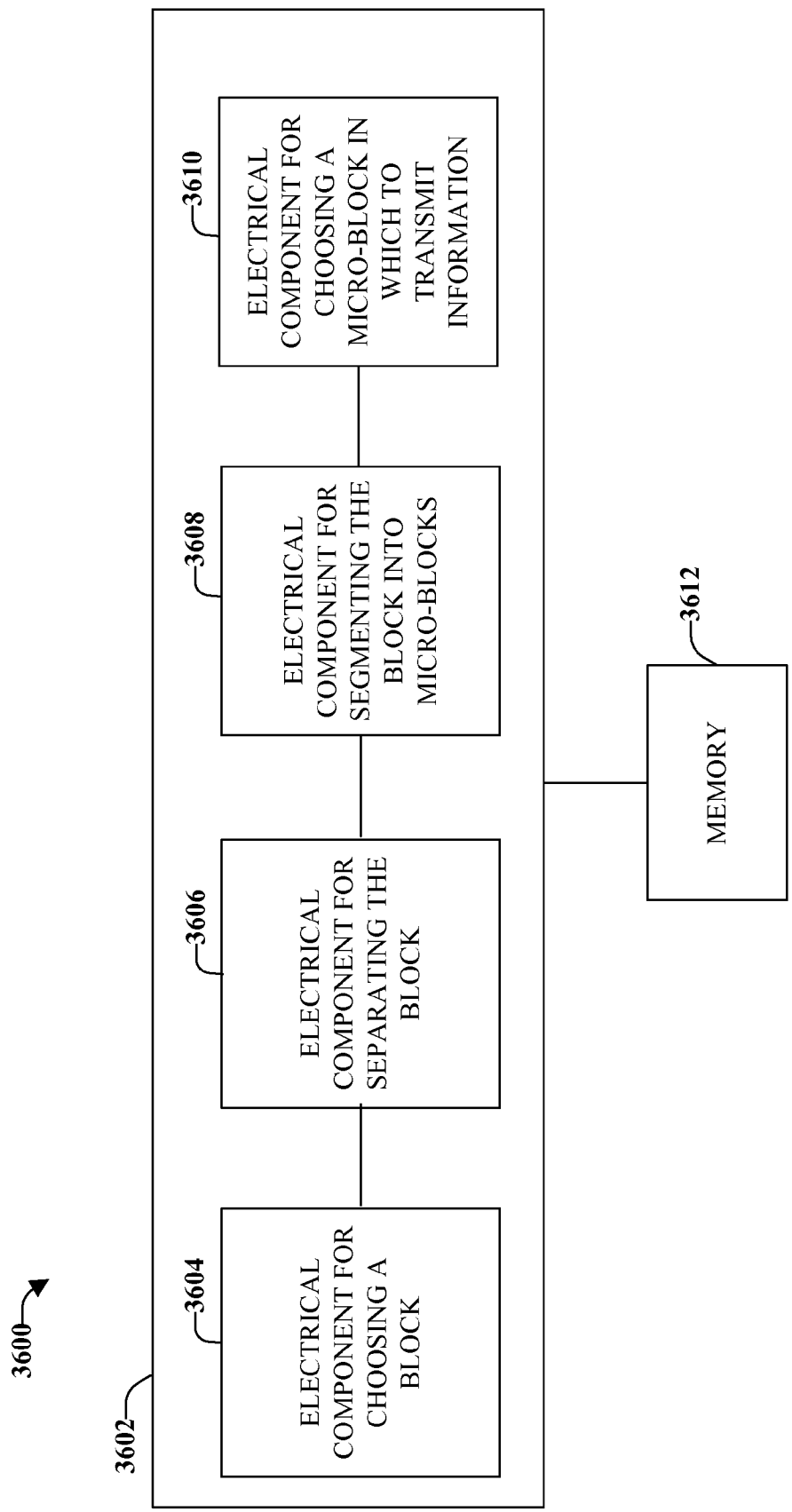
FIG. 36 illustrates a system that facilitates transmission of information using a set of tones in a set of time symbols within a wireless communication environment.

With reference to FIG. 36, illustrated is a system 3600 that facilitates transmission of information using a set of tones in a set of time symbols within a wireless communication environment. System 3600 may reside at least partially within a base station. It is to be appreciated that system 3600 is represented as including functional blocks, which may be functional blocks that represent functions implemented by a processor, software, or combination thereof (e.g., firmware). System 3600 includes a logical grouping 3602 of electrical components that can act in conjunction. Logical grouping 3602 can include an electrical component for choosing a block 3604. The block can include a set of frequency tones and a set of time symbols.

Also included in logical grouping can be an electrical component for separating the block into two or more subgroups as a function of a first information stream 3606 and an electrical component for segmenting each of the two or more subgroups into micro blocks as a function of a second information stream 3608. Separating the block and segmenting the subgroups can be performed in a predetermined manner. Each of the micro blocks can include one or more frequency tones in one time symbol. The first information stream and second information stream can be portions of a block that includes a frequency tone and a time symbol. Changes to the frequency portion and the time portion do not affect each other and as such, they can be mutually exclusive. That is to say, changes to the first information stream do not change the second information stream. Logical grouping 3602 can also include a means for choosing a micro block in which to transmit information as a high-energy beacon. The micro blocks might be next to each other, disjoint from each other and might not be equally spaced.

Additionally, logical grouping 3602 can include an electrical component for dividing the block into sub-blocks that represent the first information stream (not shown). An electrical component for partitioning the sub-blocks into degrees of freedom that represent the second information stream (not shown) and/or an electrical component for partitioning the block into the first information stream and the second information stream in a predetermined manner might also be include in logical grouping 3602.

Additionally, system 3600 may include a memory 3612 that retains instructions for executing functions associated with electrical components 3604, 3606, 3608 and 3610. While shown as being external to memory 3612, it is to be understood that one or more of electrical components 3604, 3606, 3608 and 3610 may exist within memory 3612.

Figure 37:
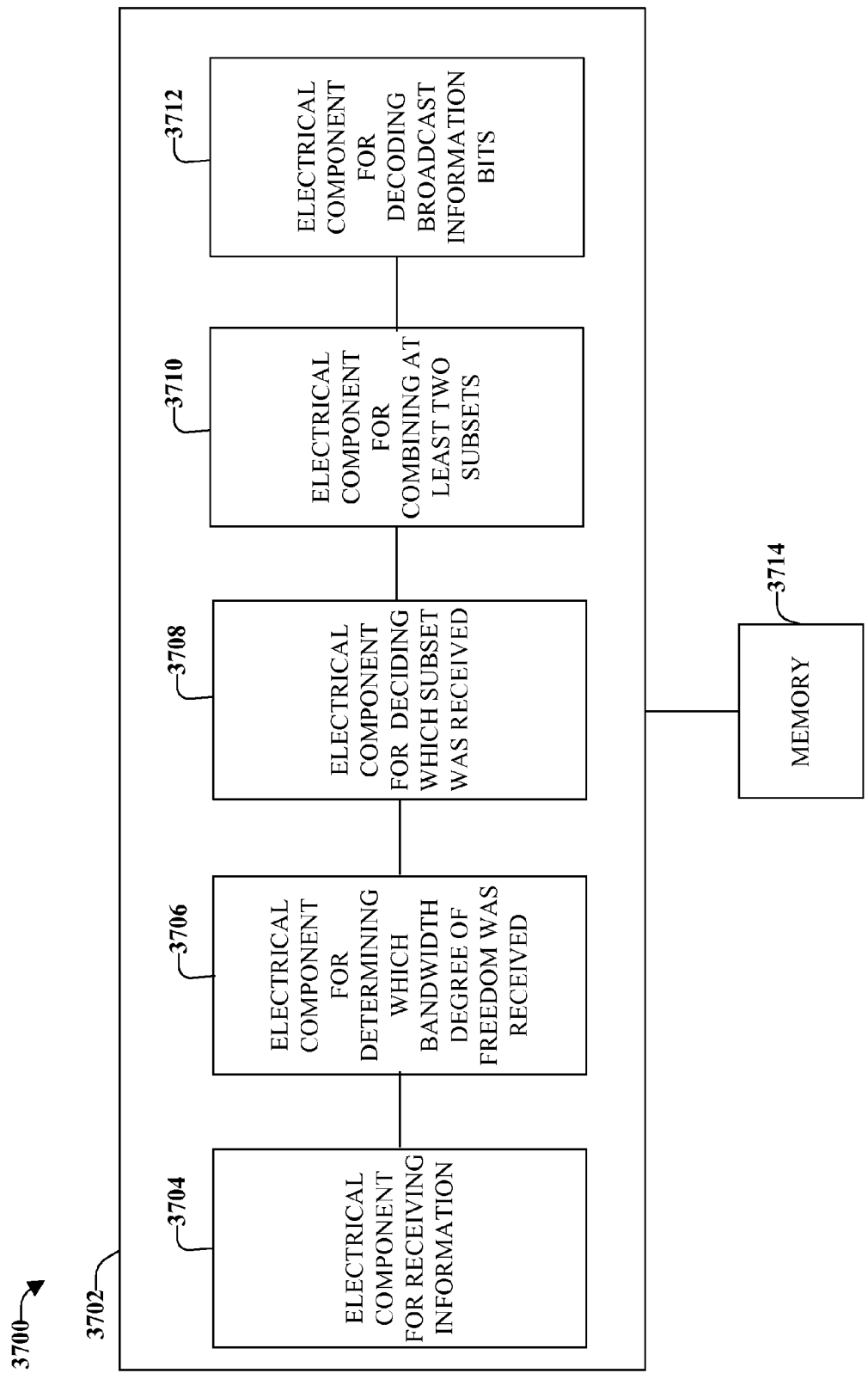
FIG. 37 illustrated is a system that enables independent decoding of information received in a beacon signal within a wireless communication environment.

With reference to FIG. 37, illustrated is a system 3700 that enables independent decoding of information received in a beacon signal within a wireless communication environment. For example, system 3700 may reside at least partially within a mobile device. It is to be appreciated that system 3700 is represented as including functional blocks, which may be functional blocks that represent functions implemented by a processor, software, or combination thereof (e.g., firmware).

System 3700 includes a logical grouping 3702 of electrical components that can act in conjunction. For instance, logical grouping 3702 may include an electrical component for selectively receiving information in at least one bandwidth degree of information 3704. Pursuant to an illustration, the information can related to a basic configuration and the second subset of information can be related to handoff. Electrical component 3704 may further distinguish a beacon signal received at a high energy as compared to other received beacon signals. Also included in logical grouping 3702 can be an electrical component for determining which bandwidth degree of freedom was received 3706 and an electrical component for deciding which subset from at least two subsets included the one or more bandwidth degrees of freedom 3708.

Additionally, logical grouping 3702 can include an electrical component for combining the two or more subsets into a set of bandwidth degrees of freedom 3710. Also included is an electrical component for decoding the broadcast information bits 3712 from the first subset of broadcast information bits and the second subset of broadcast information bits.

In accordance with some aspects, system 3700 can include a logical component for receiving the beacon signal at a power in each selected bandwidth degree of freedom that is at least 10 dB higher than an average transmission power used in each non-selected degree of freedom in the set of bandwidth degrees of freedom. System 3700 can also include an electrical component for determining in which sub-group the beacon signal was received based in part on the first subset of information (not shown). Also included can be an electrical component for ascertaining in which degree of freedom the beacon signal was received based in part on the at least a second subset of information.

Additionally, system 3700 may include a memory 3714 that retains instructions for executing functions associated with electrical components 3704, 3706, 3708, 3710, and 3712. While shown as being external to memory 3714, it is to be understood that one or more of electrical components 3704, 3706, 3708, 3710, and 3712 may exist within memory 3714.

Figure 38:
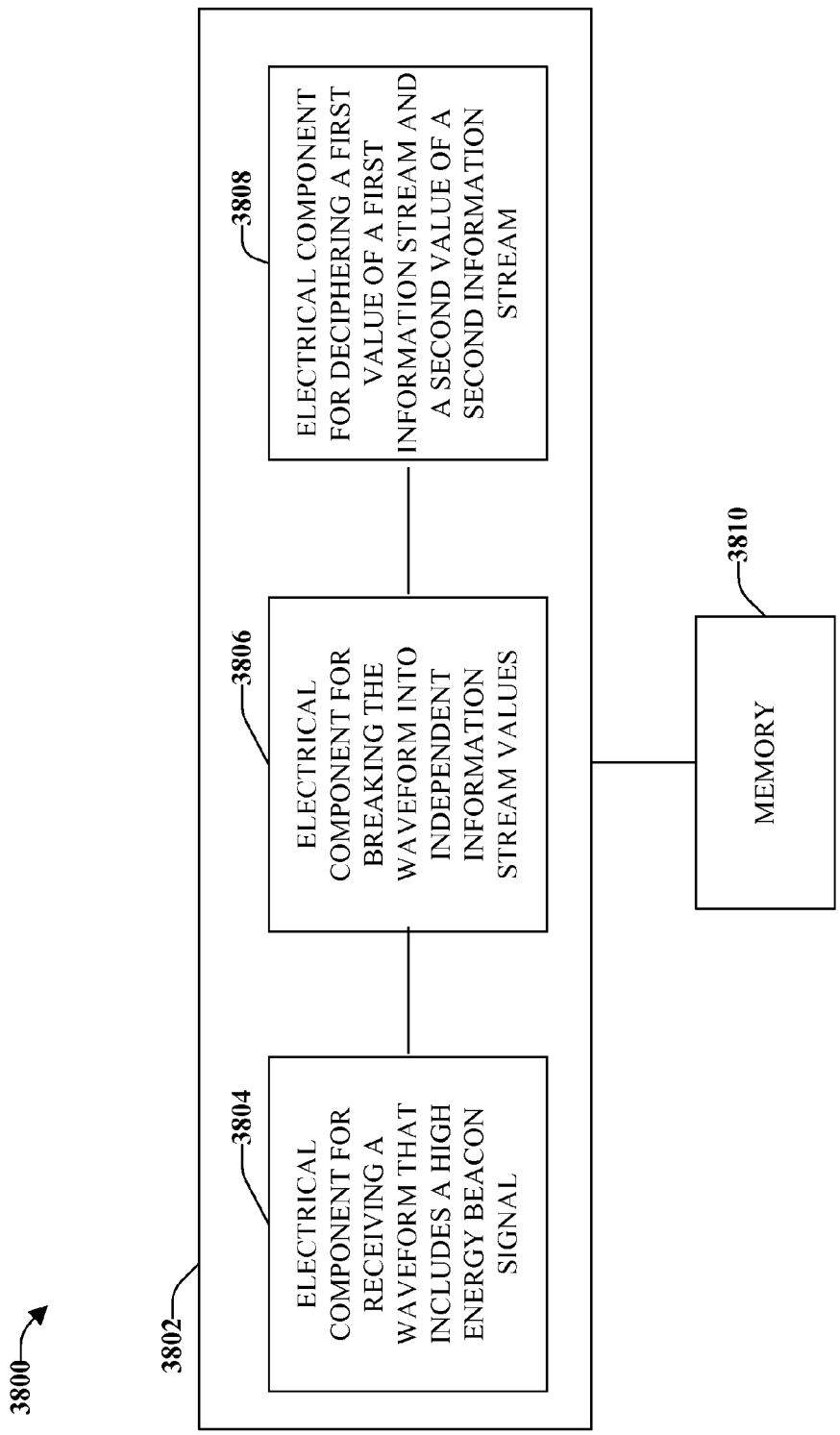
FIG. 38 illustrated is a system that enables deciphering two independent information streams that represent a waveform within a wireless communication environment.

With reference to FIG. 38, illustrated is a system 3800 that enables deciphering two independent information streams that represent a waveform within a wireless communication environment. For example, system 3800 may reside at least partially within a mobile device. It is to be appreciated that system 3800 is represented as including functional blocks, which may be functional blocks that represent functions implemented by a processor, software, or combination thereof (e.g., firmware).

System 3800 includes a logical grouping 3802 of electrical components that can act in conjunction. For instance, logical grouping 3802 may include an electrical component for receiving a waveform that includes a high-energy beacon signal 3804. The high-energy beacon signal can be received at substantially a same time as other signals. Logical grouping 3802 can also include an electrical component for breaking the waveform into independent information stream values 3806 and an electrical component for deciphering a first value of a first information stream and a second value of a second information stream from the independent information stream values 3808.

In accordance with some aspects, logical grouping 3802 can include an electrical component for interpreting a periodicity of the first value that is different from a periodicity of the second value (not shown). Additionally or alternatively, logical grouping 3802 can include an electrical component for deciphering the first information stream as a signal $\{X_i\}$ included in $\{b_i\}$ and an electrical module for deciphering the second information stream as a sequence of $\{Y_i\}$ included in $\{c_i\}$, where $\{Y_i\}$ represents a single bit (not shown). A chosen block of a broadcast message can be indicated by $\{X_i\}$ and $\{Y_i\}$ indicates a location within the chosen block.

Additionally, system 3800 may include a memory 3810 that retains instructions for executing functions associated with electrical components 3804, 3806, and 3808. While shown as being external to memory 3810, it is to be understood that one or more of electrical components 3804, 3806, and 3808 may exist within memory 3810.

Figure 39:
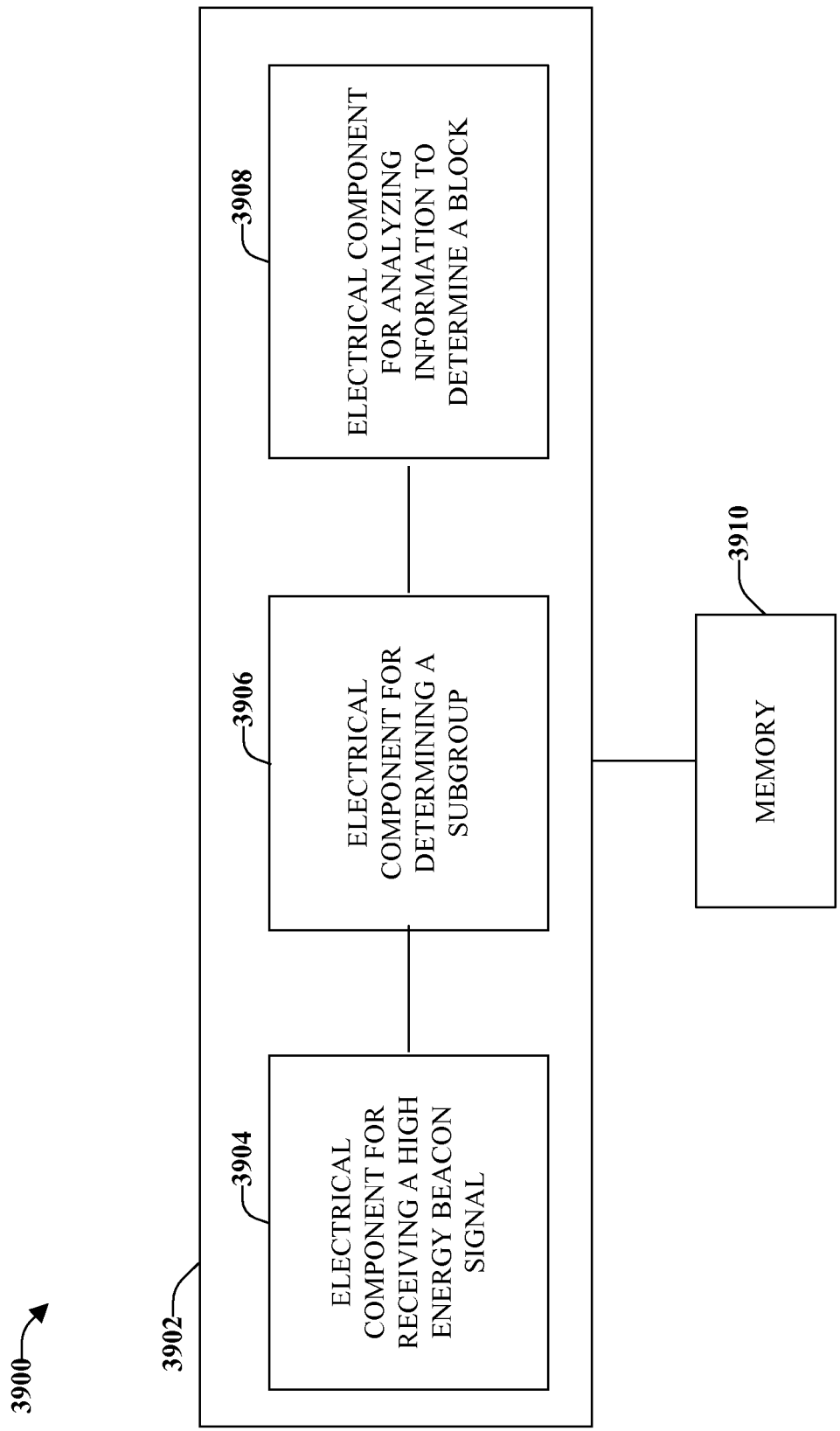
FIG. 39 illustrates a system that enables transmission of information during a frequency portion and a time portion within a wireless communication environment.

With reference to FIG. 39, illustrated is a system 3900 that receives information during a frequency portion and a time portion within a wireless communication environment. For example, system 3900 may reside at least partially within a mobile device. It is to be appreciated that system 3900 is represented as including functional blocks, which may be functional blocks that represent functions implemented by a processor, software, or combination thereof (e.g., firmware). System 3900 includes a logical grouping 3902 of electrical components that can act in conjunction.

For instance, logical grouping 3902 may include an electrical component for receiving a high-energy beacon 3904. The high-energy beacon represents a micro block that includes at least one frequency tone in one time symbol. Also included can be an electrical component for determining a subgroup from which the micro block was chosen 3906. The subgroup can include a subset of frequency tones in a subset of time symbols. Also included can be an electrical component for analyzing information contained in the high-energy beacon to determine a block from which the subgroup was chosen 3908. The block can include a set of frequency tones in a set of time symbols. The high-energy beacon can comprises a combination of a first information stream and a second information stream. The subgroup could have been chosen as a function of the first information stream and the micro block could have been chosen as a function of a second information stream. Changes to a frequency portion and a time portion do not affect each other.

In accordance with some aspects, logical grouping can include an electrical component for analyzing the first information stream utilizing the equation $\hat{X}_i=\text{floor}(Z_i/L)$ (not shown). Also included can be an electrical component for analyzing the second information stream utilizing the equation $\hat{Y}_i=\text{mod}(Z_i, L)$ (not shown).

Additionally, system 3900 may include a memory 3910 that retains instructions for executing functions associated with electrical components 3904, 3906, and 3908. While shown as being external to memory 3910, it is to be understood that one or more of electrical components 3904, 3906, and 3908 may exist within memory 3910.

Figure 40:
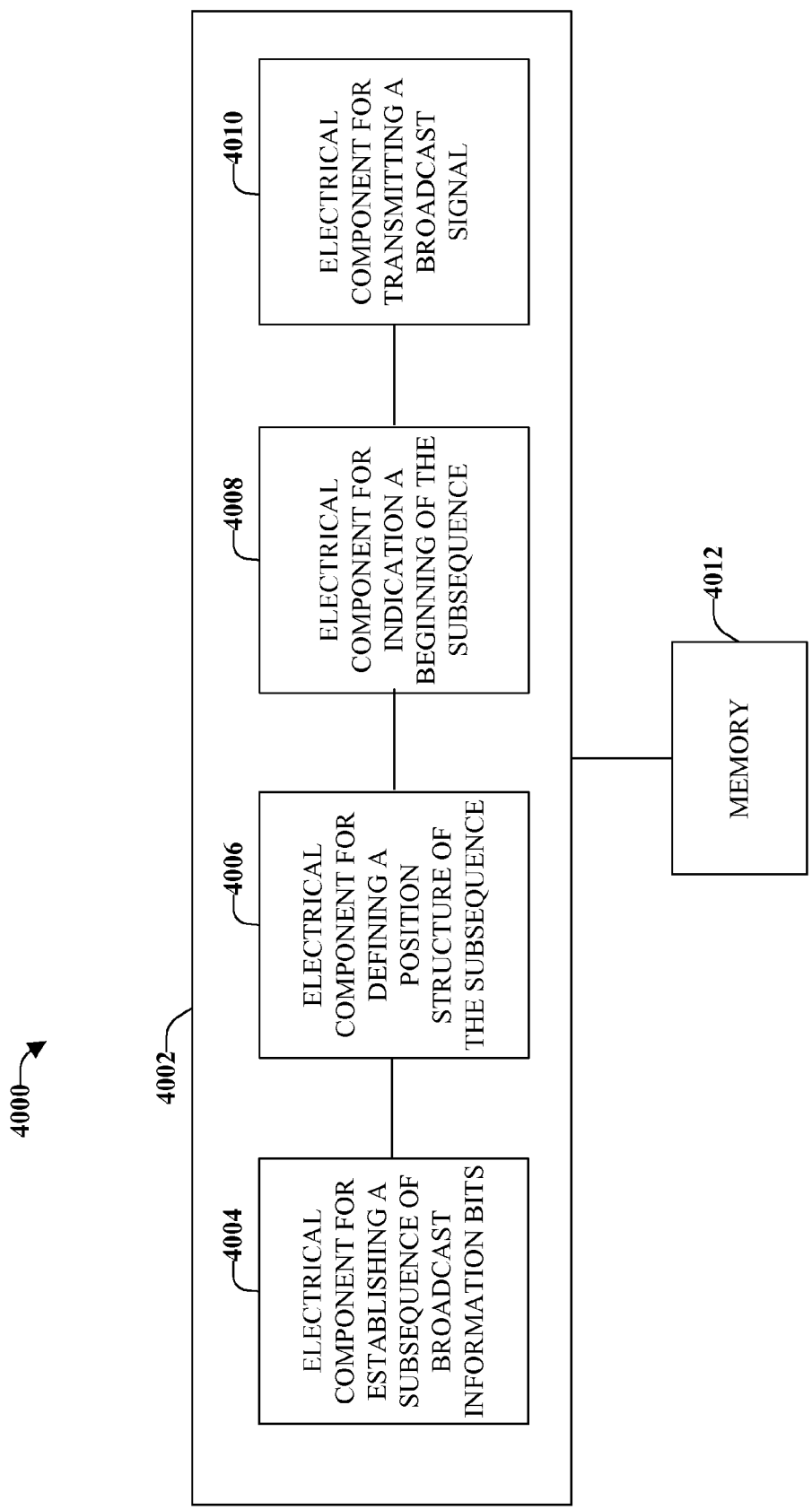
FIG. 40 illustrates a system that enables transmission of a broadcast signal that contains a subsequence of broadcast information bits.

FIG. 40 illustrates a system that enables transmission of a broadcast signal that contains a subsequence of broadcast information bits. For example, system 4000 may reside at least partially within a base station. It is to be appreciated that system 4000 is represented as including functional blocks, which may be functional blocks that represent functions implemented by a processor, software, or combination thereof (e.g., firmware).

System 4000 includes a logical grouping 4002 of electrical components that can act in conjunction. Logical grouping 4002 may include an electrical component for establishing a subsequence of broadcast information bits 4004. The subsequence can include one or more asynchronous messages and/or one or more synchronous messages. A message header can be included in the asynchronous message to indicate a definition of the asynchronous message. A definition of the synchronous message can be a function of a position of the synchronous message in a broadcast signal.

Logical grouping 4002 can also include an electrical component for defining a position structure of the subsequence 4006. The position structure can be predefined. Also included in logical grouping 4002 can be an electrical component for indicating a beginning of the subsequence 4008 and an electrical component for transmitting the broadcast signal 4010.

In accordance with some aspects, system 4000 can also include an electrical component for defining a plurality of subsequences of broadcast information bits. Also included can be an electrical component for locating each of the plurality of subsequences within the first sequence of information bits and/or an electrical component for establishing a timing structure that designates the location of the subsequences. Also included can be an electrical component for encoding the timing structure in the broadcast signal. In accordance with some aspects, logical grouping also includes an electrical component for assigning different periodicities to different synchronous messages included in the broadcast signal.

Additionally, system 4000 may include a memory 4012 that retains instructions for executing functions associated with electrical components 4004, 4006, 4008 and 4010. While shown as being external to memory 4012, it is to be understood that one or more of electrical components 4004, 4006, 4008 and 4010 may exist within memory 4012.

Figure 41:
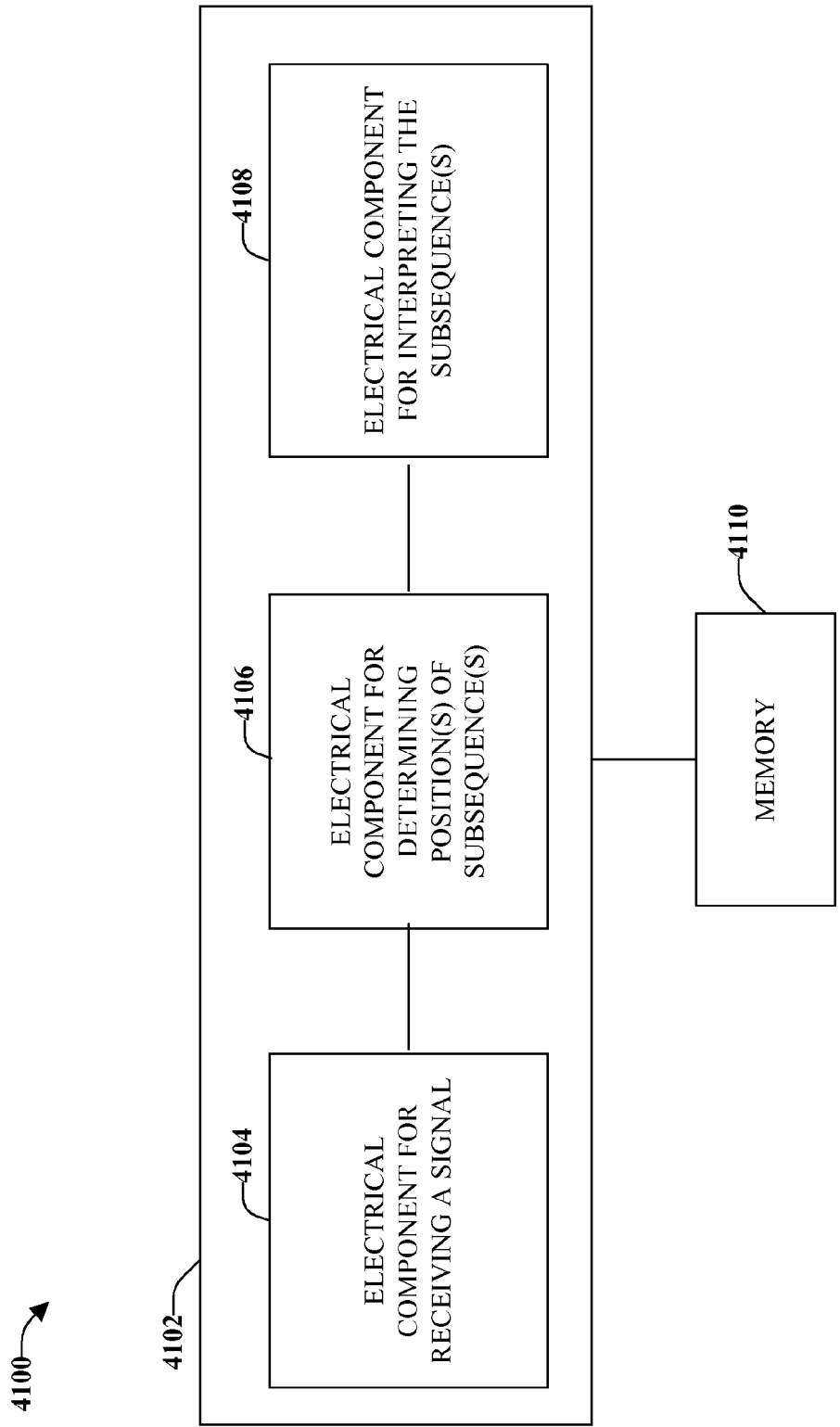
FIG. 41 illustrates a system that enables interpretation of a broadcast signal that contains asynchronous and/or synchronous messages.

FIG. 41 illustrates a system 4100 that enables interpretation of a broadcast signal that contains asynchronous and/or synchronous messages. System 4100 may reside at least partially within a mobile device. It is to be appreciated that system 4100 is represented as including functional blocks, which may be functional blocks that represent functions implemented by a processor, software, or combination thereof (e.g., firmware).

System 4100 includes a logical grouping 4102 of electrical components that can act in conjunction. Logical grouping 4102 may include an electrical component for receiving a signal that includes one or more subsequences of broadcast information bits 4104. The one or more subsequences can include one or more asynchronous messages, one or more synchronous messages or both asynchronous and synchronous messages. Two or more subsequences can be received at different periodicities or they can be interleaved with each other.

Also included in logical grouping 4102 can be an electrical component for determining a position of at least one of the subsequences 4106 and an electrical component for interpreting the subsequences based in part on the determined position 4108. In accordance with some aspects, system 4100 can also include an electrical component for piecing together portions of the broadcast signal to derive a header/body/message sequence and/or an electrical component for determining a starting point and ending point of the message based in part on a message format. According to some aspects, system 4100 can include an electrical component for decoding a timing structure that indicates a position for each of a plurality of subsequences of broadcast information bits. The timing structure can be included in the received broadcast signal.

Additionally, system 4100 may include a memory 4110 that retains instructions for executing functions associated with electrical components 4104, 4106 and 4108. While shown as being external to memory 4110, it is to be understood that one or more of electrical components 4104, 4106 and 4108 may exist within memory 4110.

It is to be understood that the aspects described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various examples are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method of operating a base station, comprising:
assigning a first value comprising at least one or more information bits to a first information stream;
assigning a second value comprising at least one or more information bits to a second information stream;
combining the first information stream and the second information stream using the first and second values and a maximum value of the first information stream to produce a composite value from the combined information streams; and
transmitting a waveform as a function of the composite value.

2. The method of claim 1, wherein the first information stream represents a first subset of broadcast information and the second information stream represents a second subset of broadcast information.

3. The method of claim 1, wherein the waveform includes a high-energy beacon signal, a transmission power of the beacon signal per degree of freedom being at least 10 dB higher than a transmission power of other signals sent by the base station.

4. The method of claim 1, wherein the waveform occupies a small degree of freedom.

5. The method of claim 1, combining the first information stream and the second information stream is performed by utilizing equation $Z_i=\{X_i\}*Q+\{Y_i\}$, where $\{Y_i\}$ represents the first value, $\{X_i\}$ represents the second value, and Q represents the maximum value of the first information stream.

6. The method of claim 1, assigning a first value to a first information stream, further comprising:
coding each of a plurality of information bits $\{c_i\}$; and
determining a sequence of bits $\{Y_i\}$ from $\{c_i\}$, wherein $\{Y_i\}$ represents a single bit.

7. The method of claim 1, assigning a second value to a second information stream, further comprising:
coding an information bit $\{b_i\}$; and
creating a signal $\{X_i\}$ from $\{b_i\}$.

8. The method of claim 1, wherein assigning the first value to a first information stream comprises determining a sequence of $\{Y_i\}$ bits and assigning the second value of the second information stream comprises creating a signal $\{X_i\}$.

9. The method of claim 8, the signal $\{X_i\}$ has a periodicity that is independent of a periodicity of the sequence of $\{Y_i\}$ bits.

10. The method of claim 1, combining the first value and the second value creates a broadcast signal that occupies a space that is larger than a space of the first information stream and a space of the second information stream.

11. A wireless communications apparatus that produces two information streams that represent a waveform, comprising:
a memory that retains instructions related to determining a first value comprising at least one or more information bits for a first information stream, determining a second value comprising at least one or more information bits for a second information stream, combining the values with the use of a maximum value of the first information stream to produce a composite value and transmitting a waveform as a function of the composite value; and
a processor, coupled to the memory, configured to execute the instructions retained in the memory.

12. The wireless communications apparatus of claim 11, wherein determining the first value is performed independently from determining the second value.

13. The wireless communications apparatus of claim 11, wherein the second value provides a timing sequence that might repeat at a different interval than a timing sequence of the first value.

14. The wireless communications apparatus of claim 11, wherein the waveform includes a high energy beacon signal, a transmission power of the beacon signal per degree of freedom being at least 10 dB higher than a transmission power of other sent signals.

15. The wireless communications apparatus of claim 11, wherein the memory further retains instructions for creating a signal $\{X_i\}$, from a first coding scheme $\{b_i\}$ and creating a sequence of $\{Y_i\}$ bits from a second coding scheme $\{c_i\}$, wherein $\{Y_i\}$ represents a single bit.

16. The wireless communications apparatus of claim 11, wherein the memory further retains instructions for creating a value $Z_i$, by utilizing equation $Z_i=\{X_i\}*Q+\{Y_i\}$, where $\{Y_i\}$ represents the first value, $\{X_i\}$ represents the second value, and Q represents the maximum value of the first information stream.

17. A wireless communications apparatus, comprising:
means for assigning independent values comprising at least one or more information bits to a first information stream and a second information stream;
means for combining the independent values with the use of a maximum value of the first information stream to produce a composite value; and
means for outputting a waveform that is a function of the composite value, the waveform includes a high-energy beacon signal.

18. The wireless communications apparatus 17, further comprising means for assigning a periodicity to the first information stream that is different from a periodicity of the second information stream.

19. The wireless communications apparatus 17, the means for outputting the waveform that includes a high-energy beacon signal provides a transmission power of the beacon signal per degree of freedom being at least 10 dB higher than a transmission power of other signals sent at substantially a same time.

20. The wireless communications apparatus 17, further comprising means for representing the first value as a signal $\{X_i\}$ and representing the second value as a sequence of $\{Y_i\}$ bits, wherein the means for combining the independent information stream values utilizes an equation $Z_i=\{X_i\}*Q+\{Y_i\}$, where Q represents the maximum value of the first information stream.

21. The wireless communications apparatus of claim 20, wherein $\{X_i\}$ indicates a chosen block of a broadcast message and $\{Y_i\}$ indicates a location within the chosen block.

22. The wireless communications apparatus 20, wherein $Z_i$ occupies a space that is larger than a space occupied by $\{X_i\}$ and a space occupied by $\{Y_i\}$.

23. A machine-readable non-transitory medium having stored thereon machine-executable instructions for:
assigning a first value comprising at least one or more information bits to a first information stream;
assigning a second value comprising at least one or more information bits to a second information stream that is independent from the value assigned to the first information stream;
combining the first value and the second value with the use of a maximum value of the first information stream to produce a composite value; and
transmitting a waveform that includes a high-energy beacon signal, the waveform is a function of the composite value.

24. The machine-readable non-transitory medium of claim 23, wherein the first value represents a first subset of broadcast information and the second value represents a second subset of broadcast information.

25. In a wireless communication system, an apparatus comprising:
a processor configured to:
assign independent values comprising at least one or more information bits to a first information stream and a second information stream, wherein the independent values can be selectively coded and decoded; and
combine the independent values with the use of a maximum value of the first information stream for transmission in a waveform that includes a high energy beacon signal, the waveform is a function of the combined independent values.

* * * * *